US012388776B2

(12) United States Patent
Diesch et al.

(10) Patent No.: US 12,388,776 B2
(45) Date of Patent: Aug. 12, 2025

(54) METHODS AND SYSTEMS FOR DIFFERENTIATING INFORMATION

(71) Applicant: Quarter, Inc., Niwot, CO (US)

(72) Inventors: Michael Diesch, Niwot, CO (US); Christopher Diesch, Niwot, CO (US); Shannon Diesch, Niwot, CO (US)

(73) Assignee: Quarter, Inc., Niwot, CO (US)

( * ) Notice: Subject to any disclaimer, the term of this patent is extended or adjusted under 35 U.S.C. 154(b) by 0 days.

(21) Appl. No.: 18/503,881

(22) Filed: Nov. 7, 2023

(65) Prior Publication Data

US 2024/0146678 A1 May 2, 2024

Related U.S. Application Data

(63) Continuation-in-part of application No. 17/806,677, filed on Jun. 13, 2022, and a continuation-in-part of application No. 17/121,510, filed on Dec. 14, 2020, now Pat. No. 11,582,324, application No. 18/503,881 is a continuation-in-part of application No. 18/046,689, filed on Oct. 14, 2022, which is a continuation-in-part of application No. 17/121,510, filed on Dec. 14, 2020, now Pat. No. 11,582,324.

(60) Provisional application No. 63/382,995, filed on Nov. 9, 2022, provisional application No. 63/578,514, filed on Aug. 24, 2023, provisional application No. 63/209,858, filed on Jun. 11, 2021, provisional application No. 62/948,136, filed on Dec. 13, 2019.

(51) Int. Cl.
*H04L 51/18* (2022.01)
*G06Q 40/06* (2012.01)
*G06Q 50/16* (2024.01)

(52) U.S. Cl.
CPC ............. *H04L 51/18* (2013.01); *G06Q 40/06* (2013.01); *G06Q 50/16* (2013.01)

(58) Field of Classification Search
None
See application file for complete search history.

(56) References Cited

U.S. PATENT DOCUMENTS 10,373,129 B1  8/2019  Ames et al.
10,438,290 B1  10/2019  Winklevoss et al.
(Continued)

FOREIGN PATENT DOCUMENTS

CN  108428168 A  8/2018
CN  109377219 A  2/2019
(Continued)

OTHER PUBLICATIONS

The Potential Role of Tokenization in Affordable Housing, Crypto Properties LLC, Dec. 2018 (Tokenization). (Year: 2018).*
(Continued)

*Primary Examiner* — Allan J Woodworth, II
(74) *Attorney, Agent, or Firm* — DLA Piper LLP (US)

(57) ABSTRACT

Methods and systems for transferring information, comprising: transmitting, by a first computing device of the first computing system, a first network function request to a decentralized network, the first network function request including first information; and transmitting, by a second computing device of the second computing system, a second network function request to the decentralized network, the second network function request including second information.

20 Claims, 36 Drawing Sheets

I. Tenant-in-Common ("TIC") Structure:

(56) References Cited

U.S. PATENT DOCUMENTS

| | | | |
|---|---|---|---|
| 10,498,808 B2 | 12/2019 | Purushothaman et al. | |
| 2006/0171346 A1 | 8/2006 | Kolavennu et al. | |
| 2010/0131426 A1 | 5/2010 | Kroutik | |
| 2018/0262385 A1 | 9/2018 | Hinni et al. | |
| 2018/0322597 A1 | 11/2018 | Sher | |
| 2018/0352399 A1 | 12/2018 | Nebel | |
| 2019/0165930 A1 | 5/2019 | Castinado et al. | |
| 2019/0207751 A1* | 7/2019 | Harvey | H04L 67/104 |
| 2019/0251552 A1* | 8/2019 | Kurian | H04L 9/3247 |
| 2019/0287175 A1 | 9/2019 | Hill et al. | |
| 2019/0287195 A1 | 9/2019 | Lee et al. | |
| 2019/0303893 A1* | 10/2019 | Ramasamy | G06K 7/10366 |
| 2019/0306230 A1 | 10/2019 | Purushothaman et al. | |
| 2019/0306235 A1 | 10/2019 | Veale et al. | |
| 2019/0311447 A1 | 10/2019 | Strnad, II | |
| 2019/0318433 A1 | 10/2019 | McGee et al. | |
| 2019/0333030 A1 | 10/2019 | Ramasamy et al. | |
| 2019/0333051 A1 | 10/2019 | Brogger | |
| 2020/0026785 A1 | 1/2020 | Patangia et al. | |
| 2020/0027079 A1 | 1/2020 | Kurian | |
| 2020/0042989 A1* | 2/2020 | Ramadoss | G06Q 50/167 |
| 2020/0211134 A1* | 7/2020 | Sahagen | G06Q 30/06 |
| 2020/0394714 A1 | 12/2020 | Strnad, II | |
| 2021/0119785 A1 | 4/2021 | Ben-Reuven et al. | |
| 2021/0243272 A1 | 8/2021 | Diesch et al. | |

FOREIGN PATENT DOCUMENTS

| | | |
|---|---|---|
| JP | 2004102735 A | 4/2004 |
| JP | 2009151741 A | 7/2009 |
| WO | 2021119618 A1 | 6/2021 |

OTHER PUBLICATIONS

CPROP: "The Potential Role of Tokenization in Affordable Housing," Crypto Properties LLC, Dec. 2018, 23 Pages.
Examination Report No. 1 for Australian Patent Application No. 2020401589 dated Mar. 16, 2023, 6 Pages.
Extended European Search Report for European application. no. 20899037.4 dated Nov. 9, 2018, 11 pages.
First Examination Report for New Zealand Patent Application No. 789751, mailed Apr. 5, 2023, 4 pages.
U.S. Appl. No. 17/121,510.
International Preliminary Report on Patentability for International Application No. PCT/US2020/064934, mailed Jun. 23, 2022, 05 Pages.
International Preliminary Report on Patentability for the application No. PCT/US2022/033269, mailed Dec. 21, 2023, 6 pages.
International Search Report and Written Opinion for Application No. PCT/US2023/024936, mailed on Jul. 12, 2023, 7 Pages.
International Search Report and Written Opinion for International Application No. PCT/US2020/064934, mailed Mar. 19, 2021, 11 Pages.
International Search Report and Written Opinion for International Application No. PCT/US2022/033269, mailed Oct. 17, 2022, 07 Pages.
Latifi S., et al., "Blockchain-Based Real Estate Market: One Method for Applying Blockchain Technology in Commercial Real Estate Market," 2019 IEEE International Conference on Blockchain, pp. 528-535.
Office Action for Belize Patent Application No. 1049.22, dated Jan. 11, 2024, 2 pages.
Office Action for Chinese Patent Application No. 202080096564, mailed Apr. 28, 2023, 8 pages.
Office Action for Chinese Patent Application No. 202080096564.3, mailed Jan. 2, 2024, 8 pages.
Office Action for Japanese Patent Application No. 2022536662, mailed Oct. 3, 2023, 3 pages.
Office Action for Japanese Patent Application No. 2022536662, mailed May 9, 2023, 13 pages.
Office Action for Korean Patent Application No. 10-2022-7023955, mailed Jul. 1, 2023, 19 Pages.
Office Action for Korean Patent Application No. 10-2022-7023955, mailed Jan. 2, 2024, 6 Pages.
Office Action for Singapore Patent Application No. 11202250355, mailed Jul. 4, 2023, 10 Pages.
Second Examination Report for New Zealand Patent Application No. 789751, mailed Sep. 22, 2023, 6 pages.
Smith J., et al., "Tokenized Securities and Commercial Real Estate," 2019.
International Search Report and Written Opinion for Application No. PCT/US2023/37006, mailed on Feb. 21, 2023, 13 pages.
Office Action for Korean Patent Application No. 10-2022-7023955, mailed Mar. 7, 2024, 5 Pages.
U.S. Appl. No. 17/806,677.
U.S. Appl. No. 18/046,689.
Office Action for Singapore Patent Application No. 11202250355, mailed Aug. 2, 2024, 11 pages.
Office Action for Thailand Patent Application No. 2201003627, mailed Jul. 25, 2024, 9 pages.
U.S. Appl. No. 17/806,677, for Sep. 17, 2024 to Mar. 13, 2025.
U.S. Appl. No. 18/046,689, for Sep. 17, 2024 to Mar. 13, 2025.
First Examination Report for Indian Patent Application No. 202217039929, dated Apr. 21, 2025, 8 pages.
Extended European Search Report for Application No. 22821194.2, dated Mar. 26, 2025, 9 pages.
Office Action for European Patent Application No. 22821194.2, mailed Apr. 15, 2025, 1 page.

* cited by examiner

I. Tenant-in-Common ("TIC") Structure:

II. Delaware Statutory Trust ("DST") Structure:

III. LLC Structure:

IV. Hybrid Structure:

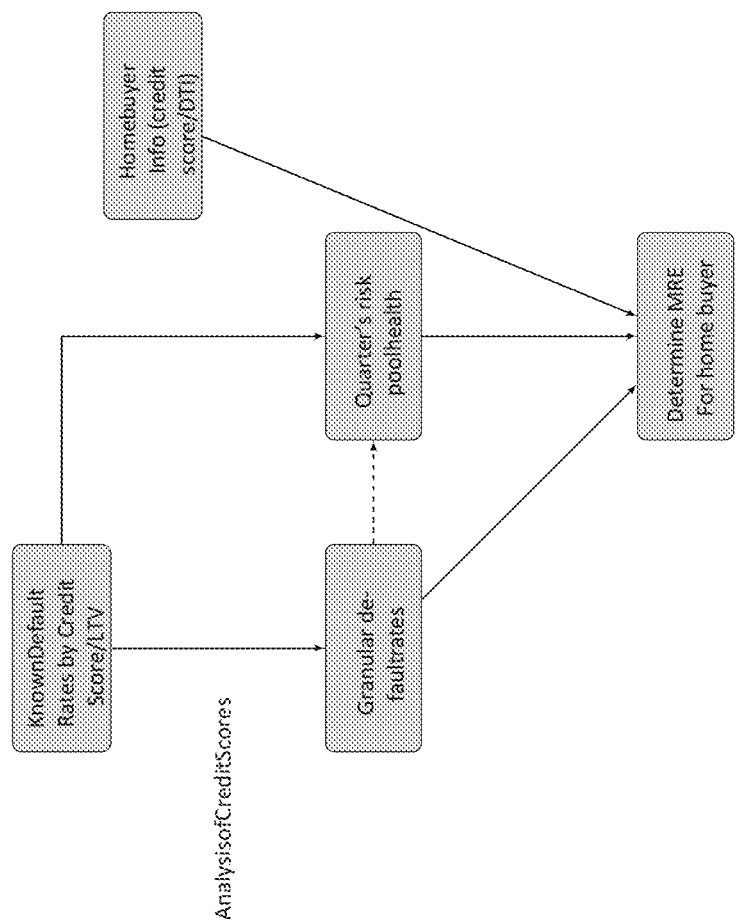

FIGURE 8

$$A_{tot} = (H_f * H_h) + \sum^h (0.01 * V_h) + (0.01 * R_h * P_h) \quad \text{(Equation 1)}$$

$$U_{tot} = \sum^h D(C_h, E_h, I_f) * U_h \quad \text{(Equation 2)}$$

$$\Delta_h = R_{health} - (U_{tot} + D(C_h, E_h, I_f) * (U_h)) / (A_{tot} + (0.01 * V_h)) \quad \text{(Equation 3)}$$

$$D(C_h, E_h, I_f) * I_{jf} = (R_{health} - \Delta_{H max}) * (A_{tot} + 0.01 * V_h) - U_{tot} \quad \text{(Equation 4)}$$

$$D(C_h, E_h, I_f) * (1 - R)E_h = (R_{health} - \Delta_{H max}) * (A_{tot} + 0.01 * V_h) - U_{tot} \quad \text{(Equation 5)}$$

$$D(C_h, E_h, I_f) * E_h = ((R_{health} - \Delta_{H max}) * (A_{tot} + 0.01 * V_h) - U_{tot}) / (1 - R) \quad \text{(Equation 6)}$$

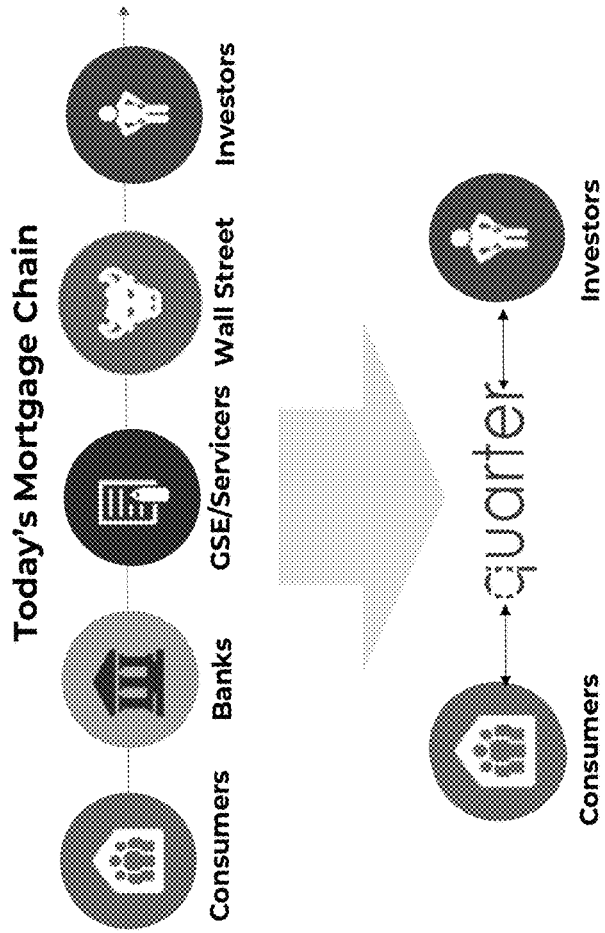
FIGURE 14

FIG. 15A
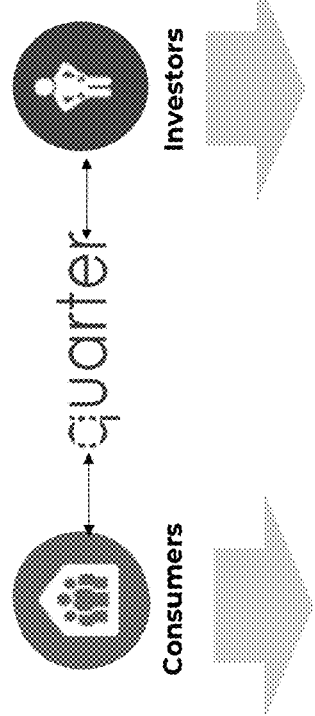
Example Efficiencies
Consumers ←--quarter--→ Investors
Consumers:
✓ legal co-ownership
✓ 30% cheaper/mo.
✓ simple underwriting
✓ fast close
✓ buy/sell additional equity
Investors:
✓ new equity asset class
✓ hybrid income/HPI
✓ low fees
✓ no landlord hassle
✓ realize gains as you go
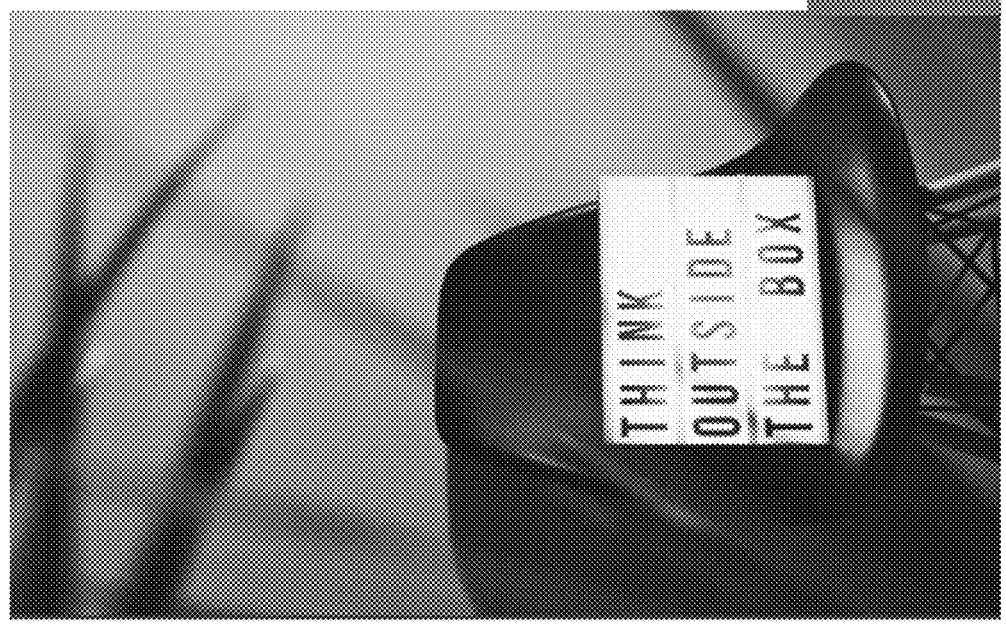

FIGURE 16
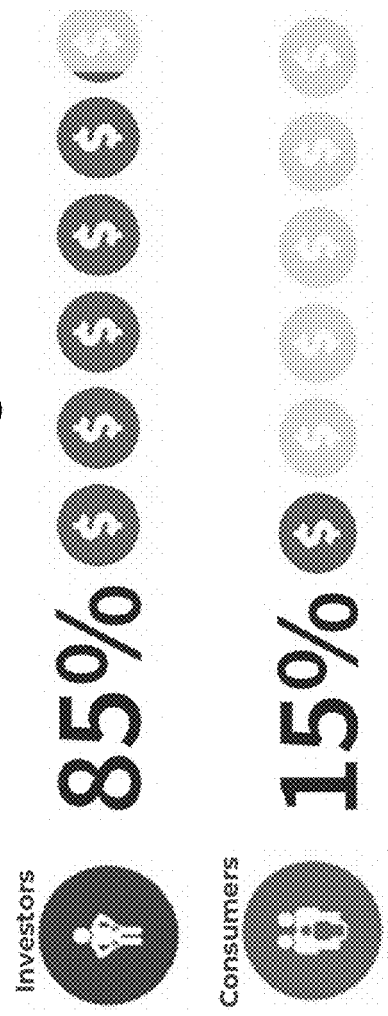
The platform can connect pools of committed investment funds to consumers buying homes. When a qualifying consumer applies and passes diligence review, funds can be released to close on the home within days. The consumer can be set up to pay rent on the portion of home they don't own and both parties share the benefits of ownership.

FIGURE 17

Minimum Retained Equity – Example Platform Underwriting

MINIMUM RETAINED EQUITY SCORE FICO DEBT-TO-INCOME PAYMENT LIABILITIES ASSETS DOWN INCOME RATIO

The platform can help solve the problem of affordability crisis for consumers by qualifying those who can at least afford it, through a minimum retained equity (MRE), a requirement for the consumer to own proportionately more of their home (e.g. up to 15%)

FIGURE 18

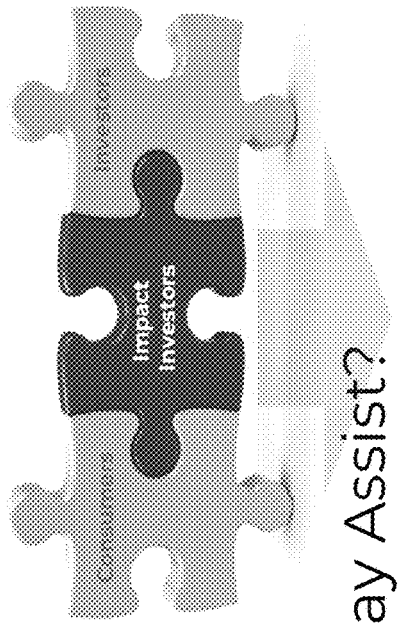

What is Down-Pay Assist?

- *plugs the gap* – Impact Investors can assist consumers who can't afford the down payment needed to reach MRE
- *co-owners* – they can purchase a fractional piece of the home just like the regular real estate investors
- *temporary* – their role can be to help with down payment and sell their equity to consumer in small, affordable pieces
- *risk/reward* – Impact Investors cab take first losses for riskier consumers but can also enjoy a correspondingly higher return profile By leveraging the platform, Impact Investors can seamlessly offer consumers an innovative and financially advantageous means to source the down payment required to become homeowners. They can be a puzzle piece to help consumers attain the equity they need to create the proper risk profile needed for regular investors.

| Example House | Boarding | HPI Interval #1 | HPI Interval #2 | HPI Interval #3 | HPI Interval #4 | HPI Interval #5 | HPI Interval #6 |
|---|---|---|---|---|---|---|---|
| Current Valuation | $250,000 | $312,500 | $375,000 | $330,000 | $325,000 | $375,000 | $450,000 |
| HPI Highwater Mark | $250,000 | $250,000 | $312,500 | $375,000 | $375,000 | $375,000 | $375,000 |
| HPI Realization Percentage | 90% | 90% | 90% | 90% | 90% | 90% | 90% |
| Quarter Pro Rata HPI | 5% | 5% | 5% | 5% | 5% | 5% | 5% |
| HPI Token Market Value | $0.000001 | $1.0000 | $1.3053 | $1.0442 | $1.1312 | $1.3053 | $1.5924 |
| HPI Token Book Value | $0.000001 | $1.0000 | $1.3053 | $1.0442 | $1.1312 | $1.3053 | $1.5924 |
| TIC Interests held by the SPE | 80% | 80% | 80% | 80% | 80% | 80% | 80% |
| Total Activated Asset Tokens | 200,000 | 200,000 | 200,000 | 200,000 | 200,000 | 200,000 | 200,000 |
| Total Activated Asset Tokens held by Investors | 197,500 | 197,500 | 197,500 | 197,500 | 197,500 | 197,500 | 197,500 |
| Original Asset Token Nominal Value | $1.0000 | $1.0000 | $1.0000 | $1.0000 | $1.0000 | $1.0000 | $1.0000 |
| Current Adjusted Asset Token Nominal Value | $1.0000 | $1.0000 | $1.0000 | $0.8000 | $0.8667 | $1.0000 | $1.0000 |
| Total HPI Tokens Unlocked per Asset Token held by Investors | | 0.225 | 0.138 | 0.000 | 0.000 | 0.000 | 0.113 |
| Total HPI Tokens Unlocked for Asset Tokens held by Investors | | 44,437.50 | 27,335.89 | 0.00 | 0.00 | 0.00 | 22,334.50 |
| Total Activated Asset Tokens held by the Quarter Contingency Fund | 2,500 | 2,500 | 2,500 | 2,500 | 2,500 | 2,500 | 2,500 |
| Original Asset Token Nominal Value | $1.0000 | $1.0000 | $1.0000 | $1.0000 | $1.0000 | $1.0000 | $1.0000 |
| Current Adjusted Asset Token Nominal Value | $1.0000 | $1.0000 | $1.0000 | $0.8000 | $0.8667 | $1.0000 | $1.0000 |
| Total HPI Tokens Unlocked per Asset Token held by Investors | | 0.225 | 0.138 | 0.000 | 0.000 | 0.000 | 0.113 |
| Total Unlocked HPI Tokens for Asset Tokens held by the Quarter Contingency Fund | | 562.50 | 344.76 | 0.00 | 0.00 | 0.00 | 282.59 |
| Total HPI Tokens Unlocked by all Asset Token Holders | | 45,000.00 | 27,580.65 | 0.00 | 0.00 | 0.00 | 22,607.09 |
| Total HPI Tokens Unlocked by Quarter and HPI Token rights purchasers | | 2,500.00 | 1,532.26 | 0.00 | 0.00 | 0.00 | 1,255.95 |
| Total HPI Tokens Unlocked | | 47,500.00 | 29,112.90 | 0.00 | 0.00 | 0.00 | 23,863.04 |
| Cumulative HPI Tokens Unlocked | | 47,500.00 | 76,612.90 | 76,612.90 | 76,612.90 | 76,612.90 | 100,475.94 |

*Note that at the end of HPI Intervals #3, #4, and #5, the End Current Valuation is not greater than the HPI High-water Mark, thus no HPI Tokens will be Unlocked for these periods.
**Note that in this example there is no transfer of the Asset Tokens during any of the HPI Intervals
***Note that in this example there is no transfer of TIC Interests during any of the HPI Intervals

FIGURE 31

| Example House | Investor A (No Transfer During any HPI Interval) | | | | | | |
|---|---|---|---|---|---|---|---|
| | Start | HPI Interval #1 | HPI Interval #2 | HPI Interval #3 | HPI Interval #4 | HPI Interval #5 | HPI Interval #6 |
| Current Valuation | $250,000 | $312,500 | $375,000 | $300,000 | $325,000 | $375,000 | $450,000 |
| HPI High-water Mark | $250,000 | $250,000 | $312,500 | $375,000 | $375,000 | $375,000 | $375,000 |
| HPI Realization Percentage | 90% | 90% | 90% | 90% | 90% | 90% | 90% |
| HPI Token Market Value | $0.000001 | $1.0000 | $1.3053 | $1.0442 | $1.1398 | $1.3300 | $1.6139 |
| HPI Token Book Value | $0.000001 | $1.0000 | $1.3053 | $1.0442 | $1.1398 | $1.3300 | $1.6139 |
| TIC Interests held by the SPE | 80% | 80% | 80% | 80% | 80% | 80% | 80% |
| Total Activated Asset Tokens held by Investor A | 98,750 | 98,750 | 98,750 | 98,750 | 98,750 | 98,750 | 98,750 |
| Original Asset Token Nominal Value | $1.0000 | $1.0000 | $1.0000 | $1.0000 | $1.0000 | $1.0000 | $1.0000 |
| Current Adjusted Asset Token Nominal Value | $1.0000 | $1.0000 | $1.0000 | $0.8000 | $0.8667 | $1.0000 | $1.0000 |
| Total HPI Tokens Unlocked per Asset Token held by Investor A | | 0.225 | 0.138 | 0.00 | 0.00 | 0.00 | 0.112 |
| Total HPI Tokens Unlocked by Investor A | | 22,218.75 | 13,617.94 | 0.00 | 0.00 | 0.00 | 11,013.92 |
| Cumulative Unlocked HPI Tokens held by Investor A | | 22,218.75 | 35,836.69 | 35,836.69 | 35,836.69 | 35,836.69 | 46,850.61 |

FIGURE 32A

| Investor B Sold Asset Tokens to Investor C at the end of HPI Interval #3 | | | | | | | | |
|---|---|---|---|---|---|---|---|---|
| Example House | Boarding | HPI Interval #1 | HPI Interval #2 | HPI Interval #3 | HPI Interval #3 | HPI Interval #4 | HPI Interval #5 | HPI Interval #6 |
| Current Valuation | $250,000 | $312,500 | $375,000 | $380,000 | $325,000 | $325,000 | $375,000 | $450,000 |
| HPI High-water Mark | $250,000 | $250,000 | $312,500 | $375,000 | $300,000 | $300,000 | $325,000 | $375,000 |
| HPI Realization Percentage | 90% | 90% | 90% | 90% | 90% | 90% | 90% | 90% |
| HPI Token Market Value | $0.000001 | $1.0000 | $1.3053 | $1.0442 | $1.1398 | $1.1398 | $1.3300 | $1.6139 |
| HPI Token Book Value | $0.000001 | $1.0000 | $1.3053 | $1.0442 | $1.1398 | $1.1398 | $1.3300 | $1.6139 |
| TIC Interests held by the SPE | 80% | 80% | 80% | 80% | 80% | 80% | 80% | 80% |
| | | | | | | | | |
| Total Activated Asset Tokens held by Investor B | 98,750 | 98,750 | 98,750 | 98,750 | | | | |
| Original Asset Token Nominal Value | $1.0000 | $1.0000 | $1.0000 | $1.0000 | | | | |
| Current Adjusted Asset Token Nominal Value | $1.0000 | $1.0000 | $1.0000 | $0.8000 | | | | |
| Total HPI Tokens Unlocked per Asset Token held by Investor B | | 0.225 | 0.138 | 0.00 | | | | |
| Total HPI Tokens Unlocked by Investor B | | 22,218.75 | 13,617.94 | 0.00 | | | | |
| | | | | | | | | |
| Total Activated Asset Tokens held by Investor C | | | | | 79,000 | 79,000 | 79,000 | 79,000 |
| Transferred Asset Token Nominal Value | | | | | $1.0000 | $1.0000 | $1.0000 | $1.0000 |
| Current Adjusted Asset Token Nominal Value | | | | | $1.0000 | $1.0000 | $1.0000 | $1.0000 |
| Total HPI Tokens Unlocked per Asset Token held by Investor C | | | | | 0.0658 | 0.1041 | 0.1115 | |
| Total HPI Tokens Unlocked by Investor C | | | | | 5,198.13 | 8,224.20 | 8,811.13 | |
| | | | | | | | | |
| Cumulative HPI Tokens Unlocked by Investors B and C | | 22,218.75 | 35,836.69 | 35,836.69 | 41,034.88 | 49,259.07 | 58,070.21 | |
| | | | | | | | | |
| Total Activated Asset Tokens held by the Quarter Contingency Fund | | | | | | | | |
| | | | | | | | | |
| Tokens Held since Boarding | 2,500 | 2,500 | 2,500 | 2,500 | 2,500 | 2,500 | 2,500 | 2,500 |
| Original Asset Token Nominal Value | $1.0000 | $1.0000 | $1.0000 | $1.0000 | $1.0000 | $1.0000 | $1.0000 | $1.0000 |
| Current Adjusted Asset Token Nominal Value | $1.0000 | $1.0000 | $1.0000 | $0.8000 | $0.8667 | $1.0000 | $1.0000 | $1.0000 |
| Total HPI Tokens Unlocked per Asset Token held since borfing | | 0.225 | 0.138 | 0.000 | 0.000 | 0.000 | 0.000 | 0.112 |
| HPI Tokens Unlocked by the Quarter Contingency Fund | | 562.50 | 344.76 | 0.00 | 0.00 | 0.00 | 0.00 | 278.83 |
| | | | | | | | | |
| Tokens Transferred from Investor B | | | | | 19,750 | 19,750 | 19,750 | 19,750 |
| Redeemed Asset Token Nominal Value | | | | | $0.0000 | $0.0000 | $0.0000 | $0.0000 |
| Current Adjusted Asset Token Nominal Value | | | | | $0.0000 | $0.0000 | $0.0000 | $0.0000 |
| Total HPI Tokens Unlocked per Asset Token held by the Quarter Contingency Fund | | | | | n/a | n/a | n/a | n/a |
| HPI Tokens Unlocked by the Quarter Contingency Fund | | | | | 0.00 | 0.00 | 0.00 | 0.00 |
| | | | | | | | | |
| Total HPI Tokens Unlocked by the Quarter Contingency Fund | | 562.50 | 344.76 | | 0.00 | 0.00 | 0.00 | 278.83 |
| Cumulative HPI Tokens Unlocked by the Quarter Contingency Fund | | 562.50 | 907.26 | 907.26 | 907.26 | 907.26 | 907.26 | 1,186.09 |

*Note that in this example there is no transfer of TIC Interests during any of the HPI Intervals

FIGURE 32B

METHODS AND SYSTEMS FOR DIFFERENTIATING INFORMATION

CROSS-REFERENCE TO RELATED APPLICATIONS

This application claims the benefit of U.S. Provisional Application No. 63/382,995, filed Nov. 9, 2022, and U.S. Provisional Application No. 63/578,514, filed Aug. 24, 2023. This application is a Continuation-in-Part of U.S. patent application Ser. No. 17/806,677, filed Jun. 13, 2022, which claims priority to U.S. Provisional Application No. 63/209,858 filed Jun. 11, 2021 and is also a Continuation-in-Part of U.S. application Ser. No. 17/121,510 filed Dec. 14, 2020, which claims priority to U.S. Provisional Application No. 62/948,136, filed Dec. 13, 2019. This application is a Continuation-in-Part of U.S. patent application Ser. No. 18/046,689, filed Oct. 14, 2022, which is a continuation of U.S. application Ser. No. 17/121,510, filed Dec. 14, 2020, which claims the benefit of U.S. Provisional Application No. 62/948,136, filed Dec. 13, 2019. All of these applications are incorporated by reference in their entirety.

This application is also related to PCT/US2020/064934 filed Dec. 14, 2020 and PCT/US2022/033269 filed Jun. 13, 2022. This application is incorporated by reference in its entirety.

BRIEF DESCRIPTION OF THE FIGURES

FIG. 7 illustrates an example of an MRE calculation flow, according to aspects of the disclosure.

FIG. 8 illustrates an example of using blockchain for investing, according to aspects of the disclosure.

FIGS. 14, 15A-15B, 16, 17, 18, 19, 20, 21A-21B, 22-31, 32A-32B, and 33 illustrate other example aspects of the disclosure.

DETAILED DESCRIPTION OF ASPECTS OF THE DISCLOSURE

Definitions

Figure 1:
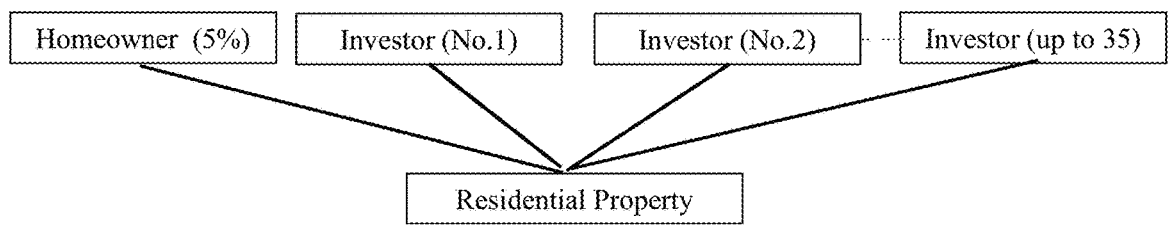
FIGS. 1-4 illustrate various structures that may be used in investing, according to aspects of the disclosure.

Note that, for ease of explanation, the term Quarter is used herein to refer to a manager, for example, the manager of the Platform. However, according to aspects of the disclosure, any other manager can be used instead of or in addition to Quarter.

Activated: An Asset Token which can be designated to show the link to a particular SPE (thus, a particular House) can be deemed to be Activated when the "time lock" of such Asset Token is removed after the closing of the purchase of the House. The Asset Tokens that are Activated may be still subject to the "transfer lock."

ALTA: Can refer to the American Land Title Association.

Applicant: Can comprise an individual who submits an application to utilize the Quarter Platform to fund their purchase of real estate interests in the House, fund the pay-off of the existing financing on, or sell equity in their existing House, or any combination thereof (but who has not become a Homeowner).

Appreciation Value: Can comprise the amount of appreciation which has occurred for a particular House (whether realized upon the sale of a particular House or unrealized appreciation prior to the sale of a particular House). The Appreciation Value can be calculated by subtracting the House's Current Valuation when the House is boarded on the Quarter Platform from the House's Current Valuation at a given time following the initial boarding. If the Appreciation Value is a negative number, the Appreciation Value can be deemed to be zero.

Aggregate House Appreciation Rights: Can comprise the contractual rights to all or a portion of the Appreciation Value of all Houses boarded onto the Quarter Platform.

Aggregate Appreciation Value: Can comprise the aggregate Appreciation Value at a given point in time of all Houses boarded onto the Quarter Platform.

Asset Token Purchasers: Can comprise investors who purchase the Bundle of the Asset Tokens and HPI Tokens pursuant to the terms of this Memorandum.

Base Rent: Can comprise the amount which may need to be paid each month by the occupant excluding other items (e.g., taxes, insurance, HOA fees, other escrow impounds or pass through payments for third party obligations).

Bundle: Can comprise the Asset Tokens and HPI Tokens purchased by the Asset Token Purchasers pursuant to this Memorandum at a purchase price of $1.00001 per Bundle. In some aspects of the disclosure, for each Bundle purchased, the Asset Token Purchaser can get 1 Asset Token with a par value of $1.0000 and 10 HPI Tokens with a par value of $0.000001 for each HPI Token.

Burned: Burning can refer to the permanent removal of existing tokens from circulation.

Capital Improvement: Can comprise an improvement which may substantially add to the value of the real property, and/or appreciably prolong the useful life of the real property and/or become part of the real property and/or is permanently affixed to the real property such that removal would cause material damage to the property and is therefore intended to become a permanent installation.

Capital Improvement Value: Can comprise the calculated value of capital improvements that may be made to a home by the occupant.

Cash Funding Pool: Can comprise a cash escrow bank account held by the Fund to hold the purchase money paid by the Investors for the Asset Tokens sold. Each Investor can have a separate ledger.

Current Adjusted Asset Token Nominal Value: Can comprise the nominal value of an Asset Token (e.g., expressed in US Dollars), whose nominal value has been adjusted since issuance or transfer as a result of a decline in the value of the House owned by the SPE.

Current Enhanced Valuation: Can comprise the valuation of record based on using an enhanced valuation methodology other than an Automated Valuation Model (AVM), such as, but not limited to, a broker price opinion (BPO), full appraisal, or other valuation methodology adopted by Quarter to determine the fair market value of residential properties.

Current Valuation: Can comprise the purchase price of the House when the House is initially boarded (e.g., to the Quarter Platform, Current Valuation of Record, or Current Enhanced Valuation, or other platform, as applicable).

Current Valuation of Record: Can comprise the valuation of record in the Quarter Platform which can be determined by an Automated Valuation Model (AVM) commonly used in the real estate market to determine the fair market value of residential properties. Other models may also be used instead of or in addition to the AVM model.

Debt to Income (DTI): Can comprise the ratio between a home buyer's debt and income.

Digital Wallets: Can comprise a device or program that stores keys and allows access to Tokens. A digital wallet can contain public keys, the form of which can be presented and recorded on a blockchain, and/or private keys which can be used to sign transactions. Wallet addresses can be used to assign the ownership of Tokens on the Quarter Platform.

Enhanced Rent: Can be the additional amount that can be paid by the Homeowner to the SPE, for the benefit of an Impact Investor only, which amount can be calculated as the fair market rent in the submarket of the jurisdiction where the House is located, as determined by Quarter, minus elements (e.g., as described in the Real Estate Agreement) such as, but not limited to, the Base Rent for a given House.

Enhanced TIC Fee: (i.e., rent, a base fee, etc.) Can comprise the additional monthly payment made by the Homeowner to the SPE, for the benefit of an Impact Investor only, which amount can be determined by the Impact Investor but may not exceed an amount equal to (i) the fair market rent in the submarket of the jurisdiction where the House is located, as determined by Quarter, (ii) minus the TIC Fee for a given House and (iii) minus the Property Escrow Amounts (if any). The Enhanced TIC Fee can be in addition to the TIC Fee and other Payments made by the Homeowner to which the Impact Investor is entitled.

Excess Equity: (A) Can comprise the amount of unencumbered equity held by Homeowner (e.g., stated in US Dollars) in the House. Excess equity can be divided by the Current Valuation of the House at the determination time, expressed in a percentage form, minus (B) Homeowner's then existing Minimum Retained Equity.

Fiat Currency: A national currency which can usually be issued by a country's government or central bank, for example US dollars.

High Equity Boarding Event: A High Equity Boarding Event can occur when TIC Interests held by the Homeowner at the time the House is boarded on the Quarter Platform are equal to or higher than the High Equity Boarding Threshold.

High Equity Boarding Threshold: The High Equity Boarding Threshold can be stated as a percentage and can be initially set (e.g., at 10%) (e.g., may be adjusted from time to time by the Fund).

Homeowner: Can comprise an individual who is: admitted to use the Quarter Platform, initiates the acquisition of the House or seeks to fund the pay-off of existing financing and/or equity sale on a House they currently own, and as a result of such purchase, pay-off, or sale comes to hold a TIC Interest in the House, enters into a TIC Agreement with the SPE, and has the sole right to live in the House. A subset of these requirements, as well as additional requirements, may also be used to define a homeowner.

House: Can comprise residential real property permitted to be boarded to the Quarter Platform.

House Appreciation Right: Can comprise the contractual right to all or a portion of the Appreciation Value of a specific House on the Quarter Platform.

House Seller: Can comprise an individual or entity who is selling a House which will be purchased by the Homeowner and SPE and boarded onto the Quarter Platform. House Seller may have no affiliation or ongoing relationship with the Fund, Quarter or any of the other parties to the Quarter Platform after the closing of the sale of the House.

House Price Index (HPI): Can comprise changes in the value of all Houses on the Quarter Platform in a given period. HPI can be stated as either an actual amount (US Dollars) or as a percentage change from some specific start date.

HPI Asset Pool: Can comprise a pool of assets which can comprise: (A) the unrealized Aggregate Appreciation Value, and/or (B) any fiat currency sitting in the HPI Asset Pool Cash Account.

HPI Asset Pool Cash Account: Can comprise a bank account in the name of the Fund to hold the realized Appreciation Value from proceeds paid to such account upon the sale of Houses or the House Appreciation Rights.

HPI Interval: Can comprise a predetermined period of time, initially set to be annually (which may be changed by the Fund from time to time), when Quarter will update the Current Valuation for each House then-existing on the Quarter Platform for the purpose of calculating the change in the valuation of each House during that period.

HPI Token: Can comprise a token issued by the platform which can be backed by the home price appreciation of all of the homes on the platform.

HPI Token Right Purchaser: Can comprise an Investor who only purchases the rights to the Unlocked HPI Tokens pursuant to this Memorandum, rather than the Bundle.

HPI Realization Percentage: Can comprise the amount, stated in a percentage form, which can be applied to the House appreciation for the current period in order to calculate the number of HPI Tokens to be Unlocked for Token holders. The HPI Realization Percentage can be initially set (e.g., at 90%), which may be changed by the Fund from time to time.

HPI Token Escrow Pool: Can comprise a Digital Wallet controlled by the Fund to hold the issued HPI Tokens that are not Unlocked and/or the HPI Tokens that were previously Unlocked but subsequently are transferred to the HPI Token Escrow Pool and are subject to the "time lock" and "transfer lock" again.

Liens: Can comprise any mortgage, deed of trust, lien, pledge, hypothecation, assignment, security interest, or any other encumbrance, charge or transfer of, on or affecting the House or the TIC Interests held by the Homeowner or any portion thereof or interest therein, including, without limitation, any conditional sale or other title retention agreement, any financing lease having substantially the same economic effect as any of the foregoing, the filing of any financing statement, control agreement, and mechanic's, materialmen's, tax, judgment and other similar liens and encumbrances.

Loan to Value (LTV): Can comprise the ratio loan amount against a property to the actual value of the property.

Impact Investor: Can comprise an Investor that assists the Applicant in meeting the Minimum Retained Equity requirements to qualify to become a Homeowner or in paying a portion of the closing costs in connection with the purchase, sale, or pay-off of the existing financing on a House currently owned by the Homeowner. The Impact Investor can be an Asset Token Purchaser who purchases (A) Asset Tokens from the Fund in not less than the amount which is equal to a positive difference of (i) the Homeowner's Minimum Retained Equity minus (ii) the purchase money amount of the TIC Interests actually paid for by the Homeowner at the time the House initially boards on the Quarter Platform, and/or (B) HPI Tokens in connection with the Bundle.

Initial Holder: Can comprise a person or entity who acquired tokens in an initial issuance directly from the platform owner/operator.

Investor: Can comprise an "accredited investor" as such term is defined in Rule 501(a) of Regulation D under the Securities Act, who is purchasing Tokens pursuant to this Memorandum.

Minimum Retained Equity (MRE): Can comprise the minimum equity (e.g., expressed in a percentage form), that a Homeowner may need to retain based on current underwriting criteria imposed by Quarter, as may be amended from time to time. This can be a dynamic number which changes based on the value of the House occupied by the Homeowner and Homeowner profiles at a given moment in time and can be used to manage default risks. The amount of Minimum Retained Equity can be determined by a proprietary algorithm, which can use the Homeowner's credit score, front and back-end debt to income ratios, the Quarter Contingency Fund composition, and Homeowner or property specific data as inputs at a given moment in time. The Minimum Retained Equity can also be used to calculate the minimum purchase price required to be paid by the Homeowner for their TIC Interests in the House when the House is initially boarded to the Quarter Platform.

Occupancy Token: Can be the token issued to a Homeowner by an SPE upon full execution of the Real Estate Agreement, which can evidence Homeowner's sole right to occupy the House. Each House may only have one Occupancy Token. Occupancy Tokens may or may not be offered for sale by either the Fund or the SPE.

Occupant: Can comprise the tenants in common owner who may be designated as the homeowner and may be in possession of the occupancy token.

Original Asset Token Nominal Value: Can comprise the nominal value (e.g., stated in US Dollars), of an Asset Token upon issuance. The Original Asset Token Nominal Value can be initially set (e.g., US$1.0000).

Payments: Can comprise amounts paid by the Homeowner to the SPE, which amounts can include: (i) the TIC Fee, (ii) the TIC Servicing Fee, (iii) the Enhanced TIC Fee with respect to the Impact Investor only, (iv) the House Warranty premium and other insurance premiums as required to be paid by the Homeowner under the TIC Agreement, (v) all repayment of fees or charges advanced by the Quarter Contingency Fund pursuant to the TIC Agreement, or (vi) the Property Escrowed Amounts, if any, together with all accrued late fees for the foregoing (i)-(vi), or any combination of the foregoing.

Contingency Fund: Can comprise an entity (e.g., Quarter Contingency Fund LLC, a Delaware limited liability company, which can be controlled by Quarter), which can enter into a contract with the SPE to advance funds in the event of a Homeowner's default pursuant to the TIC Agreement, to pay real estate commissions, and to fund the purchase and resale of Homeowner's TIC Interests pursuant to this Memorandum. In consideration, the Quarter Contingency Fund can issue a certain amount of the Asset Tokens and HPI Tokens by the Fund and can receive certain monthly distributions from Payments made by the Homeowner as described herein.

Platform: Can comprise a virtual two-sided network and infrastructure (e.g., developed by Quarter), which can manage the interactions between all parties involved in the purchase, pay-off of existing financing, management and sale of residential real estate.

Platform Dashboards: Can comprise user interfaces that are accessible by Homeowners, Investors, vendors or Quarter, or any combination thereof, and can comprise a part of the Platform.

Preferred Agent Provider: Can comprise a real estate agent or brokerage firm with whom the Fund has negotiated a contract to provide House listing and sales service.

Qualified Institutional Buyer (QIB): Can comprise a company that can manage a certain amount (e.g., at least $100 million) of securities on a discretionary basis and/or is a registered broker-dealer investing a certain amount (e.g., at least $10 million) in non-affiliate securities.

Real Estate Agreement: Can be an Agreement signed by the Homeowner and/or SPE to memorialize their agreement as to the ownership and/or management of the House. A Form Real Estate Agreement can be provided to Applicants for review and can be signed upon the closing of the purchase of the House.

Real Estate Commission Fund: Can comprise a fund that can be established to pay future real estate sales commissions on behalf of the property owners. This can be funded monthly from the platform fees collected by the platform as the rent payments are made.

Real Estate Interests: Can be real estate interests in the House, expressed in a percentage form.

Redeemed Asset Token Nominal Value: Can comprise the nominal value of certain Asset Tokens transferred to the Contingency Fund as part of an Asset Token transfer to another Investor when the Current Valuation of the House has fallen below a certain HPI High-water Mark, and which nominal value can, in some embodiments, always be set to $0.00. Holders of the Asset Tokens with the Redeemed Asset Token Nominal Value may still be entitled to collect pro rata TIC Fee payments under circumstances described in this Memorandum and the TIC Agreement.

Rent: Can comprise the total payment which may need to be paid each month by the holder of the occupant token which can include base rent, platform fees and when applicable, taxes, insurance and/or HOA escrows.

Retained Risk Pool: Can comprise a pool of asset tokens which may be held by the network to form a risk-pool for the purpose of mitigating occupant default risk.

Tenants in Common (TIC): Can comprise a legal framework in which more than one owner of a property can hold title. A Tenants in Common interest can be a legally undivided interest in a property which can be held and may have no right of survivorship.

SPE: Can comprise a special purpose entity wholly owned by the Fund, which can be set up to purchase the TIC Interests in a particular House. Both the Homeowner and the SPE can own undivided TIC Interests in a particular House as tenants-in-common. The rights and obligations of the SPE and the Homeowner can be documented via the TIC Agreement.

TIC Agreement: Can comprise the Tenants-in-Common Agreement signed by the Homeowner and the SPE to memorialize their agreement as to the ownership and management of the House. A Form TIC Agreement can be provided to Applicants and Investors for review. The TIC Agreement can be signed by the SPE and the Homeowner upon the closing of the purchase of the House.

TIC Fee: Can comprise the amount paid by the Homeowner each month to the SPE in consideration of Homeowner's right to occupy the House, which amount can be determined (e.g., by Quarter).

TIC Servicing Fee: Can comprise the amount equal to a certain percentage (e.g., 1%) of the TIC Fee, payable (e.g., to Quarter).

TIC Interests: Can comprise Tenants-in-Common interests in the House, expressed in a percentage form.

Transferred Asset Token Nominal Value: Can comprise the value assigned to an Asset Token, which can be transferred between two parties when the Current Adjusted Asset Token Nominal Value has fallen below a certain amount (e.g., $1.0000).

Treasury Pool: Can comprise a Digital Wallet controlled by the Fund to hold the Asset Tokens that are no longer Activated and are again subject to the "time lock" and "transfer lock."

Triple Net Lease: Can comprise a lease agreement that can be held for a property, whereby the tenant or lessee promises to pay all the expenses of the property, including real estate taxes, building insurance, and/or maintenance.

Unencumbered Equity: Can comprise the TIC Interests held by the Homeowner that are not subject to any Liens. Searches may be conducted (e.g., by Quarter) to determine whether Homeowner's TIC Interests are subject to any Liens.

Unlocked or Unlock: Can apply to the HPI Tokens only and can occur when both the "time lock" and the "transfer lock" of a particular HPI Token are removed and such HPI Tokens are released from the HPI Token Escrow Pool by the Fund to Investors' Digital Wallets.

Example Alternatives for Home Investing

Systems and methods are described for using an alternative risk model which does not adjust pricing (rent) to accommodate a borrower's risk profile, but rather adjusts what it terms minimum retained equity (MRE). This approach can level the playing field in the long run by changing the current paradigm in which those who can least afford housing pay the most.

To avoid swapping one problem (e.g., high cost of capital) for another (e.g., high down payment), impact investors can participate alongside return oriented investors by homogenizing home funding across all strata of homeowners and risk profiles.

In some aspects of the disclosure, investment capital can be segmented from the capital supplied by or on behalf of the homeowner in the amounts dictated by quarters MRE calculation. Take the example of a borrower with a 620 FICO score and Debt to Income ratio of 45% wishes to purchase a $200,000 home. A MRE of 14.25% can be calculated based on this borrower's risk profile, meaning that the borrower can have a down payment of $28,500 or 14.25% of the $200,000 purchase price to purchase the home. Investors can purchase the other 85.75% of the home for $171,500, with assurances that the investment is secure due to the MRE calculations and risk pool.

In some aspects of the disclosure, an alternative option may be used when the borrower does not have the required down payment and wishes to rent instead. The capital to meet the MRE requirement can be provided by a combination of both the homeowner and a third-party impact investor. One example of the impact of this type of residential home funding models can be the lower monthly payment obligation of the homeowner. In this case, rent can be, for example, 25-35% lower than both the market rent and the mortgage. This differential can provide an arbitrage opportunity allowing the homeowner to purchase the additional equity held by the impact investor to meet the MRE requirements. The homeowner can purchase the equity from the impact investor over time by simply paying market rent until the minimum equity threshold is met, after which their monthly payment drops to just the amounted required to service the 85.75% holders. Meanwhile, as long as the MRE is continually met by either the homeowner, the impact investor or some combination of both, the investment can look exactly the same to holders of the 85.75% interest as any other investment on the platform.

In some aspects of the disclosure, a 10% equity purchase and resale by an impact investor to a homeowner calculated using market rent payments and a 5 year repurchase window can generate an annualized return of more than 20% for the impact investor. In this case, the impact investors along with the homeowner can take first losses in the event of a homeowner default.

Figure 6:
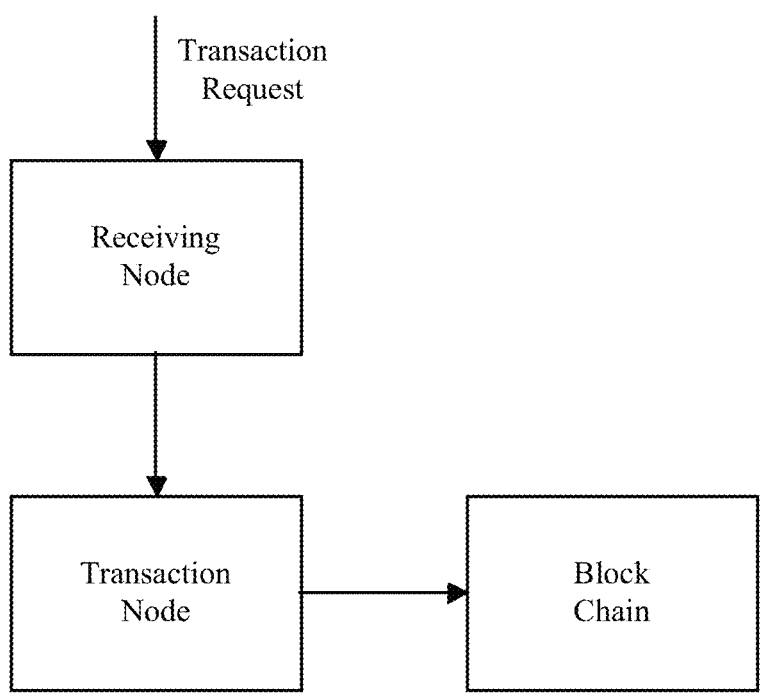
FIG. 6 illustrates an example method for using blockchain, according to aspects of the disclosure.

In some aspects of the disclosure, a framework can be provided to enable impact investors to plug and play with the platform design. An experience can be provided for impact investors that can allow them to easily design a program to their specific needs (e.g., within predetermined guidelines) and leverage the infrastructure with as little effort as possible. For example, this framework can be similar to an Amazon experience, except with impact investors instead of retailers leveraging the infrastructure. In some embodiments, a blockchain based smart contract can be used, although those of ordinary skill in the art will see that a non-blockchain based contract (and software to implement the same) can also be used. FIG. 6 illustrates an example process for using blockchain, according to aspects of the disclosure.

Using Blockchain Based Smart Contracts for Investing

Methods and systems for performing transactions for investing can be done via asset tokens and blockchain based smart contracts, as described herein. Background information on blockchain can be found at the Dec. 13, 2020 blockchain article on Wikipedia (https://en.wikipedia.org/wiki/Blockchain).

Requests for performing such transactions can be received from entities (e.g. investors) that transact in these asset tokens. The asset tokens can be backed by an asset (e.g. real property). While the present disclosure describes in detail transactions with respect to real property assets, the teachings can be implemented on other assets in a similar manner.

In an exemplary embodiment, the asset tokens can be generated using a cryptographic hash of information that uniquely identifies the asset. The tokens can have an owner that uses an additional public/private key pair. The owner public key can be set as the token owner identity, and ownership proof can be established by providing a signature generated by the owner private key and validated against the public key listed as the owner of the token.

Asset tokens can digitize ownership interests in certain assets (e.g. real property) to enhance access to the assets, enable tracking of assets based on their characteristics, and create efficiencies in supply chain management and trade finance. These tokens may be used as a medium of exchange and as an alternative to fiat currencies in, for example, settlement, payments, international remittances, investments, financing, and other activities.

In an exemplary embodiment, asset tokens may be issued and/or exchanged based on availability of inventory of the asset in accordance with established procedures and exchanges for the asset. Transaction of asset tokens can include purchasing of asset tokens, redeeming of asset tokens, transferring of ownership of asset tokens, providing of assets that back the asset tokens, etc. The asset tokens and associated transactions may be recorded in a blockchain based smart contract. Each asset token may be associated with a standardized smart contract that specifies transactions that can be performed on the asset.

Blockchain, as used herein, can be a public ledger of all transactions of a blockchain-based data storage. One or more computing devices may comprise a blockchain network, which may be configured to process and record transactions as part of a block in the blockchain. Once a block is completed, the block is added to the blockchain and the transaction record is thereby updated.

The blockchain may be a ledger of transactions in chronological order or may be presented in any order that may be suitable for use by the blockchain network. In some configurations, transactions recorded in the blockchain may include a destination address and an amount, such that the blockchain records the amount attributable to a specific address. The transactions may be financial and/or include additional or different information such as source address, timestamp etc.

The blockchain may also include data as a form of transaction placed in a distributed database that maintains a continuously growing list of data records hardened against tampering that maintains a continuously growing list of data records hardened against tampering and revision, and may be confirmed and validated by the blockchain network through proof of work and/or any suitable verification techniques associated therewith.

In some cases, data regarding a given transaction may further include additional data that is not directly part of the transaction appended to transaction data. In some instances, the inclusion of such data in a blockchain may constitute a transaction. In such instances, the inclusion of such data in a blockchain may constitute a transaction.

A smart contract, as used herein, can be a computer code that programmatically executes transactions that may be defined by a written contract or other pre-defined conditions. The computer code may be executed in a secure platform (e.g., an Ethereum platform, which provides a virtual machine) that supports recording transactions in a distributed ledger.

Additionally, the smart contract itself may be recorded as a transaction in the distributed ledger using an identity token that is a hash (i.e., identity token) of the computer code so that the computer code that is executed can be authenticated. When deployed, a constructor of the smart contract executes, initializing the smart contract and its state.

The state of a smart contract can be stored persistently in the distributed ledger. When a transaction is recorded against a smart contract, a message can be sent to the smart contract, and the computer code of the smart contract can execute to implement the transaction (e.g., debit a certain amount of asset tokens from the balance of an account).

The computer code can ensure that all the pre-defined conditions are met before the transaction is recorded in the distributed ledger. For example, a smart contract may support the sale of an asset. The inputs to a smart contract to sell a portion of an asset may be the identity tokens of the seller, the buyer, and the asset and the sale price. The computer code ensures that the seller is the current owner of the asset and that the buyer has enough funds in their account. The computer code then records a transaction that transfers the ownership of the asset to the buyer and a transaction that transfers the sale price from the buyer's account to the seller's account.

In an exemplary embodiment, the asset token transactions can be related to the purchase and sale of a portion or an entirety of a real property between one or more property occupants (e.g., homeowners) who reside at the property and/or one or more investors in the property who have a financial interest in the property. The proportion of ownership between the various occupants and investors can be based on a proportion of the tokens and TIC interest that are owned by the entity.

Such transactions can provide capital to homeowners who are not accredited investors to purchase their houses and have an undivided fractional ownership of the house with the investors. For example, if the homeowner funds 5% of the purchase price and investors fund 95% of the purchase price, the homeowner can need to pay rents to the investors for the 95% interests held by the investors per month. The recurring rent payments can be made to the investors via smart contracts. Thus, the investors can receive the cash flow from their investments and the homeowner will have the right to live in the house, subject to the rent payments.

As an example, each home can have 95,000 non-divisible asset tokens minted for transactions. A homeowner-to-be can purchase a 5% interest in the residential property and receive a 5% TIC interest in the home. Investors can purchase a 95% interest in the residential property and receive 95,000 asset tokens. An entity that facilitates this sale (e.g. a real estate website) can receive a commission the net sales proceeds from the consideration paid by the homeowner and the investors.

If a homeowner who owns a fraction of the home has a positive money event, the homeowner may buy more fractions of the home owned by the community of investors. For example, if the homeowner wants to pay an additional $25,000, the asset token ownership positions of all owners can be adjusted, and $25,000 worth of asset tokens can be redeemed and $25,000 worth of TIC ownership transferred to the homeowner. The homeowner's new monthly rent payments can also be reduced accordingly. Alternately, if the homeowner needed more money, the homeowner can trade fractions of the home. In such a case, the homeowner's monthly rent payments can be increased accordingly.

In an exemplary embodiment, only the homeowner can have the right to live in the house. Such occupancy right can be evidenced by an occupant token that would be specific to each residential property. Holding an occupant token can require payment of rent to investors via smart contracts. The occupant token may be involuntary redeemed by the investors if there were an event of default by the homeowner as set forth in the agreement between the homeowner and the investors. When homeowner desires to move out of the house, the homeowner can sell his or her asset tokens and the corresponding occupant token, which would then be transferred to a new homeowner.

Figure 2:
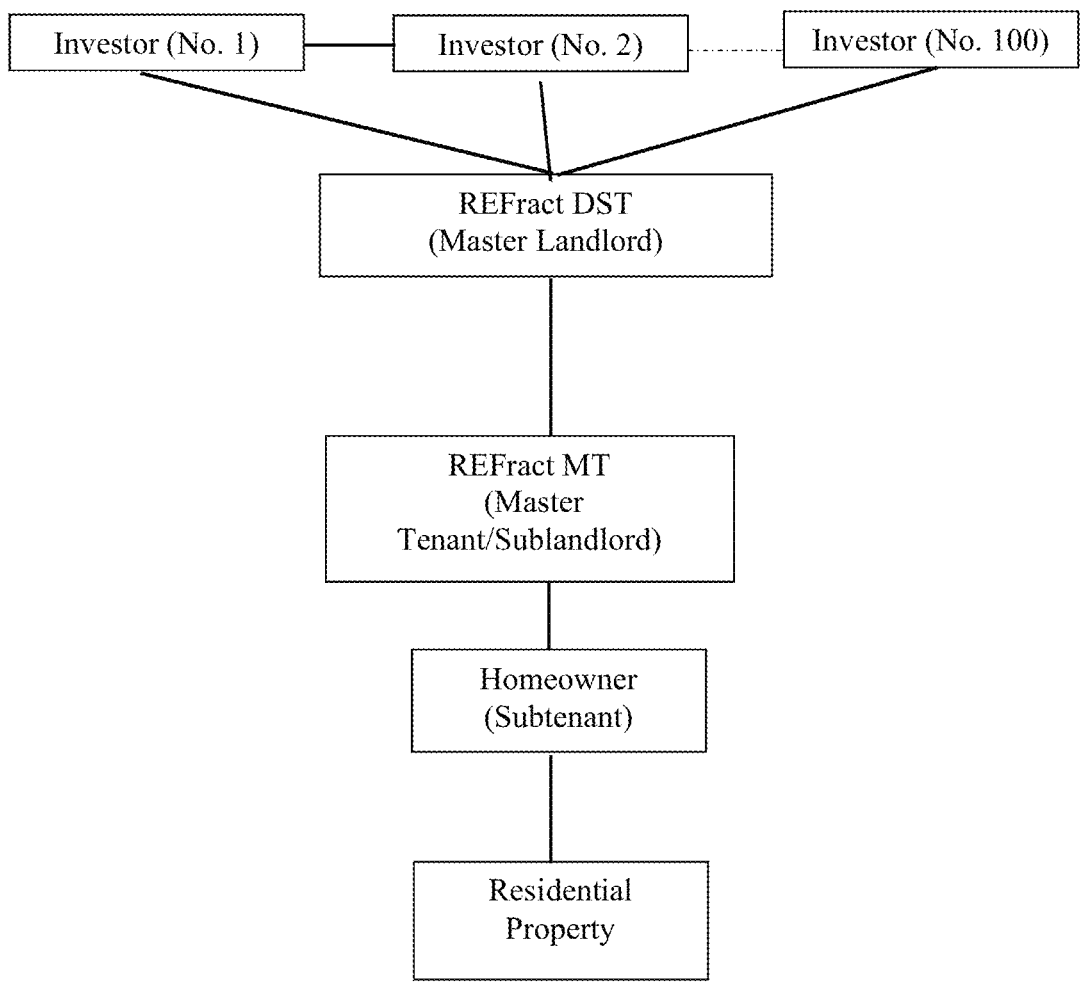
Figure 3:
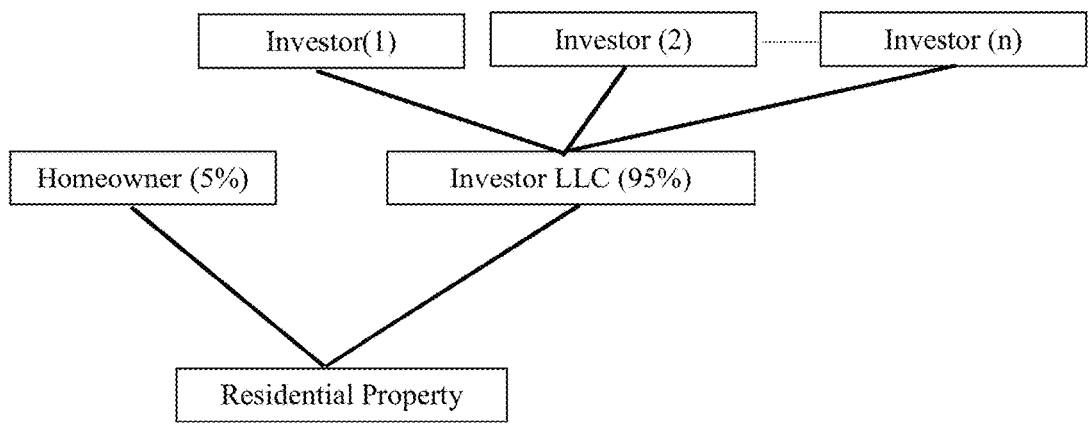
Figure 4:
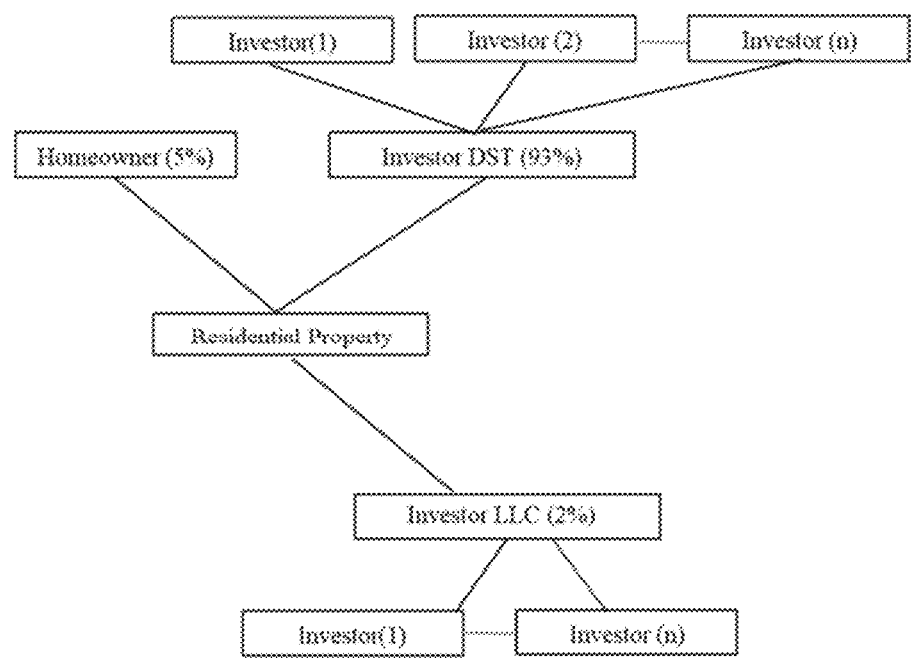

The asset-backed token transactions can be structured in the following ways: (i) Tenant-in-Common (TIC) structure (e.g., see FIG. 1), (ii) Delaware Statutory Trust (DST) structure (e.g., see FIG. 2), and (iii) Limited Liability Company (LLC) structure (e.g., see FIG. 3). (FIG. 4 illustrates a hybrid structure.) Under the TIC structure, the tokens can be represented by direct Tenant-in-Common interests in the asset. Under the DST structure, the tokens can be represented by beneficial interests in a DST to be governed by a trust agreement. This structure can eliminate the need to record a deed to evidence the change of ownership every time a transfer of a TIC Interest is made.

Under the LLC and/or DST structure, the tokens can be represented by membership interests in an LLC and/or DST, which would be the co-tenant with the homeowner. Homeowner may own an undivided fractional (e.g., 5%) TIC ownership interest in the house alongside the remaining (e.g. 95%) TIC ownership interest of the investors' LLC and/or DST. Together, the homeowner's TIC Interest and Investor LLC's and/or DST TIC Interest can collectively constitute a "Co-Tenant TIC Interests" under such a structure.

In such cases, both the homeowner and Investor LLC and/or DST can have voting and management rights, which can be documented via the TIC Agreement. Investors can be the holders of the LLC or DST Interests in Investor LLC and/or DST. If the homeowner wishes to purchase or sell its Co-Tenant TIC Interest from or to Investor LLC, then Investor LLC can facilitate such purchase or sale and adjust the rental payments accordingly relative. If the homeowner wishes to purchase its Co-Tenant TIC Interest from or to Investor DST, then Investor DST can facilitate such purchase and adjust the rental payments accordingly relative.

Example of Using Blockchain for Investing

Example Problem Description

Currently, some methods by which a potential home buyer's risk may be mitigated leads to homeowners in the highest risk class being given higher interest rates to recover potential losses at a given credit score, LTV, and/or DTI. This can lead to homeowners with the least ability to pay having to pay more on their mortgage every month, increasing the likelihood of default.

With a new platform for home ownership, it can be possible to reduce the risk associated with a home buyer by adjusting the amount of equity they hold in their home. If a default occurs, the homeowners equity can be used to recover the loss without putting undo financial strain on the buyer and/or it can also be possible to share the risk of individual assets across the entire network to reduce the stratification of risk that currently exist in the mortgage space.

It can be helpful to determine how much equity a home buyer must hold in their house. This can be referred to as Minimum Retained Equity (MRE). In some aspects of the disclosure, MRE can be based on the risk of the individual home buyer and the performance of Quarter's global risk pool.

Example MRE Calculation Flow

FIG. 7 illustrates an example MRE calculation flow, according to aspects of the disclosure.

There can be a few things that can be done to evaluate the relationship between credit scores/LTV/DTI and default rates. In the platform model, LTVs don't exist (e.g., as there may not be loans, and instead home ownership may be "fractionalized"). Instead, the LTV value can be roughly equivalent to the MRE and can be treated as such for the purposes of producing initial values to use for the model.

Additionally, to produce more granular data on the relationship between credit scores/LTV/DTI and default rates, the data can be fit to a non-linear model to make determinations about how the scores between the "blocks" of credit scores/LTVs/DTIs behave. A non-linear model can be chosen as the relationship being modeled may be inherently non-linear as there is a threshold above and/or below which changes in either credit score or LTV no longer have an appreciable effect on default rates. The function resulting from the fitting of available data blocks can be a multivariate equation we can represent as $$D(C_s, E_{min}, I_r)$$

Where $C_s$ can be the credit score of a consumer, $E_{min}$ can be the minimum retained equity, $I_r$ can be the Debt-to-Income ratio (DTI), and/or $D(C_s, E_{min}, I_r)$ can be the expected default rate based on the real world data available.

Once an initial $D(C_s, E_{min}, I_r)$ function is known, a new function can be derived from it such that:

$$E(D_m, C_s, I_r)$$

Where $D_m$ can be the maximum tolerable chance of default, $C_s$ can be the consumer's credit score, $I_r$ can be the debt-to-income ratio, and/or $E(D_m, C_s)$ can evaluate to the minimum retained equity the consumer may need to have to keep below the maximum tolerable default change.

This can be validated with real world data by comparing the output of $E(D_m, Cs, I_h)$ with the known real-world LTV values at a given credit score and/or known default rates.

As the platform network grows and additional data is available, the $E(D_m, C_s, I_h)$ function can be refit and tuned to provide more accurate data.

Example Risk Pool Health

The platform can be designed to have a risk pool which can share the risks of every property of the network, the risk pool can hold 1% of the value of each home on the network, which can entitle it to 1% of the rent and/or HPI accrual for each property. Additionally, this risk pool can be evaluated with the MRE for each property assumed to be recoverable at some rate R. The total assets can be held by the risk pool and can be computed as shown in EQUATION 1, where $H_h$ can be the total number of HPI tokens held by the risk pool, $H_v$ can be the current value of HPI tokens, $V_h$ can be the value of the home, $R_h$ can be the rent rate of the home, and/or $P_h$ can be the number of rent payments made by the occupant of the home The risks this pool may need to be able to cover can be all of the non-recoverable home equity held by homeowners who may be likely to default. This can be called U. U can be calculated for each property as:

$$U_h = (1-R)^* E_h$$

Where R can be the normalized recovery rate, and $E_h$ can be the MRE for the property.

Evaluating these values for each home in the network and normalizing them by their likelihood of default (e.g., using an analysis of credit scores) can provide the total loss that is the risk pool that can be responsible for covering using EQUATION 2.

For EQUATION 2, D can be the function described in the analysis of credit scores, $C_h$ can be the credit score for the homeowner, $E_h$ can be the MRE for the homeowner, $I_h$ can be the debt to income ratio for the homeowner, and $U_h$ can be calculated as shown above.

Using $U_{tot}$ and $A_{tot}$ we can compute a simple metric for the health of the risk pool:

$$R\text{health} = U\text{tot}/A\text{tot}$$

This metric can be interpreted as follows in some aspects of the disclosure:

$R_{health} < 1$: The pool will not have enough assets to cover the expected losses.

$R_{health}=1$: The pool has exactly enough assets to cover the expected losses.

$R_{health}>1$: The pool has more assets than the expected losses.

Example of Determining MRE For a New Home

When a property is being added to the platform, may need to determine what MRE a prospective home buyer must have to have their home added to the network. We can do this by evaluating the effect adding their home will have on the overall health of the platform risk pool. We can do this by evaluating the defining a maximum allowable change in the health of the risk pool a property is allowed to introduce. This can be called $\Delta_{Hmax}$.

We can now compute the change the new home will have on the risk pool in EQUATION 3.

In EQUATION 3, $R_{health}$ can be a current risk pool health, $U_{tot}$ can be the total expected losses for the risk pool, $D(C_h, E_h, I_h)$ can be the expected default chance for the property, $U_h$ can be the unrecoverable losses for the house if it were to default, $A_{tot}$ can be the current value of assets held by the risk pool, and/or $V_h$ can be the value of the home.

By setting the value of $\Delta_h$ to $\Delta_{Hmax}$ we can solve for $E_h$ in EQUATION 4.

Recall that $U_h$ can be a representation of the MRE that cannot be recovered, by substituting $U_h=(1-R)E_h$, as shown in EQUATIONS 5 and 6.

By doing the substitution for $D(C_h, E_h, I_r)$, we can compute the MRE for a given homeowner based on several tunable variables both in the above equation and the hidden ones in the as of yet computed $D(C_h, E_h, I_r)$ function.

Example Use of Smart Contracts and Blockchain for Investing

Figure 9:
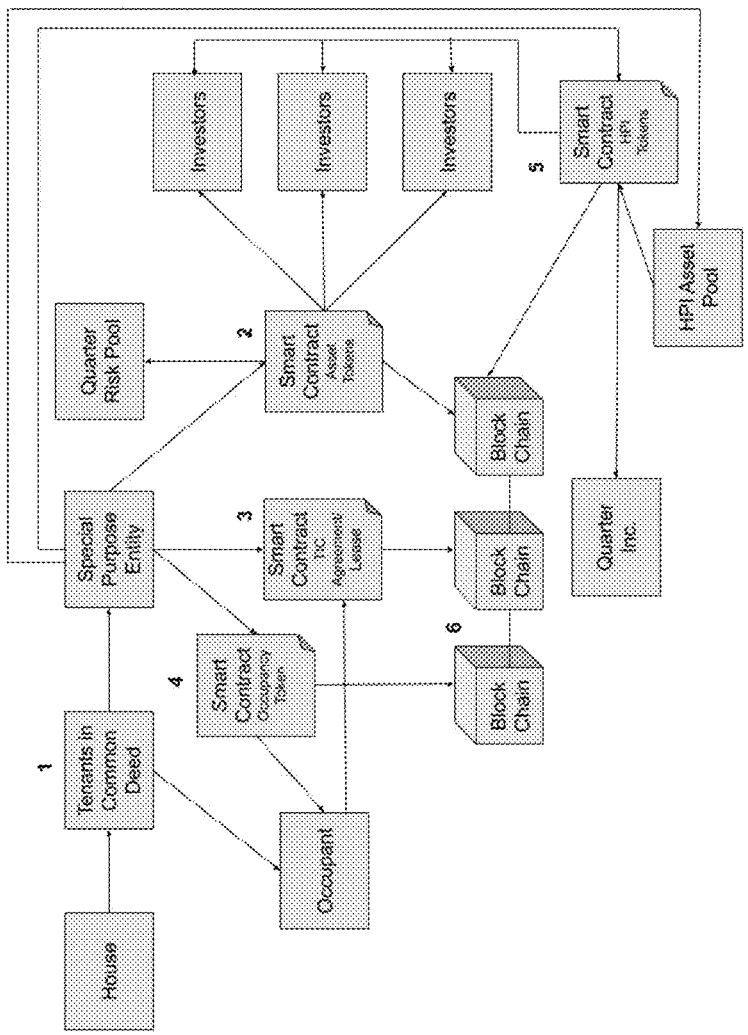
FIG. 9 illustrates various equations that can be used for investing, according to aspects of the disclosure.
Figure 10:
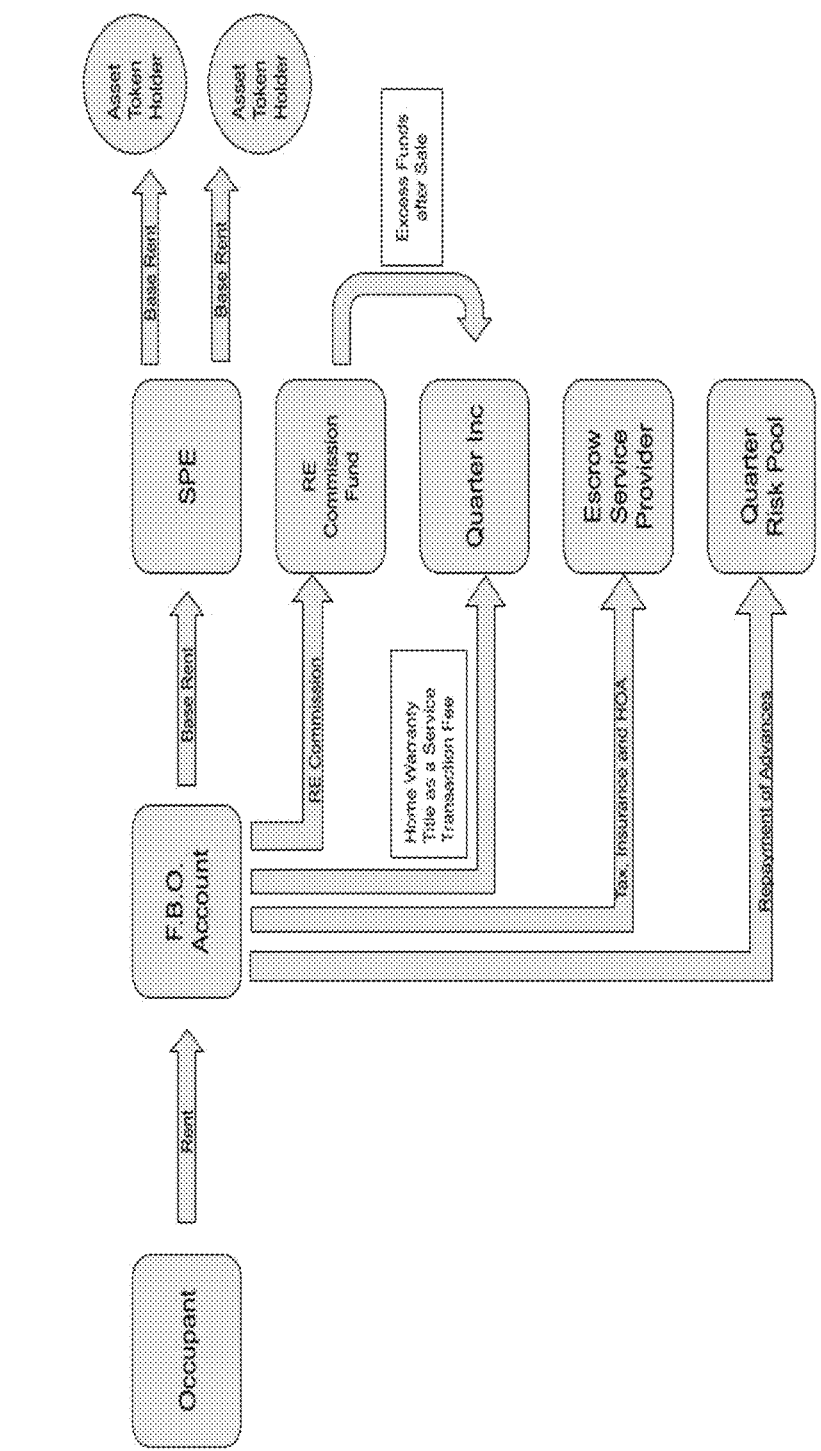
FIGS. 10-12 illustrate various parties, transactions and elements that can be used to board a home onto the platform.

FIG. 9 illustrates an example of how smart contracts and blockchain can be used for investing, according to aspects of the disclosure. In 1, ownership of the home can be granted to both the occupant and the SPE as tenants in common via a warranty deed. In 2, a smart contract can be created by the SPE which can issue asset tokens which can represent ownership in the SPE and can be sold to the investors to fund the purchase of the TIC interest pursuant to step 1. The Asset tokens can be distributed to the investors and also to the risk pool. In 3, a smart contract can be created between the occupant and the SPE which can contain a tenants in common agreement and a lease. In 4, a smart contract can be created by the SPE which can issue the occupancy token to the occupant. In 5, a smart contract can be created which can contain an agreement to assign home appreciation to the HPI asset pool and in exchange can issue HPI tokens which can be included in the sale of asset tokens. The HPI tokens can represent ownership in the appreciation rights and can be distributed to the investors with the asset tokens and also to the platform owner/manager. In 6, all of the transactions can be recorded onto the blockchain.

Figure 29:
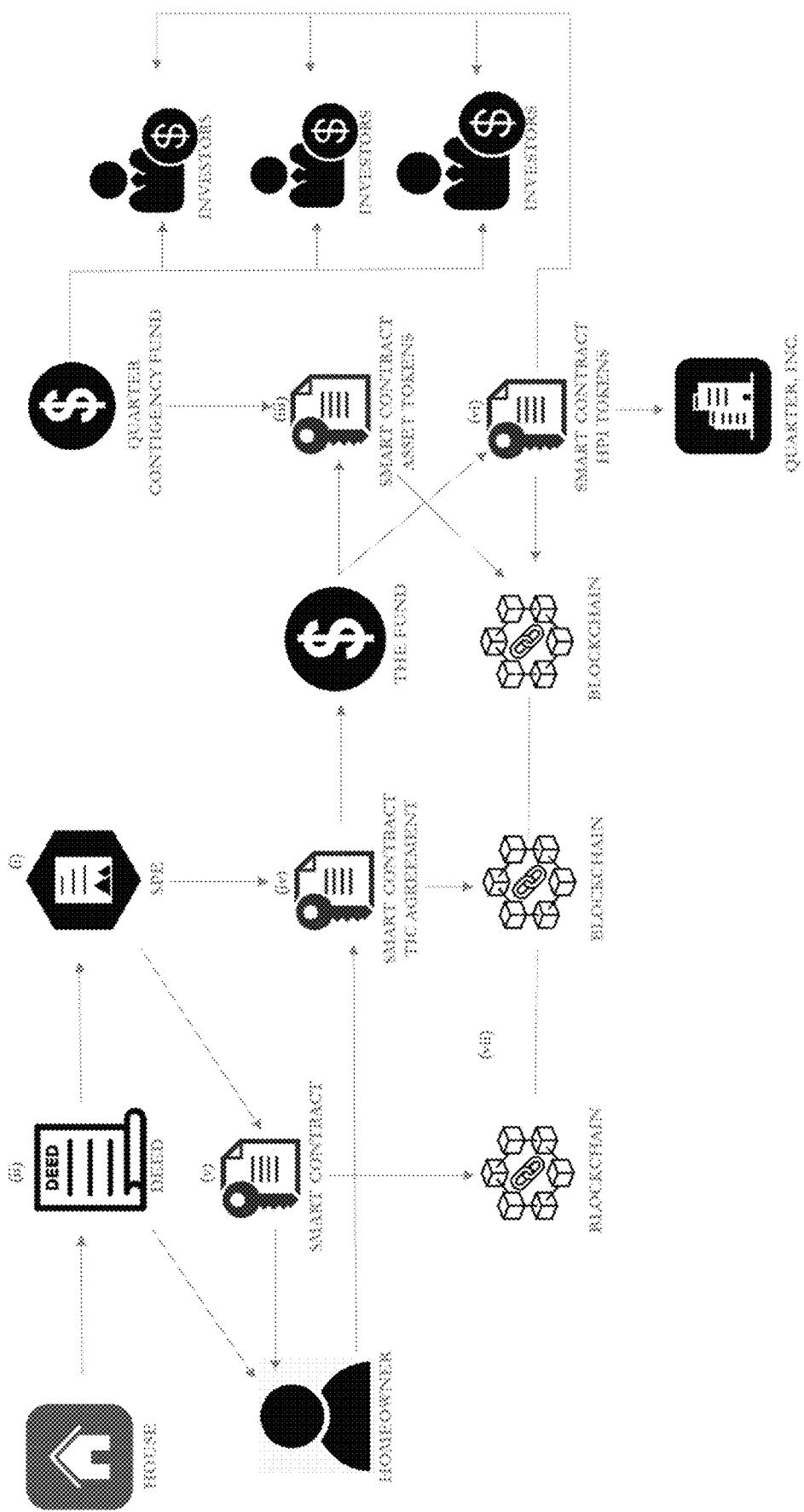

FIG. 29 illustrates an example overview of the use of smart contracts on the Platform in accordance with an embodiment. As reflected in the figure, the following is an example description of how smart contracts and blockchain can be used to board a House onto the Quarter platform.

(i) A SPE can be set up by the Fund to purchase a House as tenants in common with the Homeowner. The Fund can be the sole member of the SPE.

(ii) Ownership of the House can be granted to both the Homeowner and the SPE as tenants in common via a deed.

(iii) A smart contract can be created by the Fund which can issue Asset Tokens and rights to distributions from the specific House owned by the SPE. The Asset Tokens can be distributed to the Asset Token Purchasers and also to the Quarter Contingency Fund pursuant to this Memorandum.

(iv) A smart contract can be created between the Homeowner and the SPE, which can automate certain provisions under the TIC Agreement, including the Payments.

(v) A smart contract can be created by the Fund which can contain the assignment of the House Appreciation Right to the Fund and in exchange, the Fund can issue HPI Tokens which can be included in the sale of the Bundle. The HPI Tokens can represent the exposure and entitlement to the assets held by the fund in the HPI Asset Pool and can be distributed to the Investors and also to Quarter as described in this Memorandum.

(vi) All of the transactions can be recorded onto the Quarter Platform's blockchain.

Digital Wallets for Investors can be maintained and adjusted by Quarter, or a third-party provider retained by Quarter, and taxable income and loss can be apportioned appropriately. TOKO may be able to accommodate different types of custodian solutions which can include but are not limited to custody of tokens by third-party custodians, including regulated third-party custodians which can be licensed in multiple jurisdictions or self-custody of tokens by Investors. As the purchase money to acquire the TIC Interests in a particular House held by the respective SPE could come from different Investors. Investors can be paid different returns and cash flows through the Fund. Accordingly, distributions of proceeds can be tracked on an SPE-by-SPE basis per the Asset Token Purchasers' proportionate share in a particular SPE, while flowing through one entity—the Fund. The Fund can allocate the Asset Tokens based on the total number of Asset Tokens to be issued and the Asset Token Purchaser's total investment in proportion to the total investment to be made by all Asset Token Purchasers. The Fund can initially issue a certain number (e.g., 10) of HPI Tokens per Asset Token in connection with the Bundle. The Fund can reserve the right to change the number of HPI Tokens included in the sale of the Bundle from time to time.

Detailed Example of Boarding Homes on a Platform

Example Tokens and Methods of Use

Aspects of the disclosure include various tokens that may be used by the software in accordance with the example processes described in the steps below.

Occupancy Tokens

1) The occupancy token can be a non-fungible token which can be issued to a homeowner by an SPE upon execution by the occupant and the SPE of the TIC agreement and/or triple net lease and closing of the purchase of a TIC equity interest in the subject home. The occupancy token can confer certain rights and/or obligations upon the holder as described herein.

a) The occupant can have the right to occupy the home pursuant to a jurisdictionally specific tenants in common agreement and/or a triple net lease which can contain, for example, the following provisions:

i) The term can be perpetual unless terminated pursuant to pre-defined terms.

ii) Rent can be paid by the occupant via the platform to the SPE in an amount that can be calculated as the sum of the base rent, platform fee, accrued late fees, and/or repayments of advances.
   (1) In some cases, the rent payment can also include an impound for taxes, insurance and/or HOA fees.
      (a) The determination of whether there will be an escrow account impound may be based on an algorithm using various consumer and/or property data points and/or local jurisdictional requirements.
      (b) Any impounded escrow payments can be paid to a third-party escrow services provider.
iii) Unless embedded into the rent payment as part of an escrow impound, the occupant may pay, separately from rent, property taxes, hazard insurance premiums and/or HOA fees (including fines) as they become due directly to the appropriate taxing, insurance, and/or HOA authorities/agent(s).
iv) In addition to other payment requirements contained herein, the occupant may need to timely pay any obligation which may become a lien on the property, including but not limited to: water and/or other utility bills, code enforcement fines, special assessments, and/or contractors hired by occupant to perform work or services on the home.
v) The occupant may have an obligation to perform and/or pay for all routine maintenance of the property not covered under a home warranty, which may be provided under the terms of the TIC Agreement and/or the triple net lease agreement.
vi) If the occupant is not in compliance with the maintenance requirements (e.g., section 1(a)(v)) and/or does not cure non-compliance within a pre-defined number of days of notification of the non-compliance, then the occupant can be considered in breach and/or a third party contractor may be hired at the occupants sole expense to perform the necessary maintenance work to bring the home back into compliance, which costs can be due and payable by occupant and added to the amount of the next rent payment.
   (1) Any payment for third party contractors hired (e.g., under section 1(a)(vi)) which fall due prior to the next scheduled rent payment can be advanced from the retained risk pool and can be reimbursed by the occupant.
vii) Deductibles incurred under the terms of any home warranty program can be paid by the occupant.
viii) Rent payments can be paid in fiat currency.
ix) Late payment terms (fees and/or timing) can be determined.
x) The occupant can be required on each annual anniversary of their acquisition of the occupancy token to take and submit interior and exterior photos of the property using any computer. (Note that any element of the system can be managed by an administrator and/or accessed by a user using any computer or combination of computers (e.g., desktop computer, laptop computer, mobile computer).
xi) If the occupant does not comply with pre-set rules (e.g., section 1(a)(x)) within a pre-determined amount of time, the occupant can be notified of their non-compliance. If the occupant is still in non-compliance within a pre-determined amount of time after notification of non-compliance, a third party can be contracted to inspect the property and/or photographs and upload the photos. (Any extra costs associated with photos or any other issues related to the home or the system can be added to the amount of the next rent payment.)
   (1) Any payment for a third-party contractor hired under pre-defined criteria which may fall due prior to the next scheduled rent payment can be advanced from the retained risk pool and can be reimbursed to the retained risk pool when paid by occupant.
xii) Any obligations under pre-defined criteria (e.g., sections 1(a)(iii), 1(a)(iv), 1(a)(iv), 1(a)(vi), 1(a)(vii) and/or 1(a0(xi)) which are not paid within a pre-determined amount of time by the occupant can be paid on behalf of the occupant with funds advanced from the retained risk ool and may trigger an automated sale of an amount of excess equity sufficient to reimburse the network for advancing the defaulted payment(s).
xiii) In the event that there is not sufficient excess equity to fully reimburse the retained risk pool for advances pursuant to pre-defined rules (e.g., section 1(a)(xii)), a lien may be placed on part of, or the entirety of the occupant's minimum retained equity for the amount of the shortfall.
xiv) Any payment obligations pursuant pre-defined rules (e.g., section 1(a)(ii)) which are not paid within a pre-defined amount of days by occupant shall be paid on behalf of the occupant with funds advanced from the retained risk pool and may trigger an automated sale of an amount of excess equity sufficient to reimburse the network for advancing the defaulted payment(s).
xv) If the event that there is not sufficient excess equity to fully reimburse the network for advances pursuant to pre-defined rules, then a lien can be placed on the entirety of the Occupant's Minimum Retained Equity for the amount of the shortfall.
xvi) Placement of a lien (e.g., pursuant to 1(a)(xiii) or 1(a)(xv)) can trigger an eviction proceeding, revocation of the occupancy token, sale of the home, or dissolution of the TIC agreement, or any combination thereof. Local law can be used to determine the eviction proceedings, etc.
b) The occupancy token can confer rights to purchase and/or sell fractional equity as follows:
   i) In order to exercise any put or call rights, occupant may need to be in compliance with all lease obligations.
   ii) The occupant can purchase additional fractions of their home at any time at the current valuation if the amount ($) or % (fractional amount) is <=a pre-determined amount or at the current enhanced valuation if higher.
   iii) The amount of equity to be transferred can be calculated by dividing the relevant valuation (e.g., current or enhanced) by the amount in fiat currency (e.g., USD) of payment excluding any transfer taxes or other fees and the network transfer fee. Equity can be divisible to 0.001 of the valuation (e.g., current or enhanced) and can be transferred by amendment of the TIC deed. Total payment made can be the sum of the equity purchase, plus transfer taxes or fees, and the network transfer tee and can be paid by occupant in fiat currency (e.g., USD).

iv) The occupant can also sell excess equity in their home at any time at the current valuation if the amount ($) or % (fractional amount) is <=a predetermined amount or at the current enhanced valuation if higher.

v) The amount of equity to be transferred can be calculated by dividing the relevant valuation (e.g., current or enhanced) by the amount of fiat currency (e.g., USD) the homeowner can wish to receive, plus any transfer taxes or fees, and the network transfer fee. Equity can be divisible to 0.001 and can be transferred by amending the TIC deed and can be recorded subject to an escrow agreement with a third-party title company or other provider of settlement services. The amount of funds received by the occupant can be net of any transfer taxes or fees, and the network transfer fee and can be settled to occupant in fiat currency (e.g., USD).

c) The occupancy token can confer upon the occupant the right to sell the home in its entirety as follows:

i) The occupant can give notice to the investor(s) of their intent to sell the home and the price at which the home shall be listed.

ii) Upon receipt of the intent to sell and the initial listing price, the investor(s) can have a right of refusal to purchase the property at the initial listing price for a pre-determined amount of time.

iii) Upon expiration of the right of first refusal, the occupant may list the property with the realtor who is a network preferred provider.

iv) Notwithstanding section 1(c)(iii) herein, if the occupant is a licensed realtor, they may act as the listing agent provided they are in compliance with all pre-defined terms and conditions. However, they may only receive a commission based on their pro-rata TIC interest of the home. Further, they may only offer a buyer agent commission less than or equal to a pre-determined amount(e.g., %) of the sales price.

v) Occupant may use listing and purchase contract addendums provided by the platform, which may state that any liability incurred as a result of occupants breach of the listing and/or sales agreement (e.g., such as a specific performance claim, etc.) cannot attach to the home, and may release and/or otherwise indemnify the investor(s) from any claims related to the listing and/or sale.

vi) Upon notification of a receipt of an offer which is acceptable to the Occupant and/or is below the list price, the investor(s) can have a right of first refusal for a pre-determined amount of time to match the offer.

vii) Upon notification by the occupant of receipt of an offer which does not trigger the right of first refusal in section 1(c)(vi), and/or if the investor(s) decline the right of first refusal, and/or the new buyer wishes to use the platform to purchase the home and is qualified to do so, the investor(s) may have a pre-determined amount of time to decide if they wish to retain their interest and/or include it in the sale.

(1) A decision by investor(s) to retain their interest in the property may not guarantee that they will retain the same percentage interest as they held previously, as the precise amount of their holdings may be based on the amount that the new occupant purchases relative to what the original Occupant was holding at the time of sale. Equity reallocation may be done pro-rata among all previous investors wishing to retain their interest.

viii) In the event that the home may be sold to a buyer who uses the platform, the rent and base rent can be recalculated based upon the sale price of the home. This can be true even if the existing investor(s) choose to retain their ownership interest.

ix) Realtor commissions for the sale of the property can be deducted from the occupant's settlement proceeds with a credit of a pre-determined amount (e.g., 0.00041677%) of the contract sales price for each month the occupant has held their Occupancy Token, up to a maximum of 96 months. Capital for the credit can come from the real estate commission fund.

x) The occupant can be assessed an exit fee in the amount of a pre-determined amount (e.g., 1% of the sale of the home) unless the occupant uses the proceeds to immediately purchase another home on the platform in which case the fee shall be a pre-determined amount (e.g., 0.5% of the amount of the sale of the home).

xi) In the event that the home may be sold to a buyer who may not use the network to fund their acquisition, the occupancy tokens (and/or asset tokens) can be redeemed and/or burned, and the TIC Agreement can be terminated and the SPE can be dissolved.

xii) Settlement of the home sale can occur in US fiat currency.

2) The occupancy token can confer rights upon the holder to make capital improvements to the home and to benefit from those improvements.

a) Occupants can notify the platform as manager of the SPE not less than a pre-determined amount of time in advance of any plans to make capital improvements to the home.

b) A current enhanced valuation can be ordered by the platform to determine the pre and post improvement valuation of the home in order to calculate the capital improvement value. The post improvement valuation can require an onsite inspection to confirm the work has been completed.

i) Occupant can bear the costs for the valuations.

c) The capital improvement value can be calculated by subtracting the post improvement value from the pre improvement value.

d) The TIC agreement can be amended to allocate the capital improvement value to the net proceeds that the occupant can receive upon sale of the home.

Asset Tokens

3) The asset tokens can be a fungible token issued by the SPE which can confer certain rights and obligations on the holder described herein.

a) The asset tokens can represent ownership in the home for any combination of the following:

i) A SPE can be the named entity on the TIC deed on behalf on the investor(s) and can hold the real estate interest.

ii) The special purpose entity can initially be a Limited Liability Company (LLC) but could also be a Delaware Statutory Trust (DST), Series LLC, Land Trust or other entity legally entitled to hold real property in the jurisdiction in which the home is located.

iii) There may be >1 SPE named on the TIC deed for a home, for example both an LLC and a DST.

iv) Asset tokens can be allocated to investors on a pro-rata basis in the same proportion as their ownership in the SPE and can be issued in exchange for a fiat currency investment (USD) in the SPE.

(1) The platform may decide to accept other payments, such as stable coins or other fiat currencies in the future.

v) The token holder may have pre-determined governance rights in the SPE.

b) The holders of asset tokens may have any combination of the following rights:

i) Right to receive rent payments pursuant to their proportional ownership in the SPE as calculated using a formula which can multiply the sum of the base rent and, subject to section 3(b)(1), any late fees, by the proportional number of asset tokens owned.

(1) Late fees paid to occupant can be distributed to the holders of asset tokens proportionally to their holdings unless the underlying payment which generated the late fees was advanced by the retained risk pool in which case the late fees can be distributed to the retained risk pool.

(2) Payment can be settled in fiat currency (USD), or optionally in other crypto currencies such as USDC, as may be decided by the platform from time to time.

ii) Right to receive HPI tokens on a pro-rata basis in the same proportion as their ownership of Asset Tokens.

iii) Payments of net proceeds from any sale of the home owned by the SPE, proportionally to their ownership of asset tokens.

iv) A real estate commission free sale can be provided to the SPE in the event of voluntary or involuntary (e.g., occupant default) sale of the entire property except as provided in section 3(b)(iii)(1) below.

(1) In the event that the real estate agent or broker is chosen by the SPE owners (e.g., to the extent such a choice is allowed or required), and/or such agent or broker is not a network preferred provider, then the commission credit shall be capped at a maximum of 4% of the sale price.

v) Asset token holders can receive uninterrupted rent payments in the event of an occupant default to the limit of the assets held in the retained risk pool.

vi) Asset token holders can not be required to fund any out-of-pocket expenses related to occupant default to the limit of the assets held in the retained risk pool.

vii) Funds for advancing payments and/or expenses (e.g., detailed in sections 3(b)(iii), 3(b)(iv), and 3(b)(v)) can be provided on behalf of the SPE by the platform using any combination of assets held in the retained risk pool.

viii) The initial holder of asset tokens which may be offered subject to US securities laws may be resold after a pre-determined amount of time (e.g., twelve (12) month) holding period unless the holder is a QIB in which case they can resell the tokens to another QIB without any holding period. After the holding period expires, holders can be free to trade with both accredited and/or unaccredited investors on a secondary exchange.

ix) There can be a right to encumber asset tokens for leverage purposes.

x) The occupant can have the right, subject underwriting guidelines, to sell a portion of their TIC holdings (e.g., known as excess equity). The asset token holders can be notified of the sale and can have the right but not obligation to purchase additional asset tokens being sold by the SPE to raise the capital to purchase the TIC interest from the occupant. Should more than one asset token holder request to purchase additional asset tokens, then the amount of asset Tokens can be divided and/or sold proportionally between them based on the amount of asset tokens owned immediately prior to the proposed transaction.

c) The holders of asset tokens can have the following obligations:

i) So long as they are in compliance with all obligations as the holder of the occupancy token, the occupant may request at any time to purchase any fractional TIC amounts of their home from the SPE which may need to be honored.

ii) Any transaction conducted pursuant to Section 3(c)(i) can be transacted at the current valuation of the home if the pre-determined amount (e.g., $ or % (fractional amount) of the transaction is below a pre-determined amount, and/or at the current enhanced valuation if higher (also see section 1(b)(ii) herein)).

iii) Net proceeds from any sale conducted by the SPE pursuant to Section 3(c)(i) hereunder may be distributed to asset token holders on a pro-rata basis. Net proceeds can be calculated under pre-determined rules. For example, as the total amount paid by the occupant minus the transaction fee and less any other costs of sale or transfer (recording fees, title costs, transfer taxes, etc.).

iv) Transfers of TIC interests from the SPE to the occupant can be recorded on an amended deed and recorded subject to an escrow agreement with a third-party title company or other provider of settlement services.

HPI Tokens

4) HPI tokens can be a fungible token issued by (a bankruptcy (BK) remote SPE which can exist for the purpose of holding the HPI equity pool assets and issuing the HPI tokens OR by the SPE which has contracts with the BK remote SPE such that each SPE can issue the HPI tokens independently). HPI tokens can be backed by a pool of equity generated by appreciation of every home (or a subset of homes) on the platform. The ownership of this equity can be transferred to the HPI equity pool by the asset token holders in exchange for HPI tokens.

a) HPI tokens can be issued contemporaneously with asset tokens when a home can be initially boarded onto the platform.

i) HPI tokens issued with asset tokens can be locked when issued and/or can remain so unless they are unlocked pursuant to 4(d)(i) of this section.

ii) Locked HPI tokens may not be separable from asset tokens and may transfer as part of any secondary transfers which occur subsequent to issuance.
iii) A contract can be created with the SPE at the time a property is boarded which can assign the value of the home appreciation to the HPI asset pool, which can be collected upon sale and exit of the home from the platform.
b) The platform can establish predetermined time periods, known as HPI Intervals, when it can update the valuation of each home on the platform for the purpose of calculating the change in the value of each home during that period.
c) At a designated time at the end of each HPI Interval, the home price appreciation (HPA) or home price depreciation (HPD) can be calculated. The calculation can be the difference between the valuation conducted at the end of the previous HPI Interval and the valuation conducted at the end of the current HPI Interval.
  i) In the event that a home was boarded onto the platform during the current or immediately preceding HPI Interval and/or the occupancy token was transferred to a new occupant during the current or immediately preceding HPI Interval, then the valuation of the home at the time of boarding or transfer shall be substituted for the previous HPI interval valuation.
    (1) Pro-rata adjustments can be made if the first period is within a pre-determined amount of time.
d) In the event that the valuation at the end of the current HPI Interval exceeds either the valuation at the end of any previous HPI Intervals, which have occurred during the tenure of ownership of the current asset token holder, and/or the value at boarding and/or transfer as described in section 4(c)(i), then this valuation can also be designated as the HPI high-water mark.
e) In the event that the valuation for the current HPI interval does not exceed the HPI high-water mark, then no HPI tokens may be unlocked.
f) In the event that the current valuation falls below the HPI high-water mark as a result of one or more periods of HPD and/or the asset token can be transferred to another owner:
  i) The high-water mark can be removed.
  ii) The new owner's future right to unlock HPI tokens can be based on HPA calculated pursuant to section 4(c), starting with the valuation from the most recent HPI Interval prior to the transfer to the new owner.
  iii) The original asset token nominal value can be replaced with the current adjusted asset token nominal value which can be calculated as the proportional value of asset tokens based on the lesser of the current valuation at time of transfer and/or the valuation at the end of the most recent HPI interval.
g) If the HPA for the current period is >0 and the current valuation at the end of the period is greater than the high-water mark, then HPI can be unlocked based on the following formula:
  i) The number of HPI tokens unlocked for each asset token can be computed by dividing the lesser of either the total HPA (e.g., in USD) minus the HPI high-water mark (e.g., in USD) or the total HPA (e.g., in USD), by the market price of the HPI tokens (e.g., also in USD) then multiplying the quotient by the HPI realization percentage (e.g., initially set at 90%) and then dividing the product by the total number of asset tokens held by investors.
h) When a home which has appreciated sufficiently to cause issuance of HPI tokens pursuant to this section is sold, the net proceeds from the sale, which the HPI token pool can be entitled to receive pursuant to the issuance of HPI tokens can be utilized to purchase HPI tokens which can then be burned.

Underwriting Procedures
Property Diligence
5) A standard set of diligence on every property can be conducted prior to such property boarding onto the network:
  a) The current market value can be determined using a variety of possible methodologies. As defined in this document, there may be at least two tiers of valuations which may be utilized within the network: current valuation and/or current enhanced valuation.
    i) Current valuations can be the default valuation of record within the system and/or can be performed using a best in class pre-determined third-party AVM.
    ii) Enhanced valuations can be used in place of current valuations when certain trigger events occur. An enhanced valuation may include any combination of AVMs, physical appraisals, brokers price opinions, sales contracts, asset token sales, or other pre-determined relevant inputs.
    iii) All valuations can be independent and provided to the network by non-affiliated third parties.
  b) The physical condition of the property can be evaluated and documented. There can be a standard set of pre-determined inspections (e.g., wood destroying insects, radon testing, septic tank inspections, water quality, mold, private well inspection) supplemented by local practice which can be determined on a jurisdictional level. Any combination of inspections can be incorporated into a single home warranty inspection certificate and/or policy.
    i) Physical condition can be determined using best in class products and services utilizing independent third-party providers.
  c) Title to the property can be examined and a title insurance policy can be issued in order to ensure that both the occupant and/or SPE have an unencumbered interest after the closing occurs and can be protected by insurance in the event of a defect in the title. This can be true in both a new purchase and when an existing homeowner boards the home they currently own onto the platform.
    i) In the case of a new purchase, an ALTA owner's title insurance policy may need to be purchased.
    ii) In the case of an existing homeowner boarding the home they currently own an ALTA owner's title insurance policy may also needs to be purchased (e.g., only to the extent that the SPE needs to be covered given that the occupant is already on title).
    iii) Any necessary endorsements (e.g., survey, flood, environmental, etc.) can be made.

iv) Title can convey to the SPE and Occupant and the policy can form the starting basis of the blockchain ledger for ownership tracking.
v) Title insurance vendors can be independent and/or unaffiliated with the network.
d) All property diligence described in this section can be archived within the platform and/or its underlying blockchain.

Occupant Diligence

6) The following diligence can be performed for each future occupant (and/or current applicant(s)) as part of the application process before they are approved to board onto the network and are issued an occupant token:
   a) An applicant credit review can be conducted by running a third party, tri-bureau credit report which can be used to determine:
      i) The FICO (any version of FICO can be used). The minimum can be a pre-determined amount (e.g., 620) to qualify. Credit scores can be retained and accessible to pre-determined parties. A vendor can be required to store this information on the platform's behalf for a pre-determined amount of time.
   b) Income for the applicant(s) can be determined by:
      i) In the case of a TrueConnect applicant, the payroll census file to the extent that that is the only source of income needed for qualification.
      ii) By utilizing an independent, third-party income verification service.
   c) A back-end debt to income ratio can be determined for each applicant/application by any combination of:
      i) Gathering data from the application(s).
      ii) Gathering data from the credit reports.
      iii) Discrepancies in liabilities between the application and/or credit reports can be reconciled by using an independent third-party verification service.
   d) The amount of minimum retained equity can be determined by an algorithm which can use the applicants credit score, back-end DTI, risk pool composition, or property specific data as inputs, or any combination thereof. The minimum retained equity can be used to calculate the minimum down payment required by the applicant to close the transaction.
      i) In the case of a new purchase, the applicant can have the ability to transfer the amount of fiat currency (e.g., USD) equal to the value of the minimum retained equity to (e.g., the settlement agent or another party) in order to proceed with the approval. The applicant may need to actually transfer the money, show the funds in an account, or verify with a third party (e.g., Finlocker, or a third-party asset verification service).
      ii) In the case of an existing homeowner boarding a home they currently own, there may need to be equity in the property after closing which is equal to or greater than the minimum retained equity requirement.
      iii) Notwithstanding sections 6(d)(i) and 6(d)(ii) above, a portion of the homeowners minimum retained equity may be provided in part by an impact investor as described in section 7 herein.

Impact Investing on the Platform

7) In order to facilitate home purchases by applicants who would not otherwise qualify to purchase a home, the platform can have an infrastructure which can allow impact investors to leverage the platform to assist those applicants.
   a) Any requirement that the occupant must fund the minimum retained equity as described in section 6(e)(i) can be modified to allow the impact investor to assist with funding the minimum retained equity.
   b) The minimum credit score requirement described in section 6(a)(i) can be waived in order to allow the impact investor to set their own minimum qualification criteria.
   c) The impact investor may purchase asset tokens in an amount computed as the minimum retained equity less the amount of equity purchased by the occupant, provided that occupant must purchase not less than a pre-determined amount (e.g., % of the equity at closing) from their own funds.
      i) Asset tokens purchased by an impact investor can be locked and may only be unlocked when any combination of the following occurs:
         (1) The occupant purchases equity from the impact investor, in which case a corresponding number of asset tokens can be unlocked, redeemed and/or transferred to treasury; or
         (2) The occupant chooses to exercises their right to sell the property, in which case the asset tokens can be (a) unlocked, redeemed and/or burned after distribution of the proceeds of the sale of the property in the event that the home leaves the network (e.g., the new purchaser chooses not to use the platform) or, (b) unlocked, redeemed and/or transferred to treasury after distribution of net proceeds from the sale; or
         (3) The occupant is in default and the home is sold in which case the asset tokens can be (a) unlocked, redeemed and/or burned after distribution of the proceeds of the sale of the property in the event that the home leaves the network (e.g., the new purchaser chooses not to use the platform), and/or (b) unlocked, redeemed and/or transferred to treasury after distribution of net proceeds from the sale.
      ii) Impact investors asset tokens can be entitled to pro-rata distribution of net proceeds in the event of sale of the home pursuant to sections 6(b)(i)(2) and 6(b)(i)(3) subject to the following formula:
         (1) Net proceeds from sale less any advances made by the platform pursuant to Sections 3(b)(iii), 3(b)(iv), and 3(b)(v) herein plus any recovery from sale of the occupant's TIC interests in the home.
   d) Asset tokens held by impact investors can be entitled to their pro-rata share of the rent plus 100% of the enhanced rent paid by the occupant.
      i) A portion of the enhanced rent payment can be used to purchase additional TIC interests in the home from the impact investor's holdings in the SPE.
      ii) Upon purchase of TIC interests equal to the entirety of the impact investors holdings in the SPE, enhanced rent payment obligations of the Occupant can terminate.

Boarding onto the Network

Parties and Initial Transactions

Figure 11:
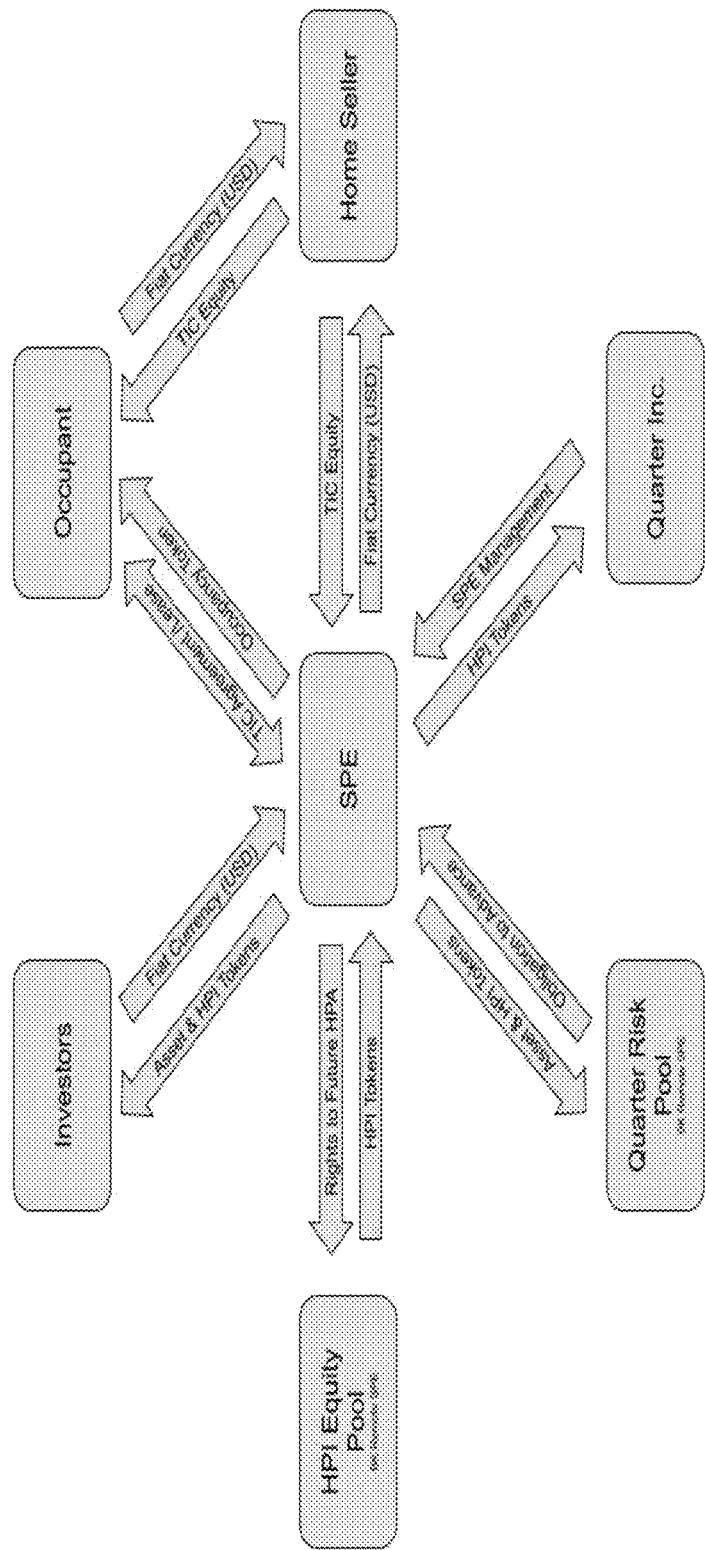

8) FIG. 11 is an illustration of the parties and transactions that can be required to board a home onto the platform.

a) Seller can be the individual or entity who is selling a home which may be purchased by the occupant and the SPE and boarded onto the platform.
   i) The seller can receive fiat currency (e.g., USD) from the occupant pursuant to a real estate closing and can issue a warranty deed to the occupant as one of two Tenants in Common.
   ii) The seller can receive fiat currency (e.g., USD) from the SPE pursuant to a real estate closing and/or can issue a warranty deed to the SPE as one of two tenants in common.
   iii) Beyond the real estate transaction, the Seller may not need to have no affiliation and/or ongoing relationship with the platform or any of the other parties.
b) Occupant can be the consumer who initiates the acquisition of the property and/or becomes the holder of the occupant token.
   i) The occupant can pay fiat currency (e.g. USD) to the seller pursuant to the real estate purchase transaction and/or in return can receive a warranty deed granting occupant a tenants in common interest in the home.
   ii) The company that owns the platform that connects and/or manages the relationships and transactions between all of the parties can set up the SPE and/or manage the ongoing administrative functions on behalf of the other SPE owners and in return, can be allocated HPI tokens by the SPE.
c) Investors can be the providers of capital to the SPE, which can enable the SPE to purchase an interest in the home alongside the occupant.
   i) The investors can purchase asset and HPI Tokens from the SPE, which can be paid for in fiat currency (USD).SPE can be the entity which can own the real estate interest on behalf of the investors.
   ii) The SPE can sell asset tokens to investors who can purchase them in fiat currency (USD)
   iii) The SPE can purchase an interest in the home from the seller in fiat currency, and in return can receive a warranty deed granting the SPE a tenants in common interest in the home.
   iv) The SPE can execute a tenants in common agreement and/or a triple net lease with the occupant, and in consideration, can issue the occupancy token.
   v) The SPE can enter into a contract granting the rights to a proportional share of all future appreciation to the HPI pool and in consideration can be issued HPI Tokens by the HPI pool.
d) The HPI pool can be a BK remote SPE which can receive all of the future HPI gains from the SPE in exchange for issuing HPI tokens to the SPE.
e) The Risk Pool can be a BK remote SPE which can enter into a contract to advance rent and default costs to the SPE, and in consideration can be issued asset tokens by the SPE.

Parties and Transactions

Figure 12:
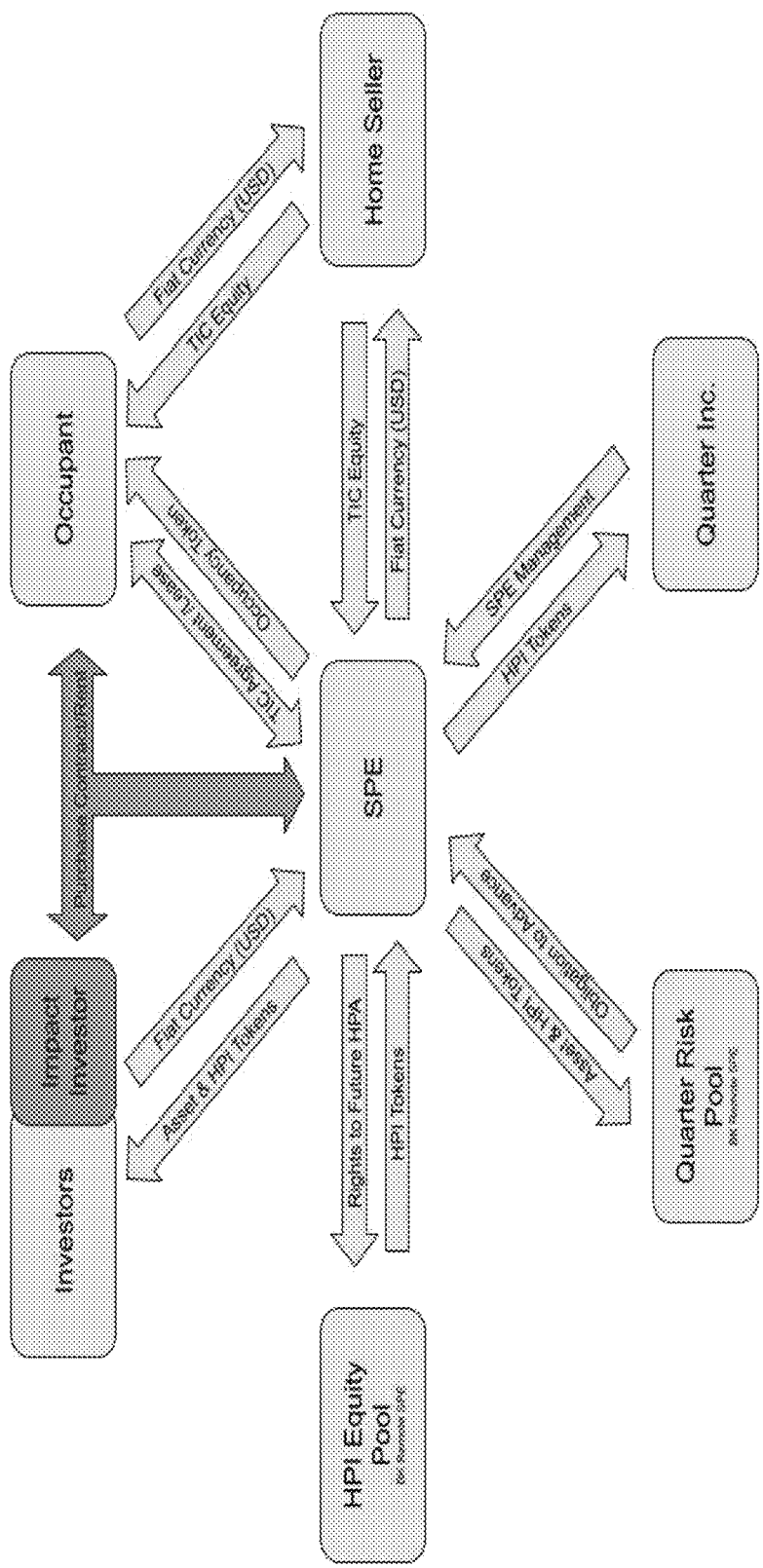

9) FIG. 12 is an illustration of example parties and/or transactions that can be required to board a home onto the platform in the impact investor program.
   a) Seller can be the individual or entity who is selling a home which may be purchased by the Occupant and the SPE and boarded onto the Quarter Platform.
      i) The seller can receive fiat currency (e.g., USD) from the occupant pursuant to a real estate closing and/or can issue a warranty deed to the occupant as one of two tenants in common.
      ii) The seller can receives fiat currency (e.g., USD) from the SPE pursuant to a real estate closing and/or can issue a warranty deed to the SPE as one of two tenants in common.
      iii) Beyond the real estate transaction, the Seller may not need to have any affiliation or ongoing relationship with the platform (or the platform owner and/or manager) or any of the other parties.
   b) Occupant can be the consumer who can initiate the acquisition of the property and/or can become the holder of the occupant token.
      i) The occupant can pay fiat currency (e.g., USD) to the seller pursuant to the real estate purchase transaction and in return can receive a warranty deed granting occupant a tenants in common interest in the home.
      ii) The occupant can enter into an agreement with the impact investors and/or the SPE to:
         (1) purchase an amount of the SPE's interest which can be equal to the impact investors proportional ownership in the SPE; and
         (2) pay an additional amount each month to the SPE, a portion of which can be used to fund the purchase described in section 9(b)(ii)(1) and the balance being allocated to the impact investors as additional rent.
   c) The company which owns the platform that can connect and/or manage the relationships and/or transactions between all of the parties.
      i) The company can set up the SPE and/or manage the ongoing administrative functions on behalf of the other SPE owners and in return, can be granted HPI tokens by the SPE.
   d) Investors can be the providers of capital to the SPE which can enable the SPE to purchase an interest in the home alongside the occupant.
      i) The investors can purchase asset and/or HPI tokens from the SPE which can be paid for in fiat currency (e.g., USD).
   e) Impact investor can be a capital provider to the SPE and/or benefactor of the occupant who can purchases asset tokens from the SPE in, for example, not less than the amount which is equal to the occupant's MRE less the amount of TIC interests the occupant purchases.
      i) The impact investor can enter into an agreement with the SPE and/or the Occupant with the following terms:
         (1) The impact investor can guarantee the performance of the occupant and/or pledge the asset tokens it owns to the SPE.
         (2) In exchange for a supplemental rent payment each month, the impact investor can sell to the SPE a portion of their asset tokens equal to the amount of TIC interest purchased each month by the Occupant.
         (3) The Impact Investor may not be entitled to HPI tokens under pre-determined circumstances.
   f) SPE can be the entity which owns the real estate interest on behalf of the Investors.
      i) The SPE can sell asset tokens to investors who can purchase them in fiat currency (e.g., USD).
      ii) The SPE can also sell asset tokens to impact investors who can purchase them in fiat currency (e.g., USD).

iii) The SPE can purchase an interest in the home from the seller in fiat currency and/or in return receives a warranty deed granting a tenants in common interest in the home.
iv) The SPE can execute a tenants in common agreement and/or a triple net lease with the occupant and in consideration, issues the occupancy token.
v) The SPE can enter into a contract granting the rights to a proportional share of all future appreciation to the HPI Pool and in exchange ca be issued HPI tokens by the HPI pool.
vi) The SPE can enter into an agreement with the impact investors and the occupant which can have any combination of the following provisions:
   (1) The SPE can receive an additional payment amount each month from the occupant, paid in fiat currency (e.g., USD), a portion of which can be designated as the purchase additional TIC interests and/or the remainder can be paid to the impact investor as additional rent which can be supplemental to the proportional amount they are entitled to based on ownership of asset tokens.
   (2) Fiat currency received from occupant pursuant to section 9(f)(vi)(1) can be used to redeem asset tokens owned by the impact Investor proportionally to the TIC interests purchased by the occupant.
   (3) Asset tokens owned by the Impact Investor may not need to be entitled to HPI tokens
   (4) Asset tokens owned by the impact investor can be pledged to guarantee occupant's performance.
g) HPI pool can be a BK remote SPE which can receive all of the future HPI gains from the SPE in exchange for issuing HPI tokens to the SPE.
h) Risk Pool can be a BK remote SPE which can enter into a contract to advance rent and/or default costs to the SPE and in consideration is issued asset tokens by the SPE.

Services

10) The following services can be provided in order to board a property and occupant onto the network:
a) Consumer diligence (e.g., third party underwriter such as Evolve)
   i) Credit analysis (e.g., credit report and scores)
   ii) Capacity to repay analysis (e.g., income verification/assets if asset depletion)
   iii) Asset verification (e.g., down payment)
   iv) Know your customer (KYC)/anti-money laundering (AML)/etc.
b) Property diligence
   i) Valuation determination (e.g., AVM, other as required)
   ii) Property condition (e.g., inspections)
c) Settlement agent can provide one or more of the following services:
   i) Doc prep and review (e.g., TIC deed, closing statements, etc.)
   ii) Lien payoff calculations
   iii) Tax and other proration calculations
   iv) Notary services
   v) Funds escrow accounts and make disbursements
   vi) Document recording
   vii) Trailing docs
d) Title Insurance Company
   i) Title exam and commitment issuance
   ii) Policy issuance
e) Home warranty
   i) Policy or contract issuance
f) Hazard Insurance
   i) Policy issuance
g) Escrow impound account
   i) Setup and funding
   ii) Ongoing management and reporting
h) Servicing
   i) Via Quarter Platform if not in default
   ii) Special servicing company if in default
i) SPE Setup and governance
   i) Quarter can perform the necessary tasks to setup and manage the SPE
      (1) Locally compliant
      (2) Ongoing admin and governance
   ii) Token Issuance
      (1) SPE can issue the Occupancy and Asset Tokens upon receipt of (TDB)
      (2) HPI Asset Pool SPE can issue the HPI Tokens.

Other Example Aspects of the Disclosure

Methods and systems can be provided for performing a transaction via asset tokens and a blockchain based smart contract. The methods and systems can comprise creating a fractionalized risk pool for a single family home, the fractionalized risk pool comprising at least two token types issued using blockchain, each token type purchasable by investors; selling the at least two tokens to the investors using blockchain; and distributing payments to the investors using blockchain. Multiple single-family homes can be combined together for investment purposes. The single-family home(s) can be an occupied single-family home(s). The tokens can be blockchain based smart contracts. The tokens can entitle token holders to certain financial rights in a home. The token types can comprise: an asset token, an HPI token or an occupancy token, or any combination thereof. The asset token(s) can be issued to an investor(s). The HPI token(s) can be issued to an investor(s) and sit in an HPI pool, and HPI tokens can be unlocked and transferred to the asset token holder (e.g., inventor(s) when certain conditions are met. The occupancy token can be provided to the occupant of the single-family home. Some or all of the tokens can be resold or retraded.

The methods and systems provided herein can have many benefits, depending on the embodiment used. For example, home buyers who do not have the required down payment can now purchase a home and use investors to fund the down payment. Homeowners who don't have the equity and/or MRE to refinance can use investors to help facilitate refinancing. Investors who purchase the tokens can invest in the single-family home market in a way that may not have been previously available. New asset classes can be made available to investors that were not previously available. Rent control issues may be avoided and/or mitigated. Many types of risk mitigation can be made available (e.g., because of the fractionalization, risk assessment can also be fractionalized). Homeowners can also use the system to access equity in their home (e.g., in incremental amounts).

The methods and systems can also comprise receiving a transaction request for an asset token; checking inventory of an asset associated with the asset token; performing a transaction associated with the transaction request when enough inventory is available, wherein the transaction includes transfer of asset tokens between entities; and recording the transaction in a blockchain based smart contract. This can allow automation of matching requests for those who wish are or obligated to sell with those who wish or are obligated to acquire the asset token. This can also allow automated and/or enforceable compliance with contractual obligations. This can create a secure and/or immutable record of each of the transactions, thus creating a chain of title which is difficult to contest. This can enable use of an algorithm to determine which tokens are included in the transaction requisition and which ones to exclude. For example, FIFO (first in first out), pro-rata, etc.

Transfer of asset tokens can be done by an entity to change a proportion of the asset owned by the entity. This can allow for automation of legacy transfer processes by removing many of the manual, labor-intensive, and offline steps, and therefore can do at least one of: lower costs as a result of simplifying the transfer processes, speed up the time to consummate a transfer; simplify any post-transfer accounting and audit requirements for a transfer, and enable rapid reallocation of benefits derived from ownership.

The asset tokens can be based on real property. This can enable creation of a dynamic marketplace for real estate which can do at least one of: create liquidity in previously illiquid assets; reduce transaction costs associated with real estate transfers; provide the opportunity to democratize investment in real estate assets by lowering the minimum investment threshold, thus allowing many more investors to participate; and opens the opportunity to a global audience. This can also help create opportunities for financial engineering constructs which may be unavailable with standard real estate transactions, thereby lowering to or reallocating the costs of capital to the participants. This can also enable participation from industry participants, such as title insurance companies and valuation companies, to expand their markets by participating in an ongoing series of small transactions that can occur intraday (think the stock market) versus legacy real estate's larger but infrequent singular transactions, such as purchasing a home, the frequency of which may be measured in years.

The transaction can be performed between an occupant of the real property and an investor of real property. This can occur indirectly by using fiat currency paid by the occupant to the issuing entity (SPE) in exchange for TIC interests. The SPE can then uses the fiat currency to purchase (e.g., redeem) asset tokens from the investors, deactivates them and then transfer them to treasury. This can allow for transfer of TIC interests between an unaccredited Occupant and holders of the Asset Token who will initially be accredited investors (if US based).

The transaction can include rent payment by the occupant to the investor by transferring the asset tokens such that the rent payment is based on a proportion of asset tokens owned by the investor. Each investor can be entitled to a pro-rata amount of the rent paid by the occupant based on the proportion of the asset tokens they own. This can enable periodic payments or the proportional rent to the owner of asset tokens which could occur in fiat currency or other cryptocurrencies such as a stablecoin, Bitcoin, etc. This can also facilitate payments by tracking ownership of asset tokens and recording such payments on an immutable blockchain ledger. This can also enable creation of multiple cash flow waterfalls based on ownership of asset token ownership. This can also enable creation of risk mitigation strategies by allocating asset tokens to funds and/or pools specifically designed for risk mitigation purposes.

The rent payment can change based on a change in the proportion of TIC owned by the occupant. This can help enable a dynamic rent calculation to occur. Unlike traditional real estate financing methods where payments tend to be fixed regardless of prepayments or current balance of the obligation, basing the rent payment on the proportional amount of the TIC interests owned by the occupant can help enable real time payment changes to occur. For example, a homeowner paying rent at a 4.39% annualized rate to the investors could purchase $1,000 of additional equity in their home, immediately changing the proportion of their TIC interest, and see their monthly payment instantly fall by $3.66 per month. From the Occupants perspective, this can provide an immediate return on their investment as their rent payments are reduced in real time as they increase the proportion of the TIC they own. On the flip side, an investor can also realize an immediate return should they increase their proportional holdings in the TIC via Asset Token purchases. In both examples, the reverse is also true.

The transaction can include a change in TIC between the occupant and the investor. This can help enable investors to hold positions in owner occupied single family residential real estate for the first time ever. This asset class may not currently exist as a current method for an investor to gain access to the single family residential real estate market is to hold positions directly or indirectly in rental properties which can require property management and other operational overhead to manage the non-owner occupied tenancies. This can enable the occupant to access equity in their home above the minimum required equity threshold in real time and at an exceptionally low cost. This can eliminate the need for refinancing a home by converting home ownership into cash.

Figure 13:
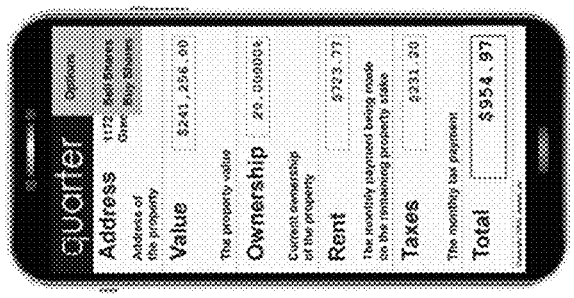
FIG. 13 is an example screen shot, according to aspects of the disclosure.
Figure 15B:
Figure 19:
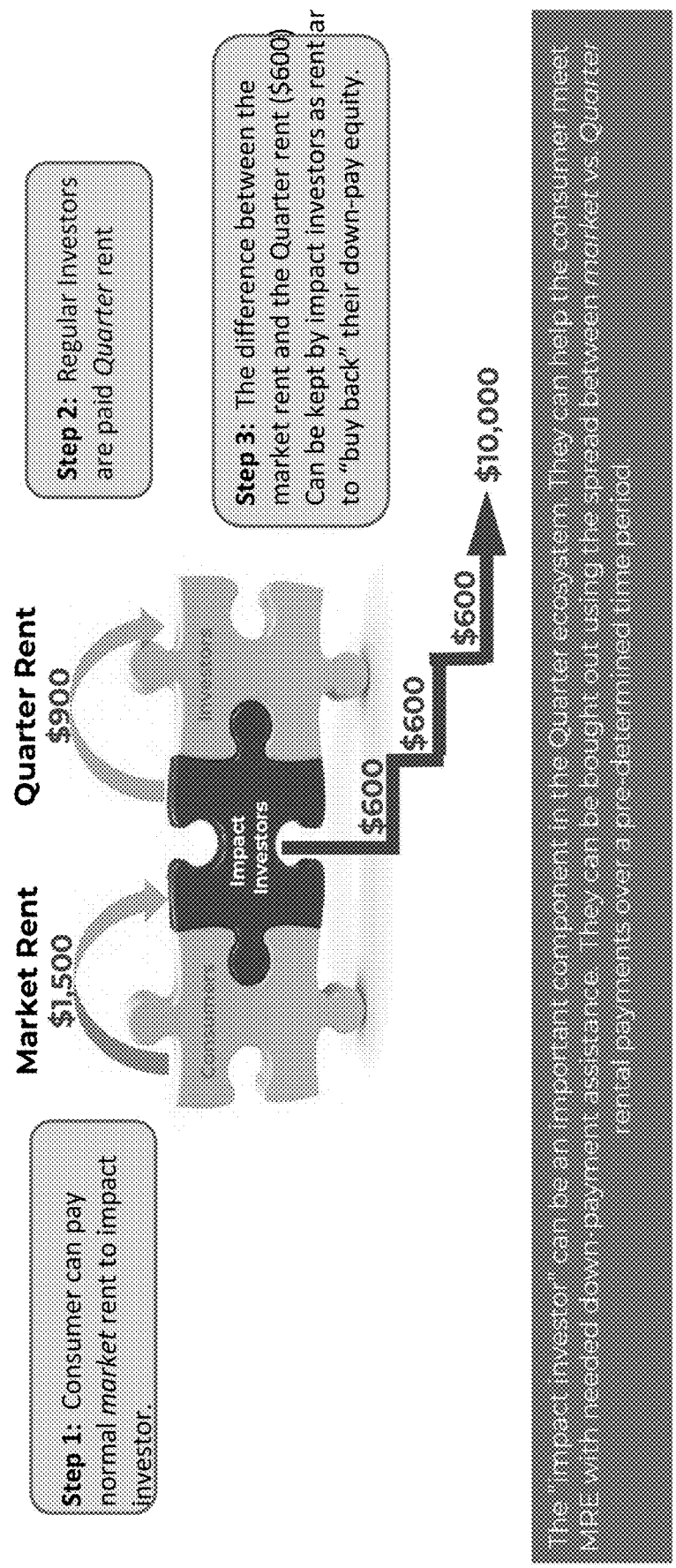
Figure 20:
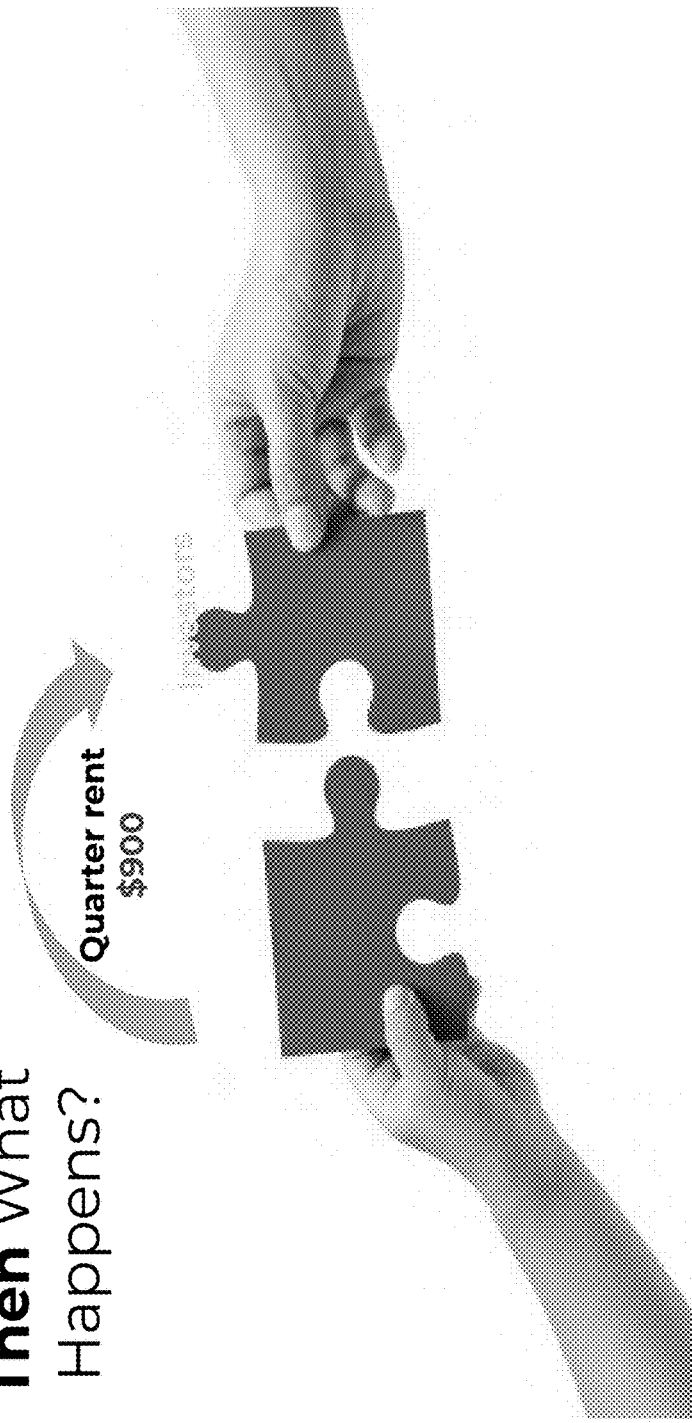
Figure 21A:
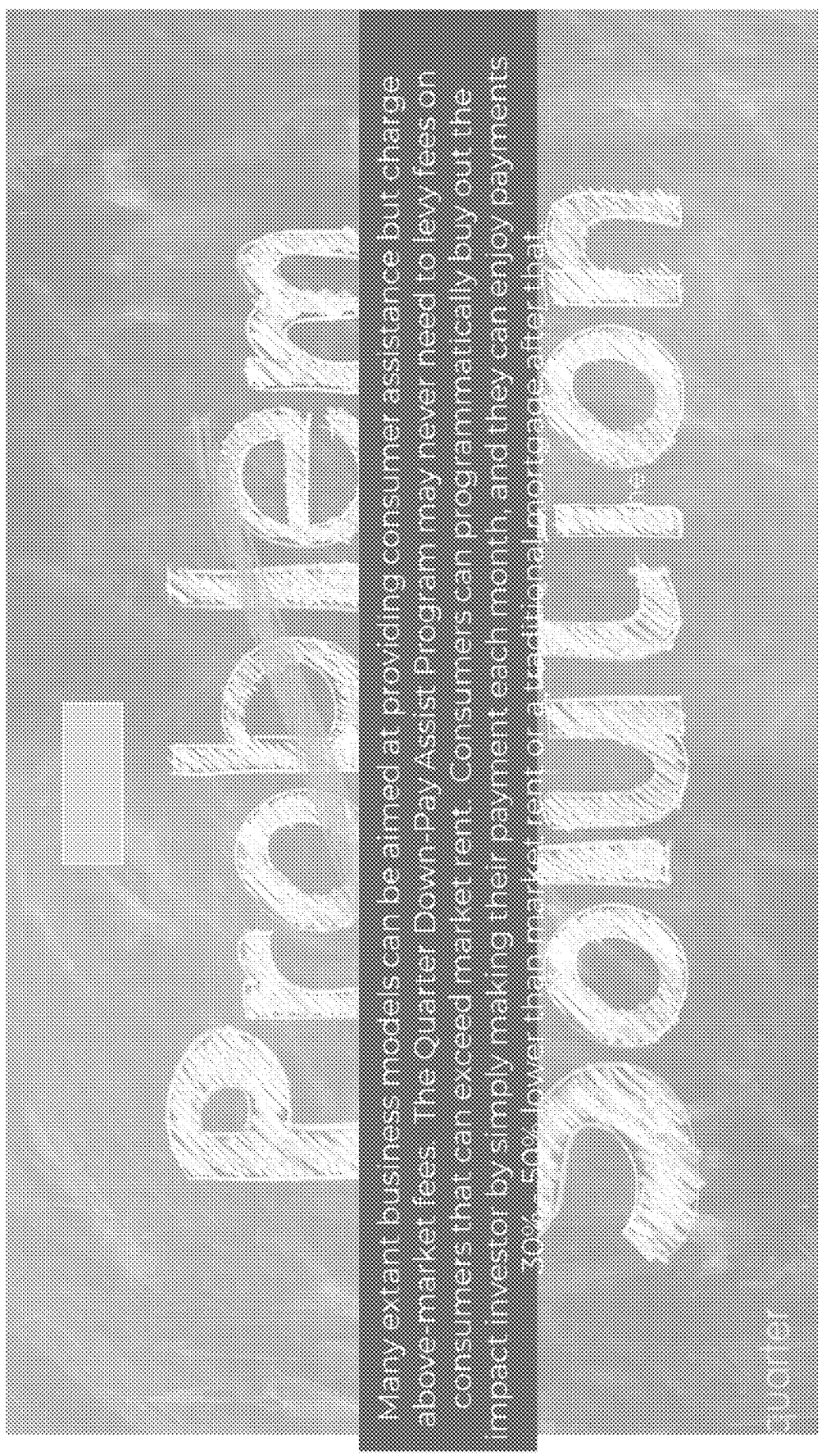
Figure 21B:
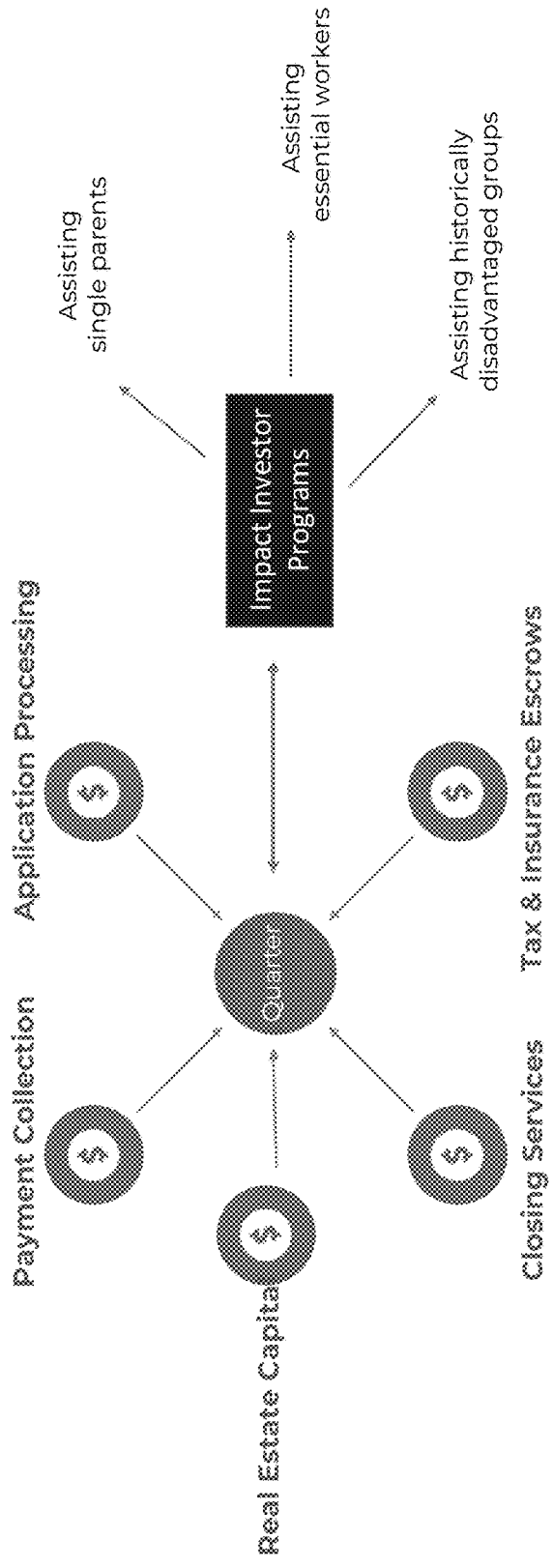
Figure 22:
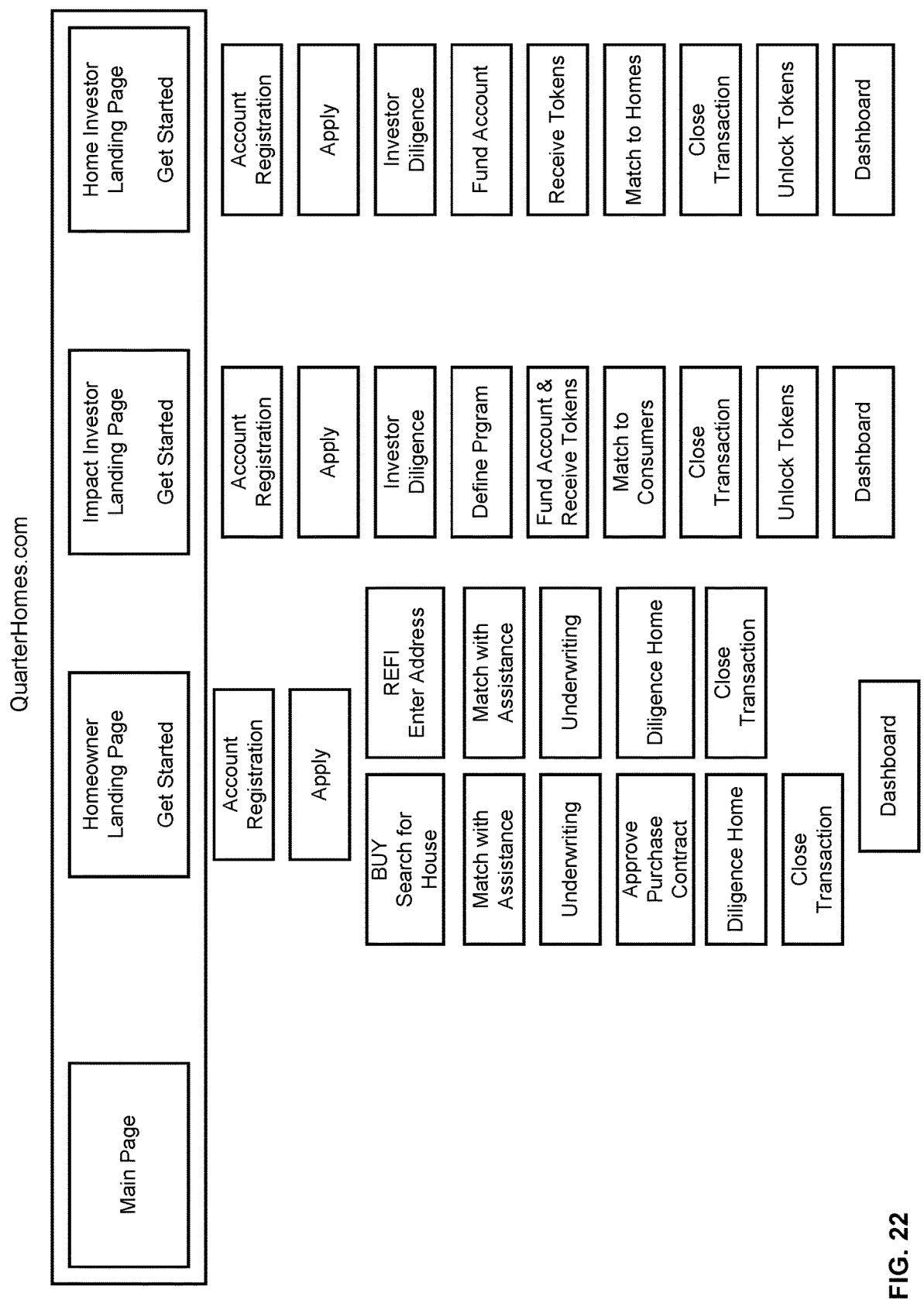

The owner/manager can use a server and/or a mobile application. For example, for the mobile application in FIG. 13, an Occupant can use this or a similar system on a desktop computer, etc. to check their ownership position, sell equity on demand and transfer the fiat current (USD) into their account within seconds.

The transaction can also include transfer of asset tokens between multiple investors. This can enable the development of a secondary market for fractional real estate ownership. This can create the opportunity for price discovery in ways which has not been available before. Current legacy fractional ownership constructs, such as commercial real estate syndicates or REITs, may have typically traded at a substantial discount to the value of the assets they own due to their illiquidity and lack of a robust secondary market. This can allow for the democratization of real estate investing by enabling transactions between accredited investors who initially purchased the Asset Tokens from the issuer and non-accredited investors, who can later purchase the Asset Tokens after SEC mandated holding periods toll. This can also provide the opportunity for industry providers of third-party services, such as title companies, to expand their market as they will have opportunities to provides their products and services each time an Asset Token transfers vs only when and entire property is transacted in the legacy environment. This can also provide the opportunity for investors to manage risk by custom building portfolios of assets based on specific diversification targets. For example, an investor could decide to balance their portfolio of homes in areas experiencing high home price appreciation by divesting some asset tokens of homes in those areas and allocating the proceeds to additional investments in areas with slower growth but with higher rental yields.

The Asset Token can have a static nominal (e.g., face) value and may not change in value to the upside (downside can be a different story as prices can fall). The appreciation component can be stripped from the Asset Token such that any value derived from appreciation of the home can be contractually transferred to the HPI Asset Pool (e.g., some form of BK remote entity) which can be the issuer of the HPI Tokens. For example, a $10 investment in an Asset Token can return $10 to the holder from the proceeds of sale at the time the underlying home is sold.

The HPI asset pool can represent the appreciation of all the homes in the group of homes. The HPI Asset Pool can aggregate the appreciation of all of the appreciation for all homes on the network into one location which can enable issuance of HPI Tokens which can be used in various financial engineering constructs.

An HPI asset token can be issued that can be guaranteed by the appreciation of all the homes in the group of homes. The act of issuing HPI Tokens can unlock unrealized gains which may otherwise only be accessible upon either sale of the home or by obtaining a cash out refinance mortgage. This can provide a floor to the value of the HPI tokens based on the value of the underlying home appreciation rights transferred to the pool. There can also be a compounding effect whereas there may be future HPA or HPD which can occur on the value of the assets already within the pool. Given that there has never been a true HPI index backed by actual homes, this can create a unique opportunity to use HPI tokens to speculate on the future movement of the housing market and to further create additional financial instruments and/or derivatives based on the HPI token.

A minimum retained equity can be determined comprising a minimum amount of equity a home occupant must retain based on pre-defined underwriting criteria. Computing the minimum retained equity can provide the basis to manage risk through the use of asset token holdings (by the occupant, the risk pool, and/or the impact investor) and can be a departure to the way a traditional mortgage has operated which can be more inclined to increase cashflow through the use of higher interest rates. Having "skin in the game" can be a predictor of future consumer performance and the platform has designed the MRE model to reflect that. It further serves as one of the core components from which the occupant's ability to transfer ownership is built upon.

The minimum retained equity can be a dynamic number which changes based on a current property profile and a current occupant profile and is used to manage default risks. MRE as a risk mitigation tool can be helpful in that when combined with a fractional ownership structure, the need to subsidize defaulting consumers by creating extra cash flow via higher interest rates from the entire cohort of similarly situated consumer can be eliminated and can be replaced with by use of a combination of a risk pool of asset tokens contributed by every home on the platform and requiring each homeowner to retain a minimum amount of TIC equity in the property, both of which can be drawn from in the even to occupant non-performance. In short, each homeowner can bear the risk of their own default as they will lose their equity (just like a mortgage) but aren't required to pay monies in the form of higher payments which they will not get back if they do not default. This can enable a much more dynamic risk mitigation strategy on both an individual consumer basis but also within the entire risk pool. This can also enable dynamic adjustments in underwriting criteria base on the overall health of the risk pool such that new applications can be reviewed and MRE calculated on the basis of the risk pool as well as individual consumer stats. Further, the ability to buy or sell equity in real time can be managed, as the risk profile of the consumer can change the amount of excess equity available to transfer and/or convey to cash (defined as occupant owned equity in excess of MRE) can also change.

Ownership of an HPI asset for a property can be transferred to an HPI asset pool by the asset holder in exchange for an HPI asset token. The ability to separate the HPI from the underlying asset can allow for unrealized gains to be carried forward and made liquid in real time.

HPI tokens can be issued contemporaneously with asset tokens when a home is initially boarded onto a platform for a group of homes. This can enable the holding periods required by US (and potentially other jurisdictions) securities laws to run in parallel with the periods during which home price appreciation can be measured (e.g., HPI Intervals) such that when the tokens are unlocked at the end of the period the restrictions on transfer can be removed and the tokens can be freely transferred on a token exchange to both accredited and non-accredited investors. The tolling of the holding period can democratize the investments as it enables nonaccredited investors to acquire and hold the HPI Tokens. This can also reduce risk for asset token holders in that they are able to immediately transfer (e.g., sell) HPI tokens in order to reduce their exposure to home price fluctuations. Without the tolling of the holding period, they could be exposed to a 12 month holding period.

HPI tokens issued with asset tokens can be locked when issued and remain locked unless they are unlocked under pre-defined conditions. This can reduce or eliminate the need to conduct subsequent token offerings to the extent that HPI Tokens can be issued in sufficient quantities to fulfill the obligations to pay the asset token holder for future HPA gains.

Locked HPI Tokens may not be separable from asset tokens that transfer after issuance. This can enable transfer of asset tokens along with HPI Tokens which may be the rights to future HPA gains in a single transaction. This can also help toll the holding period by eliminating the need to issue new HPI tokens each time the asset token is transferred.

An updated valuation can be done for each home in a group of homes on the platform in order to calculate the change in value of each home during a current period. This can enable the calculation of the value of the underlying appreciation assets transferred to the HPI pool. This can also enable the immediate pricing and transfer of TIC interests between the occupant and the investors. This can also enable creation of a secondary market for asset tokens where frequent valuations may assist with price discovery.

At the time of each updated valuation, the home price appreciation (HPA) or home price depreciation (HPD) can be calculated for the current period, wherein the HPA or HPD can be the difference between the valuation determined at the end of a previous period and the valuation determined at the end of the current period. This can provide a basis on which to calculate the number of HPI tokens to be unlocked for each asset token. This can enable the HPI token to act as a true home price index using the homes on the platform.

A boarding value and/or transfer value can be substituted for a previous period difference: when a home was boarded onto the platform during the current period or within a pre-defined amount of time preceding the current period; or when an occupancy token was transferred to a new occupant during the current period or within the pre-defined amount of time preceding the current period. This can enable methods to avoid double counting appreciation when issuing HPI tokens or when asset tokens are transferred. This can also enable automated tracking of investor basis and nominal value of the asset tokens and adjustments in nominal values of asset tokens in times of falling home prices. This can allow for investors who hold asset tokens to have their HPI token allocation tracked and/or calculated differently based on when they were purchased and how home prices have moved since doing the above.

Pro-rata adjustments can be made, for example, if the first period is short (e.g., a predetermined time). A reset can be done when secondary transfers occur after a value decline. In order to facilitate frequent realization of HPI gains via the unlocking of HPI tokens, there may need to be a minimum holding time established, much like the way dividends work with stocks. In the even to value decline, the nominal value of the asset token may be reset so that the holder of the asset token does not receive a double payout for HPA. An example would be a home in which investor holdings are valued at 100K when the asset tokens are issued and subsequently rises to 150K. HPI tokens can be unlocked periodically based on the 50K rise in value. Then the value falls back to 120K and then rises again to 140K. The asset token owner who did not sell his or her asset tokens during this period may not be entitled to unlock additional HPI tokens based on the rise in value from 120K to 140K. A high-water mark can be established such that no HPI tokens can be unlocked until the valuation surpasses the high-water mark of 150K. However, if an asset token holder decides to sell their tokens prior to the high-water mark being reached after a decline (e.g., let's assume they sell at 100K), they may have the nominal value of the asset token reset such that they only receive net proceeds equal to the lower valuation of in this case 100K. However, the new owner of the Asset Tokens may begin at 100K and therefore may be entitled to unlock HPI tokens for any increase above 100K.

The HPI can be unlocked when the HPA for the current period is >0 and satisfies the following conditions: the number of HPI tokens unlocked for each asset token is computed by dividing the total HPA by the market price of the HPI tokens; and/or a computed number of HPI tokens unlocked for each asset token is multiplied by a predetermined amount (e.g., 0.9) and divided by the total number of asset tokens held by investors. There may be no HPA, but instead if there is be HPD for the current period, then no HPI tokens may be unlocked. This is a value proposition of the HPI Tokens. They can be unlocked in tandem with HPA and enable the holder of Asset Tokens to realize gains which would otherwise be inaccessible without selling and/or refinancing the home with a traditional mortgage. Further, this can create the opportunity for very small price movements to be realized, unlike a refinance or sale where the fees and costs associated with the transaction may consume much of the HPA gain.

When a home is sold that has appreciated sufficiently to cause issuance of HPI tokens, the sale proceeds that the HPI token pool is entitled to receive pursuant to the issuance of HPI tokens can be utilized to purchase HPI tokens that are then burned. Burning of the HPI tokens can manage inflationary pressures from impacting the value of the HPI Tokens. This can also eliminate the need to distribute the proceeds from the sale of the homes underlying the HPI appreciation pool which may increase costs and accounting/ regulatory burden ultimately reducing the overall return potential for investors.

Minimum retained equity can be determined using: an applicant's credit score, back-end DTI, risk pool composition, or property specific data as inputs, or any combination thereof.

The minimum retained equity can be used to calculate a minimum down payment required by an applicant who wishes to be an occupant in order to close on the home. Today's financial markets (e.g., the real estate financing market) can use interest rates as a first line tool for risk management. The net result can be that those who can least afford it typically pay the most. To level the playing field and create a more accessible path to homeownership, we have designed the concept of minimum retained equity or "MRE".

Asset tokens purchased by an impact investor can be locked until: the occupant purchases equity from the Impact Investor, in which case a corresponding number of asset tokens shall be unlocked, redeemed and transferred to treasury; and/or the occupant chooses to exercises their right to sell the property, in which case the asset tokens shall be: unlocked, redeemed and burned after distribution of the proceeds of the sale of the property in the event that the home leaves the network; or unlocked, redeemed and transferred to treasury after distribution of net proceeds from the sale; and/or the occupant is in default and the home is sold in which case the asset tokens shall be: unlocked, redeemed and burned after distribution of the proceeds of the sale of the property in the event that the home leaves the network; or unlocked, redeemed and transferred to treasury after distribution of net proceeds from the sale. In this way, the entire impact investor program can be plug and play, meaning that it fits within the overall design of the platform and comports with the management of asset tokens. The impact investor can provide the required capital to supplement the capital the occupant can provide to meet the MRE requirements to become a homeowner. By merging impact investors holdings with the occupant, asset investment opportunities with and without an impact investor can be homogenized sufficiently that from the perspective of the non-impact investors perspective so they can be treated exactly the same from a risk perspective. They can be governed by smart contracts which can enable everything described above to be automated. Further, smart contracts can be customized to meet the specific needs of impact investors allowing them to better focus on serving their clients. The owner/manager can provide the turnkey infrastructure for socially conscious capital to plug into.

Impact investor's asset tokens can be entitled to pro-rata distribution of net proceeds in the event of sale of the home under at least one of the following circumstances: a) asset tokens held by impact investors are entitled to their pro-rata share of the rent plus 100% of the enhanced rent paid by the occupant; b) a portion of the enhanced rent payment shall be used to purchase additional TIC interests in the home from the impact investor's holdings in the SPE; c) upon purchase of TIC interests equal to the entirety of the impact investors holdings in the SPE, enhanced rent payment obligations of the occupant shall terminate; d) impact investors asset tokens are entitled to pro-rata distribution of net proceeds in the event of sale of the home; e) asset tokens held by impact investors are entitled to their pro-rata share of the rent plus 100% of the enhanced rent paid by the occupant; f) a portion of the enhanced rent payment shall be used to purchase additional TIC interests in the home from the impact investor's holdings in the SPE; and g) upon purchase of TIC interests equal to the entirety of the impact investors holdings in the SPE, enhanced rent payment obligations of the occupant shall terminate. This can be helpful in that it can provide an arbitrage opportunity created by the delta between the typical monthly cost of rent to an occupant and typical market rent in a given zip code. This can allow impact investors to enjoy significant yields which can attract both philanthropic entities as well as socially conscious capital in search of superior yields. The ability to manage asset tokens can provide the ability to merge occupant and impact investor holdings which can be the cornerstone to homogenizing the overall investment opportunity sufficient to keep additional risk-based pricing at bay. Further, the ability to reduce costs through smart contract automation can help provide a benefit to the occupant.

In some embodiments, an income interruption buffer can help take advantage of the concept of minimum retained equity in order to safeguard residents in turbulent times. Having a savings buffer (e.g., several months' worth of housing costs in a period of significant interruptions to one's income) can cut homeowner default rates in half. The income interruption buffer of rental payments can be built into occupants' minimum retained equity requirement and can allow them to apply and draw down those funds to make rental payments in the case of a qualifying life event (e.g., job loss, divorce, illness). This income interruption buffer can help empower homeowners.

In addition to the down payment assistance programs which investors can help provide to new home buyers, homeowners assistance programs can be used to help existing homeowners who do not meet MRE requirements to board their existing home on the Quarter Platform. A homeowner assistance program can operate in a similar manner to a down payment assistance program, with an investor(s) purchasing equity in an amount necessary to bring the sum of their holdings and the homeowner's equity up to the MRE. The arbitrage between the market rent and lower Quarter rent can be used to enable the homeowner to purchase portions of their home with each monthly payment until they have purchased the entirety of the equity from the Impact Investor. Just like the down payment assistance program, the consumer can change the inputs for the homeowner assistance program by modifying their credit score ranges, home profile, or other variables, or any combination thereof, to create and view various scenarios with different homeowner assistance amounts required.

In some embodiments, methods and systems can comprise creating, using a platform, a fractionalized risk pool and a fractionalized Home Pricing Index (HPI) pool for a real estate property, the fractionalized risk pool and the fractionalized HPI pool can comprise asset tokens, HPI tokens, and an occupancy token. the asset tokens, the HPI tokens, and the occupancy token issued using blockchain; transmitting, by a first computing device of a first computing system, a first network function request comprising a sale of an asset token to an asset token holder, wherein the asset token can comprise a blockchain based smart contract to a decentralized network; and transmitting, by a second computing device of a second computing system, a second network function request to the decentralized network, the second network function request can comprise a sale of an HPI token to an HPI token holder, wherein the HPI token can comprise a blockchain based smart contract distributing payments to the asset token holder and the HPI token holder using blockchain; wherein the occupancy token can entitle an occupant of the real estate property to financial and occupancy rights in the real estate property after the blockchain based smart contract is executed. Occupant to occupant transfer can be supported using the occupancy token. An HPI asset pool can be held in an account held by a fund controlled by the platform. A display can be used to display information comprising payment information, MRE information, cash out information, or any combination thereof. A display can be used to display properties for sale which occupants can afford. Displayed information can be based on information comprising self-reported data, data looked up with third party data sources using property address information, or both. An occupant applicant can view properties which they are qualified to purchase. The properties can comprise MLS properties. The properties can comprise non-MLS properties. The non-MLS properties can comprise partners of the platform. The non-MLS properties comprise properties entered by the occupant applicant. HPI tokens can be managed. HPI token management can comprise tracking property price appreciation, or managing HPI token distributions, or both. HPI token management can comprise updating valuations for all boarded properties. Suspect data can be deleted. Suspect data can comprise data that is outside of a predetermined amount of expected ranges. HPI gains and/or HPI Token allocations can be determined at HPI Intervals.

Example Structure Overview

Figure 23:
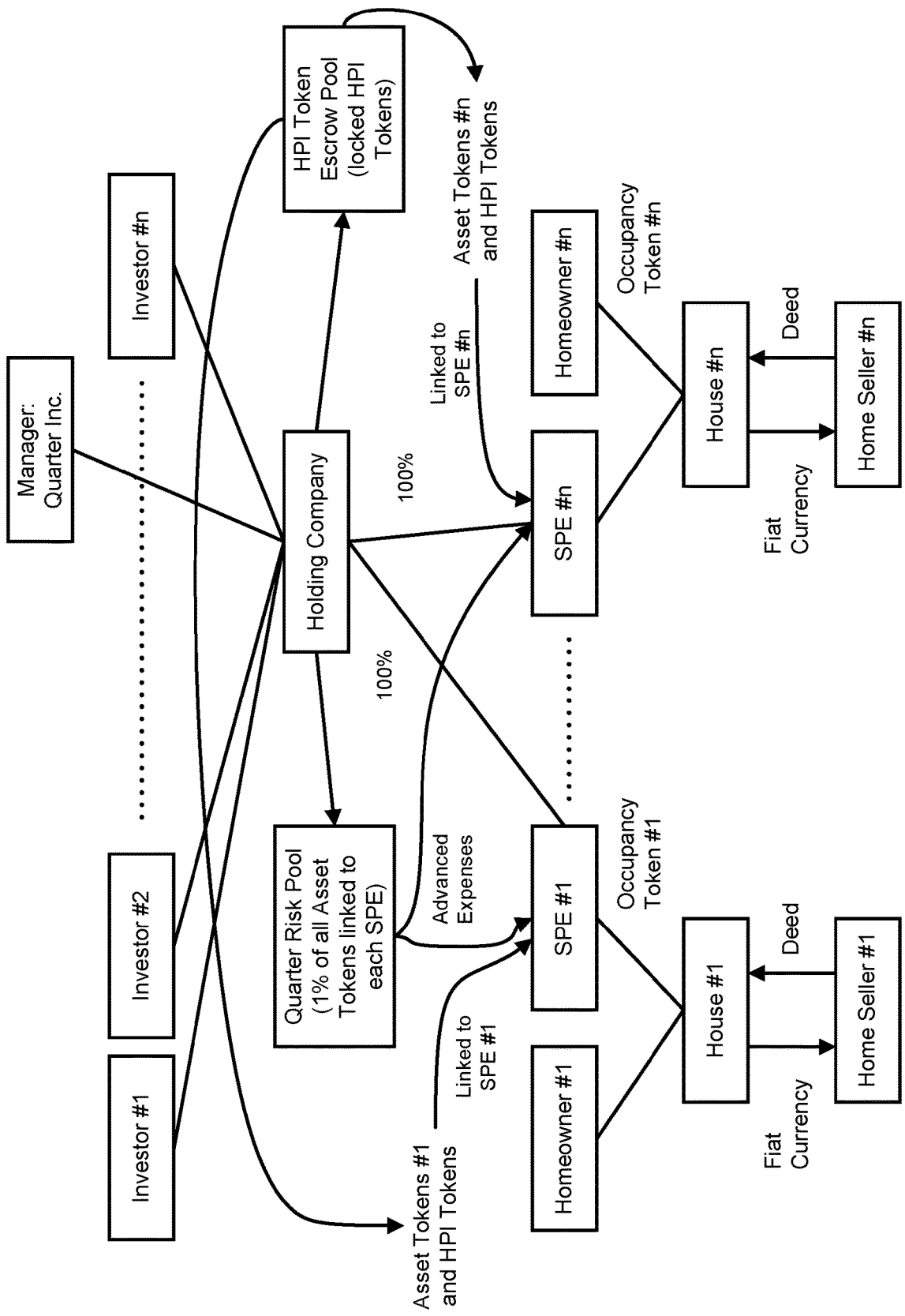
Figure 27:
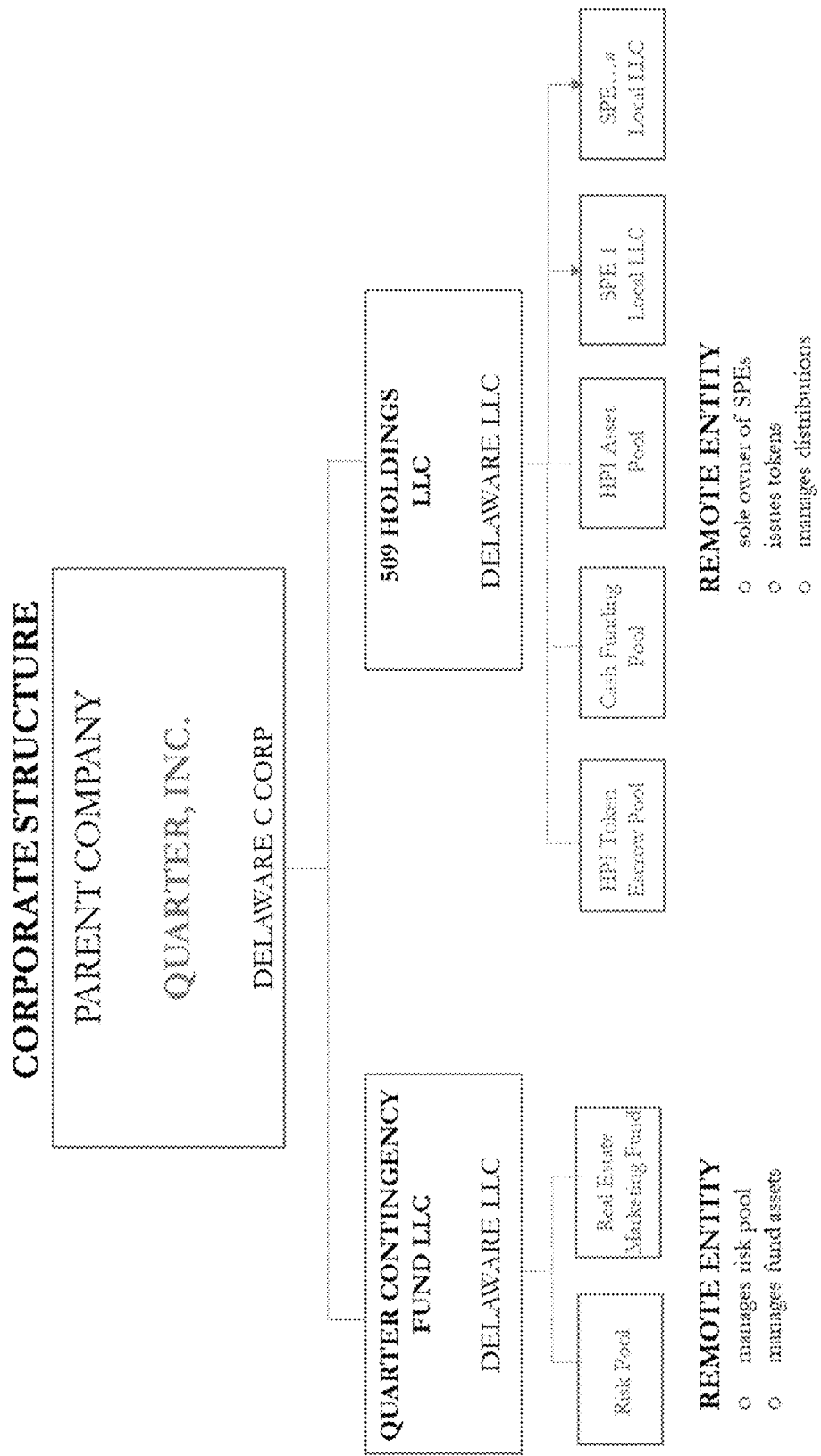

FIGS. 23 and 27 illustrate example structures of the platform. Parties to the structure can include the following:
1. The Fund or the Holding Company: Can be the entity to issue both Asset Tokens and HPI Tokens to raise capital from Investors in accordance with the offering.
2. Investor: Can purchase Tokens pursuant to the offering.
3. Quarter: Can be an entity that owns the Quarter Platform and can be the manager (and in some embodiments the sole manager) of the Fund, which can connect and/or manages the relationships and/or transactions among all of the parties to the Quarter Platform. Quarter can set up the SPE and can manage the ongoing administrative functions of the SPE on behalf of the Fund and, in return, can issue HPI Tokens by the Fund.
4. Quarter Risk Pool: Can be an entity that can be partially or wholly owned by the Fund, which can enter into a Real Estate Agreement with the SPE to advance funds to cure a Homeowner's default pursuant to the Real Estate Agreement and in consideration can be issued Asset Tokens by the Fund. The Asset Tokens to be issued to Quarter Risk Pool consist of a predefined percentage (e.g., 1%) of the total Asset Tokens linked to each SPE (thus each House) on the Quarter Platform.
5. SPE: Can be a special purpose entity wholly owned by the Fund, which can be set up to purchase the Real Estate Interests in a particular House. Both Homeowner and/or SPE can own divided and/or undivided Real Estate Interests in a particular House. The rights and/or obligations of the SPE and/or Homeowner can be documented via the Real Estate Agreement.
6. Home Seller: Can be an individual or entity who can be selling a House which can be purchased by the Homeowner and/or SPE and/or boarded onto the Quarter Platform. Home Seller may have no affiliation or ongoing relationship with Quarter and/or any of the other parties to the Quarter Platform after the closing of the sale of the House.
7. Homeowner and/or Homebuyer: Can be an individual who can be admitted to use the Quarter Platform, can initiate the acquisition or refinance of the House, can purchase the Real Estate Interests in the House, or can become the holder of the Occupancy Token, or any combination thereof.

Example Transaction Structure

Issuance of Asset Tokens and HPI Tokens.

HPI Tokens can be issued to the Asset Token holders at the time the Asset Tokens are issued to the Asset Token holders in connection with the offering when the holders pay the purchase price in full for the Asset Tokens in accordance with the Token purchase agreement, except that a certain amount of HPI Tokens (e.g., 5% of the total HPI Tokens issued by the Fund to the Investors) can be issued to Quarter in consideration of Quarter's management services. Asset Tokens and/or HPI Tokens can represent Investors' economic interests in the Fund.

The Fund can issue HPI Tokens which can be included in the sale of Asset Tokens. An agreement between the SPE and the Fund can be entered into at the time a House is boarded to the Quarter Platform, which can assign the rights to Appreciation Value to the Fund, which can be realized upon sale and/or exit of the Houses from the Quarter Platform. HPI Tokens can be fungible tokens issued by the Fund. HPI Tokens can be backed by a pool of equity generated by appreciation of every House boarded to the Quarter Platform. HPI Tokens can provide their holders the right to receive an interest in the home appreciation from all Houses on the Quarter Platform, which value may not be linked to any specific SPE or House. Asset Tokens can provide their holders the right to receive certain distributions from the Fund, which distributions may be linked to the SPEs (thus, specific Houses) designated by the Manager and/or include pro-rata payment from the Homeowners and/or the sales proceeds up to an amount of the original valuation of the House when the House is boarded to Quarter Platform (but may not include the Appreciation Value, which is assigned to the Fund by the SPE and may be linked to the HPI Tokens). When the Fund issues the HPI tokens to the Asset Token holders, and when the Asset Token holders transfer the HPI Tokens, they can be simply transferring the Home Appreciation Right. The amount of the HPI Tokens a particular Investor can receive and transfer upon the Unlock of HPI Tokens. Investors can be divided into several tiers from the cash flow distribution perspective because they can receive different cash flow from the respective designated Houses via the Asset Tokens linked to specific SPEs and may not participate in distributions or the cash flow from Houses linked to other SPEs of the Fund that may not be linked to their respective Asset Tokens. Accordingly, an Agreement may include different distribution waterfall schedules per each Investor and tax allocation provisions per Investor that can be tied to each SPE and the Asset Tokens associated with such SPE. Quarter, as the manager for the Fund, can create smart contracts to reconcile and track such distributions to help the cash flow generated by the SPE be distributed properly to each Investor.

Figure 24:
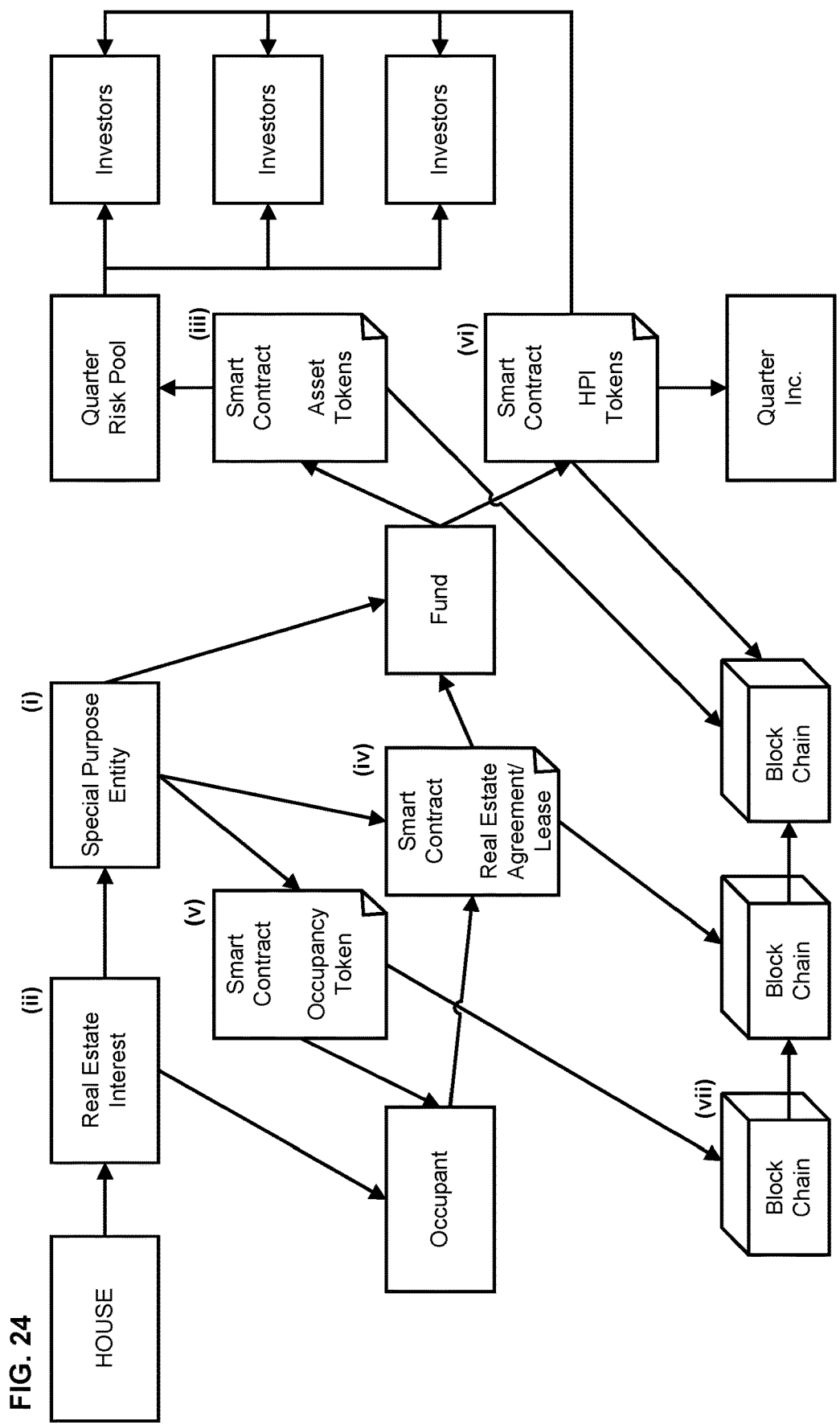

FIG. 24 shows an example overview of Quarter's use of smart contracts (with the Homeowner being the Occupant reflected in the Figure).

As reflected in the figure, the following is a description of how smart contracts and blockchain can be used to board a House onto the Quarter platform.
- (i) A SPE can be set up by the Fund to purchase a House with the Occupant. The Fund can be the sole member of the SPE.
- (ii) Ownership of the House can be granted to both the Occupant and the SPE via a deed.
- (iii) A smart contract can be created by the Fund which can issue Asset Tokens and/or rights to distributions from the specific House owned by the SPE. The Asset Tokens can be distributed to the Investors and also to the Quarter Risk Pool.
- (iv) A smart contract can be created between the Homeowner and the SPE, which can automate certain provisions under the Real Estate Agreement, including, but not limited to the Payments.
- (v) A smart contract can be created by the SPE which can issue the Occupancy Token to the Homeowner. The Occupancy Token can evidence the Homeowner's right to occupy the House.
- (vi) A smart contract can be created by the Fund, which can contain an agreement to assign the Home Appreciation Right to the Fund and in exchange, the Fund can issue HPI Tokens which can be included in the sale of Asset Tokens. The HPI Tokens can represent the Home Appreciation Right and can be distributed to the Investors and/or also to Quarter and/or Quarter Risk Pool.
- (vii) All of the transactions can be recorded onto the Quarter Platform's blockchain.

Digital Wallets for Investors can be maintained and/or adjusted in accordance with applicable regulations and/or taxable income and/or loss can be apportioned appropriately. As each SPE could potentially have different Investors, Investors can be paid different returns and/or cash flows through the Fund. Accordingly, proceeds can be tracked on an SPE by SPE basis per the Investor's proportionate share in a particular SPE, while flowing through one entity—the Fund. The Fund can allocate the Asset Tokens based on the total number of Asset Tokens to be issued and/or the Investor's total investment in proportion to the total investment to be made by all Investors. The Fund can issue a predetermined amount of HPI Tokens per Asset Token.

For example, if the total investment needed from Investors to purchase the Houses is $1,000,000, the total Asset Tokens to be issued to Investors are 1,000,000 (because the price per Asset Token is $1), and Investor #1 (see FIG. 23) desires to invest $100,000, then the number of Asset Tokens to be received by Investor #1 can be 100,000, which is calculated as follows:

$$\text{Total Number of Asset Tokens to be issued} = \text{Total Investment} \div \text{Price per Asset Token} = \$1,000,000 \div \$1 = 1,000,000 \quad (1)$$

$$\text{Asset Tokens allocated to Investor \#1} = \text{Investor \#1's total investment} \div \text{Price per Asset Token} = \$100,000 \div \$1 = 100,000 \quad (2)$$

Figure 25:
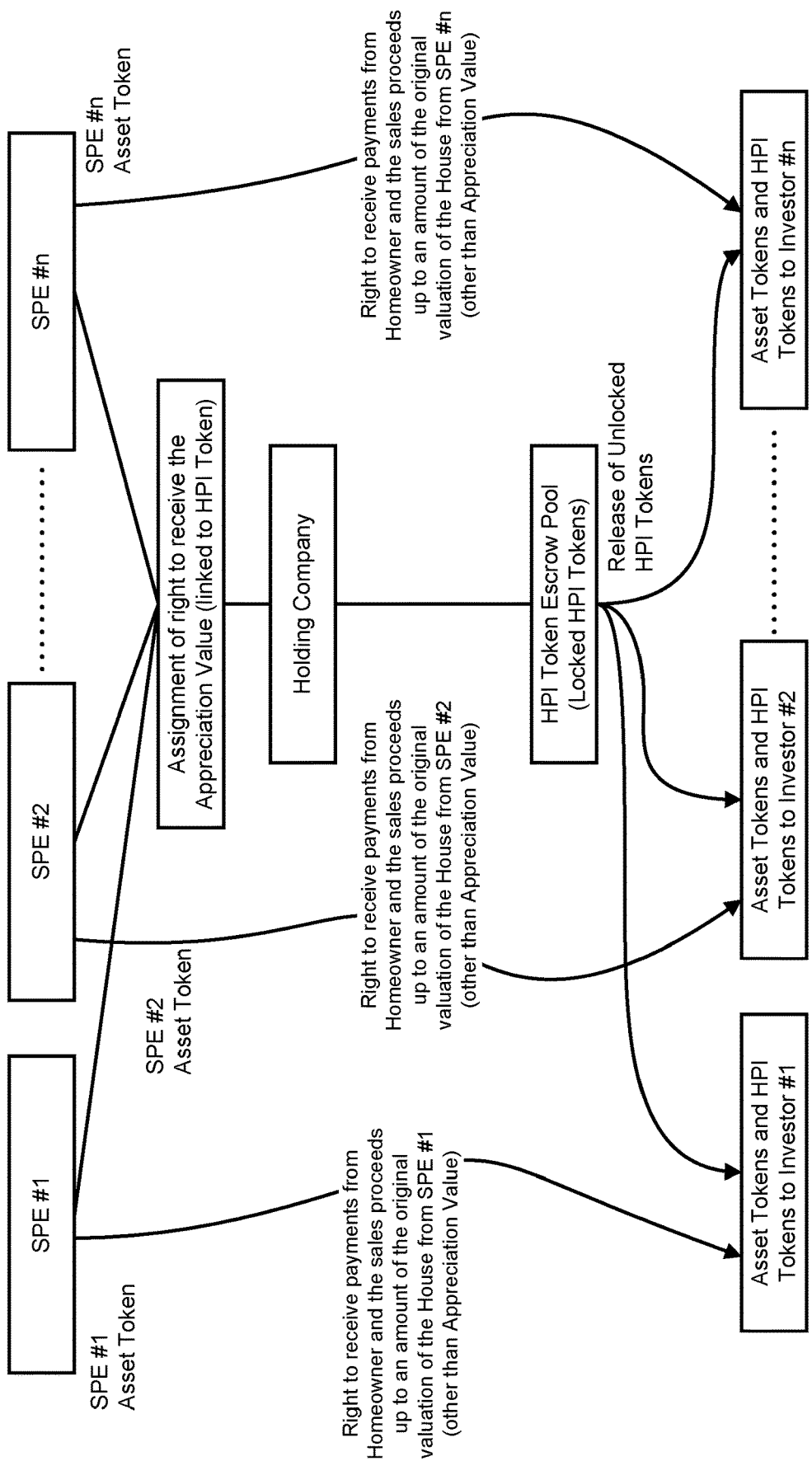

Accordingly, the predetermined amount HPI Tokens will be issued to Investor #1. FIG. 25 shows an example structure of the issuance of HPI Tokens and Asset Tokens.

Figure 28:
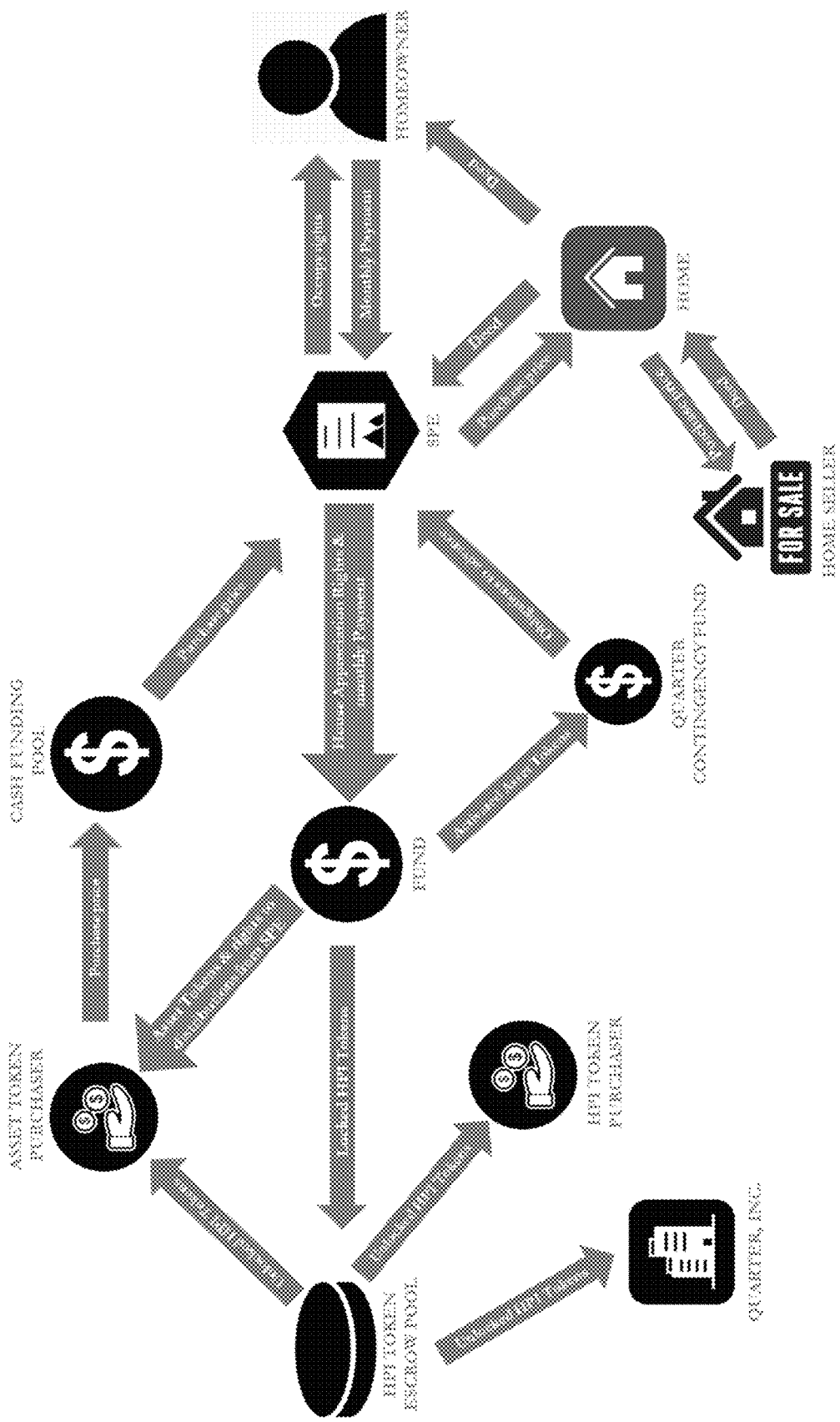

FIG. 28 illustrates an example transaction structure in the Platform in accordance with an embodiment.

Both Asset Tokens and HPI Tokens can represent Investors' economic interests in the Fund, meaning Investors may not have any voting or management rights in the Fund; but can have the rights to receive distributions from the Fund as described herein and in the LLC Agreement. Only Quarter may have voting and management rights in the Fund.

Asset Tokens can provide their holders the right to receive certain distributions from the Fund, which distributions can be linked to the SPEs (thus, specific Houses) designated by Quarter and can include pro rata payments of the TIC Fee and/or Enhanced TIC Fee from the Homeowners and the sales proceeds up to the amount of the Current Valuations of the House at the time the SPE purchased TIC Interests in the House during, and subsequent to, being boarded onto Quarter Platform (but do not include the Appreciation Value, which is linked to the HPI Tokens). When the Fund issues and subsequently Unlocks the HPI Tokens for Asset Token holders, they can realize a pro rata share of the House Price Appreciation for the specific House the Asset Tokens are linked to. When an Asset Token holder transfers Unlocked HPI Tokens, they can transfer their right to pro rata exposure and entitlement to the assets held by the HPI Asset Pool, which can include both the Aggregate Appreciation Value and any cash in the HPI Asset Pool Cash Account. Some details related to the amount of the HPI Tokens a particular Investor can receive, Unlock, and transfer are further described in the section captioned "Overview of HPI Tokens." Some details related to specific rights and obligations of the holders of Asset Tokens are described in the section captioned "Rights and Obligations of Holders of Asset Tokens." Investors can be divided into multiple tiers from the cash flow distribution perspective because they can receive different cash flow from the respective designated Houses via the Asset Tokens linked to specific SPEs and may not participate in distributions or the cash flow from Houses linked to other SPEs of the Fund that are not linked to their respective Asset Tokens. Accordingly, the LLC Agreement can include different distribution waterfall schedules for each Investor and tax allocation provisions for each Investor that can be tied to each SPE, and the Asset Tokens associated with such SPE. Quarter, as the manager for the Fund, can create smart contracts to reconcile and track such distributions to make sure the cash flow generated by the SPE will be distributed properly to each Investor.

The Fund can issue HPI Tokens which may be included in the sale of Asset Tokens for purposes of providing Asset Token holders the right to receive the House Appreciation Right, and HPI Tokens only without the purchase of any Asset Token for purposes of raising working capital and other general corporate purposes for the Fund, including, without limitation, to the development of Tokens, paying the manager and other consultants, and supporting the Quarter Platform ecosystem. The operating agreement of the SPE can provide that the SPE can assign the rights to Appreciation Value to the Fund, which can be realized upon redemption or sale of the House Appreciation Rights or sale and exit of the House from the Quarter Platform. HPI Tokens can be fungible tokens issued by the Fund. HPI Tokens can be backed by a pool of equity and cash generated by appreciation of every House boarded to the Quarter Platform. HPI Tokens can provide their holders the right to receive an interest in the appreciation from all Houses on the Quarter Platform, which value may not be limited to any specific SPE or House.

Delivery of Asset Tokens

Asset Tokens can be issued to an Investor and/or can be delivered to the Investor's Digital Wallet when the Investor pays the purchase price in full for the Asset Tokens. Investors' purchase money for the Asset Tokens can be sitting in the Cash Funding Pool. This can be because at the time of the purchase, the Asset Tokens may not be linked to any specific SPEs (e.g., thus specific homes) (and accordingly the Asset Tokens and/or HPI Tokens may need to be locked initially). The Asset Tokens can be initially subject to a "transfer lock" and/or a "time lock." The Asset Tokens can be subject to a "transfer lock." A "transfer lock" can be a temporary restriction that prevents the Asset Tokens from being transferred by Investors for one (1) year after the date when the Asset Tokens are delivered to Investors' Digital Wallets. A "time lock" can be a temporary general restriction that prevents an Asset Token from being used for any purpose on the Quarter Platform, including but not limited to the right to receive the distributions from the Fund. This time lock can delay the full release of the Asset Tokens that are issued and until released from this time lock, the Asset Tokens may not be able to be Burned and/or transferred and/or otherwise used on the Quarter Platform. The Asset Tokens can be released from the "time lock" upon the closing of the purchase of the House, at which time certain amounts of the Asset Tokens can be linked to the SPE and/or specific House contained therein and can be released from the "time lock" once all or a portion of Investors' Asset Tokens are linked to that specific SPE and that specific House. The Asset Tokens that are released from the "time lock" may be still subject to the "transfer lock."

When a House is boarded to the Quarter Platform, an SPE can be set up with the Homeowner to purchase the House. When Investors' Asset Tokens are linked to a particular SPE, Quarter can release cash from the Cash Funding Pool to the Fund for the Fund to provide funds to the SPE to purchase the TIC Interests, and in return, Investor's Asset Tokens (e.g., in proportion to the invested amount in the House) can be colored to show the link to the particular SPE and/or the "time lock" for the colored Asset Tokens can be removed after the closing of the purchase of the House. The number of the Asset Tokens to be released from the "time lock" can be based on the purchase price to be paid by the SPE for its TIC Interests in a specific House and Investor's investment, for example in proportion to the total purchase price paid by the SPE, as well as the price per Asset Token, after deduction of the Boarding Fee.

For example, as illustrated in FIG. 23, if the total purchase price of House #1 is $120,000, the purchase price to be paid by SPE #1 is $100,000, and Quarter allocates $50,600 (including $600(=$120,000×1%÷2) as the Boarding Fee and $50,000 to fund the purchase price to be paid by SPE #1) from each of Investor #1's Cash Funding Pool account and Investor #2's Cash Funding Pool account, then 50,000 ($50,000/$1) Asset Tokens held by Investor #1 and Investor #2, respectively, will be colored to be linked to SPE #1. Meanwhile, $50,600 will be released from Investor #1's cash escrow account with the Cash Funding Pool and $50,600 will be released from Investor #2's cash escrow account with the Cash Funding Pool to the Fund and the Fund will deliver $100,000 to SPE #1 for SPE #1 to purchase SPE #1's Real Estate Interests in House #1 and will deliver the $1,200 Boarding Fee to Quarter. After the closing of the purchase of House #1, 50,000 of Investor #1's and Investor #2's Asset Tokens will be activated (released from the "time lock"); provided, however, 1% of such colored and activated Asset Tokens held by Investor #1 and Investor #2, respectively, shall be redeemed by the Fund and transferred to Quarter Risk Pool such that Investor #1 and Investor #2 has 49,500 colored and activated Asset Tokens in their respective Digital Wallet and Quarter Risk Pool receives 1,000 colored and activated Asset Tokens as a result of the purchase. Each of Investor #1, Investor #2, and the Quarter Risk Pool will receive the distributions from the proceeds generated by House #1 in proportion to the amount of the colored and activated Asset Tokens they have. Quarter Platform's smart contract will track the payments received from SPE #1 and make the distributions to Quarter Risk Pool's cash account, and to Investor #1's and Investor #2's respective cash escrow accounts with the Cash Funding Pool. The Quarter Risk Pool will advance payments and expenses to the SPE from its cash account (as described in the section captioned "Major Terms and Conditions of the Real Estate Agreement") and in consideration, the Quarter Risk Pool will be issued certain amounts of Asset Tokens by the Fund in order to provide cash flow and capital for servicer advances. The Quarter Risk Pool is for the benefit of the Investors who are not Impact Investors.

The Asset Tokens to be issued to the Quarter Contingency Fund can comprise Asset Tokens linked to each SPE (thus each House) boarded on the Quarter Platform. The Quarter Contingency Fund can reserve the right to open different accounts to serve these purposes. The Quarter Contingency Fund can have the right to set up sub-accounts, e.g., a Risk Pool account to advance funds in the event of a Homeowner's default pursuant to the TIC Agreement and a Real Estate Marketing Fund account to pay the real estate commissions, and to fund the purchase and resale of Homeowner's TIC Interests pursuant to this Memorandum. The Quarter Contingency Fund can reserve the right to relocate funds in one sub-account to another sub-account. The Quarter Contingency Fund can have the right to distribute to Quarter any cash sitting in the accounts under the name of the Quarter Contingency Fund; provided, however, the accounts under the name of the Quarter Contingency Fund can, at all times, have a balance to cure the Homeowners' defaults under the TIC Agreements, to pay the real estate commissions, and to fund the purchase and resale of Homeowners' TIC Interests pursuant to this Memorandum, in an amount determined by Quarter from time to time, as the manager and sole member of the Quarter Contingency Fund.

Asset Tokens can be issued to an Asset Token Purchaser and can be delivered to a custodial (omnibus) wallet or Asset Token Purchasers' Digital Wallets (as determined by Quarter) when the Asset Token Purchaser can pay the purchase price in full for the Bundle. An Asset Token Purchasers' purchase money can be paid for the Asset Tokens in a Bundle that can be sitting in the Cash Funding Pool. This is because at the time of the purchase, the Asset Tokens may not be linked to any specific SPEs (thus specific Houses) and accordingly the Asset Tokens and HPI Tokens can be locked initially. The Asset Tokens can initially be subject to a "transfer lock" and a "time lock." The Asset Tokens can be "restricted securities" as the term is defined under applicable securities laws, and can be subject to a "transfer lock." A "transfer lock" can be a restriction that prevents the Asset Tokens from being transferred by Investors unless in compliance with applicable securities laws, including for the required holding period after the date when the Asset Tokens are delivered to a custodial (omnibus) wallet or Asset Token holders' Digital Wallets (as determined by Quarter). A "time lock" can be a temporary general restriction that can prevent an Asset Token from being used for any purpose on the Quarter Platform, including the right to receive the distributions from the Fund. Until released from this time lock, the Asset Tokens cannot be transferred or otherwise used by the holders of the Asset Tokens. The Asset Tokens can be locked until the closing of the purchase of the House, at which time certain amounts of the Asset Tokens can be linked to the SPE and specific House contained therein and can be released from the "time lock." The Asset Tokens can then be delivered to the Asset Token Purchaser's Digital Wallet. The Asset Tokens that are released from the "time lock" may be still subject to the "transfer lock."

When a House is boarded on the Quarter Platform, an SPE can be set up to be the co-tenant-in-common with the Homeowner to purchase the House. The Fund can release cash from the Cash Funding Pool for the SPE to purchase the TIC Interests and can make any required Fractionalization Fee (can also be referred to as board fee) payments. In return, the corresponding amounts of the Asset Token Purchasers' Asset Tokens can be colored to show the link to the particular SPE and the "time lock" for the colored Asset Tokens can be removed after the closing of the purchase of the House. The number of the Asset Tokens to be colored and released from the "time lock" can be based on the purchase price to be paid by the SPE for its TIC Interests in a specific House and Asset Token Purchaser's investment in proportion to the total purchase price paid by the SPE, as well as the price per Asset Token, after deduction of the Fractionalization Fee. Quarter can transfer the issued but not Activated Asset Tokens in the custodial (omnibus) wallet or Asset Token Purchasers' Digital Wallets (as applicable) in an amount equal to the Fractionalization Fee divided by the Original Asset Token Nominal Value to the Treasury Pool to account for the cash allocated to the Fractionalization Fee. A certain amount of the Activated Asset Tokens can be transferred to the Quarter Contingency Fund as the Quarter Contingency Fund contributions; in addition, Activated Asset Tokens can be transferred to the Asset Token Purchaser's Digital Wallet.

The section captioned "Overview of Asset Tokens" sets forth more details about the Investors' rights associated with the Asset Tokens.

Delivery of HPI Tokens.

Rather than delivering the HPI Tokens directly to Investors' and Quarter's Digital Wallets, the Fund can first deliver the HPI Tokens to HPI Token Escrow Pool in escrow for the benefit of Investors and Quarter (see FIG. 23). The HPI Token Escrow Pool can serve as an escrow account for the purposes of escrowing HPI Tokens issued by the Fund to the Investors and/or Quarter. The HPI Tokens can initially be subject to a "transfer lock" and a "time lock" when sitting in the HPI Token Escrow Pool. A "transfer lock" can be placed on the HPI Tokens to restrict the transfer of the HPI Tokens, for purposes of compliance with the 1-year holding period because HPI Tokens can be "restricted securities" as the term is defined under the Securities Act. Similar to the "time lock" added to the Asset Tokens, the "time lock" added to the HPI Tokens can be a temporary general restriction that prevents an HPI Token from being used for any purpose on the Quarter Platform, such that the HPI Token may not be able to be Burned and/or transferred and/or have any right to receive the distributions from the Fund. This "time lock" can delay the full release of the HPI Tokens that are issued and until released from this "time lock," the HPI Tokens may not be able to be Burned, or transferred and/or otherwise used on the Quarter Platform. HPI Tokens issued to the Asset Token holders can be Unlocked and/or delivered to Investors' and/or Quarter's Digital Wallets, and/or the number of HPI Tokens Unlocked for each Asset Token for a particular SPE can be based on future appreciation of the specific house invested in by the SPE to which the Asset Tokens can be linked. Unlike the Asset Tokens, HPI Tokens can be fungible tokens and may not be linked to any particular SPE. Instead, the value of the HPI Tokens can depend on the Home Appreciation Rights. The section captioned "Overview of HPI Tokens" sets forth more details about the valuation and unlocking mechanism of HPI Tokens.

Purchase and Sale of the House

Quarter may have the right to conduct and provide due diligence services prior to the boarding of the House on the Quarter Platform and can manage the Fund and SPE after the boarding. A list of the possible services are set forth in the section captioned "Quarter Platform's Services." Quarter can support the Homeowner in their purchase of the House by providing the applicable local addendum for the purchase agreement. However, Quarter may not be directly involved in the negotiation of the purchase agreement between the Homeowner and the Home Seller. Some details related to the material terms and conditions of the form Purchase and Sale Agreement Addendum are set forth in the section captioned "Major Terms and Conditions of the Purchase and Sale Agreement Addendum". The Homeowner and the SPE can enter into a TIC Agreement, and some of the material terms and conditions of this are set forth in the section captioned "Major Terms and Conditions of the TIC Agreement."

Example Overview of Asset Tokens

The holders of Asset Tokens can have the following rights to distributions:
A. Proportionate Share of the payments received from the SPE to which the Investor's Asset Tokens are linked.
   (a) Each Investor's Proportionate Share can be based on such Investor's indirect proportional investment in a particular SPE, after setting aside an amount (e.g., 1%) of the total investment for the benefit of Quarter Risk Pool pursuant to the following formula:

Investor's Proportionate Share=(Can be Investor's total colored and activated Asset Tokens linked to the SPE/total colored and activated Asset Tokens linked to SPE)×(1−1%)

For example, as shown on FIG. 23, if the SPE requires $100,000 to purchase the Real Estate Interests in the House and thus requires 100,000 Asset Tokens ($1 per Asset Token). If Investor #1's contribution to SPE #1 is 50,000 Asset Tokens and Investor #2's contribution to SPE #1 is also 50,000 Asset Tokens (after deduction of the Boarding Fee) and no other Investor contributes Asset Tokens to SPE #1, then the Proportionate Share for each of Investor #1 and Investor #2 is 49.5% [(50,000/100,000)×(1-1%)]. The proportionate Share for the Quarter Risk Pool is 1%.
   (b) Can be Base Rent and/or the late fees for the Base Rent received from the SPE paid by the Homeowner unless the underlying payment that generated the late fees was advanced by the Quarter Risk Pool, in which case the late fees can be distributed to the Quarter Risk Pool.
B. Holders of Asset Tokens can have the right to receive the sales proceeds upon the sale of the House owned by the SPE, up to an amount of the Current Valuation of the House when the House is boarded to Quarter Platform (but, in some embodiments, not including the right to receive the Appreciation Value).

Asset Token holders (other than the Impact Investors) can receive uninterrupted Base Rent in the event of a Homeowner's default pursuant to the terms of the Real Estate Agreement, to the extent that the assets held in the Quarter Risk Pool are sufficient to address the Homeowner's default.

When Homeowner requests the SPE to purchase any Real Estate Interests owned by the Homeowner and the SPE agrees to purchase such Real Estate Interests, the Quarter Platform can notify some or all Investors (not just the holders of the Asset Tokens that are linked to the SPE) of the pending transaction, notify them of the amount of Asset Tokens that can be included in the transaction and provide them with a time period (e.g., five (5) business days) to state if they intend to purchase those Asset Tokens linked to the SPE that are subject to purchase and the amount of the Asset Tokens they intend to purchase. At the end of such time period, the Quarter Platform can determine which Investor's request shall be satisfied, on a first come, first served basis and/or on a rolling basis, up to the total amount of Asset Tokens subject to the purchase. Quarter can then remove the "time lock" from such subscribed Asset Tokens sitting in the subscribed Investors' Digital Wallet, and/or can release the respective purchase money from the respective subscribed Investor's account sitting in the Cash Funding Pool to the Homeowner.

When Homeowner requests that the SPE sell any Real Estate Interests owned by the SPE to the Homeowner and the SPE agrees to sell such Real Estate Interests, the Quarter Platform can notify all holders of the Asset Tokens that may be linked to the SPE of the pending transaction, and/or can notify them of the pro-rata amount of their holdings that shall be included in the transaction. Investors whose Asset Tokens are linked to the SPE can have the obligation to sell their Asset Tokens in proportion to their existing percentages of the total Asset Tokens linked to the SPE. The Asset Tokens sold by the Investors can then be redeemed by the Fund and Burned.

Asset Tokens can be non-fungible tokens which can entitle the holder thereof to receive certain distributions from the Fund, which distributions can be linked to specific SPEs (thus, specific Houses) and can include pro rata payments of the TIC Fee and/or Enhanced TIC Fee from the Homeowner and/or pro rata entitlement to certain sales proceeds as described herein, or any combination thereof. In addition, Asset Token holders can be entitled to Unlock HPI Tokens based on future appreciation of the specific House held by the specific SPE which the Asset Tokens are linked to.

Nominal Value

Quarter can track the nominal value of each Asset Token issued on the Quarter Platform. There can be many fixed nominal values which may be assigned by Quarter to each Asset Token at various points in time, including but not limited to: the Original Asset Token Nominal Value; the Transferred Asset Token Nominal Value; or the Redeemed Asset Token Nominal Value, or any combination thereof. The Original Asset Token Nominal Value can be assigned to each Asset Token at the time of issuance and can be set at a certain amount (e.g., $1.0000). The Transferred Asset Token Nominal Value can be assigned when Asset Tokens are transferred during or after one or more periods of time when a House owned by the SPE linked to the Asset Tokens has depreciated in value and is also assigned a fixed value (e.g., $1.0000). The Redeemed Asset Token Nominal Value can be assigned when certain Asset Tokens are transferred to the Quarter Contingency Fund as part of an Asset Token transfer to another Investor when the Current Valuation of the House has fallen below a certain HPI High-water Mark, and is assigned a fixed value (e.g., $0.00). Notably however, holders of the Asset Tokens with the Redeemed Asset Token Nominal Value can still be entitled to collect pro rata TIC Fee payments under circumstances described in this Memorandum. The fixed nominal value, which can be assigned by Quarter to a given Asset Token, can also be known as the "Applicable Asset Token Nominal Value".

In addition to the three fixed nominal values, there can be additional nominal values, including but not limited to, the Current Adjusted Asset Token Nominal Value which can have a dynamic value which can be based on the Current Valuation of the House owned by the SPE linked to the Asset Tokens at a given point of time.

Example mechanics for calculating, applying, and assigning the various Asset Token nominal values are described in the sections below. Many other mechanics can also be used in some aspects of the disclosure.

Activation of Asset Tokens

Asset Tokens can be issued to the Asset Token Purchasers in connection with the Bundle and can be delivered to the Asset Token Purchaser's Digital Wallet when the Asset Token Purchaser pays the purchase price in full for the Bundle. Asset Token Purchaser's purchase money for the Asset Tokens can be paid into the Cash Funding Pool. The purchased Asset Tokens can be locked until the closing of the purchase of the House. When a House is boarded on the Quarter Platform, an SPE can be set up to be the co-tenant-in-common with the Homeowner to purchase the House. The Fund can release cash from the Cash Funding Pool for the SPE to purchase the TIC Interests and make any required Fractionalization Fee payment. In return, Asset Token Purchaser's Asset Tokens can be Activated after the closing of the purchase of the House by the SPE and the Homeowner. The total number of Activated Asset Tokens initially linked to the SPE can be calculated as the quotient of (i) the total purchase price paid by the SPE to purchase the SPE's currently held TIC Interests in the House, divided by (ii) the Original Asset Token Nominal Value which is set at $1.0000 USD, of which an amount of Activated Asset Tokens equal to the Quarter Contingency Fund Contribution (as defined below) can be transferred to Quarter Contingency Fund's Digital Wallet.

Fractionalization Fee

The Fractionalization Fee to be paid by the Asset Token Purchasers to Quarter can be calculated using the following formulas. Other formulas or versions of these formulas may also be used in some embodiments:

If $I_h/(I_s+I_h) <= 10\%, F_f = 1\%$ of the Current Valuation of the House (i)

If $I_h/(I_s+I_h) > 10\%$ and $<=50\%, F_f=(1/(0.5-0.1))\times(0.5-(I_h/(I_s+I_h)))\times 0.01\times$ the Current Valuation of the House (ii)

If $I_h/(I_s+I_h) > 50\%, F_f = 0$ (iii)

$F_f$=Fractionalization Fee contribution
$I_s$=Current value of SPE's TIC Interests
$I_h$=Current value of Homeowner's TIC Interests Quarter Contingency Fund Contribution A Quarter Contingency Fund Contribution can be the number of the Activated Asset Tokens that can be transferred to the Quarter Contingency Fund after the purchase of a particular House and can be calculated using the following formulas:

If $I_h/(I_s+I_h) <= 50\%, C_f = 1\%$ of the Current Valuation of the House/Applicable Asset Token Nominal Value (i)

If $(I_h/(I_s+I_h)) > 50\%$ and $<90\%, C_f=((0.9-(I_h/(I_s+I_h)))/(0.4/0.75))+0.25)\times 0.01\times$ the Current Valuation of the House/Applicable Asset Token Nominal Value (ii)

If $(I_h/(L+I_h)) >= 90\%, C_f=0.25\%$ of the Current Valuation of the House/Applicable Asset Token Nominal Value (iii)

$C_f$=Quarter Contingency Fund Contribution
$I_s$=Current value of SPE's TIC Interests
$I_h$=Current value of Homeowner's TIC Interest If there has been no transfer or redemption of the Asset Tokens at the time of the determination, Applicable Asset Token Nominal Value can be the Original Asset Token Nominal Value.

The Quarter Contingency Fund can advance payments and expenses to the SPE from its cash account (some details are described in the section captioned "Major Terms and Conditions of the TIC Agreement") and in consideration, the Quarter Contingency Fund can receive the Activated Asset Tokens. The Quarter Contingency Fund can be for the benefit of the Investors who are not Impact Investors.

Right to Receive Distributions

The holders of Asset Tokens can have the right to receive any combination of: (i) a Proportionate Share (as defined below) of the TIC Fee received from the SPE to which the Asset Token Purchaser's Asset Tokens may be linked, (ii) the Enhanced TIC Fee (Impact Investors only), and (iii) a pro-rata share of the sales proceeds upon the sale of the House owned by the SPE equal to the sum of the Current Adjusted Asset Token Nominal Value of all of the Asset Tokens they hold, up to the amount of the Current Valuation of the House at the time the SPE purchased TIC Interests in the House during, and subsequent to the House being boarded onto Quarter Platform (but not including the Appreciation Value). An Asset Token Purchaser's Proportionate Share (a "Proportionate Share") may be equal to the number of Activated Asset Tokens linked to an SPE and held by the Asset Token Purchaser, divided by the total number of Activated Asset Tokens linked to the SPE. Quarter Platform's smart contract may track the payments received by SPE and may make the distributions to the Quarter Contingency Fund's cash account, and to Asset Token Purchasers' respective accounts with the Cash Funding Pool, subject to applicable laws and regulations. Asset Token Purchasers may have the right to direct the distributions to be made from their respective cash escrow accounts to their designated bank accounts or keep such distributions in the cash escrow accounts sitting with the Cash Funding Pool so they can reinvest their distributions into additional Houses.

Asset Token holders (other than the Impact Investors) may receive uninterrupted TIC Fee distributions in the event of a Homeowner's default in the payment of the TIC Fee pursuant to the terms of the TIC Agreement, to the extent that the funds held in the Quarter Contingency Fund can cure the Homeowner's such default, in whole or in part. Asset Token holders may not be required to fund any out-of-pocket expenses related to the Homeowner's monetary default to the extent the funds held in the Quarter Contingency Fund are sufficient to cure such Homeowner's default that is curable by the payment of money. After the termination of the TIC Agreement and until the earlier to occur of (i) a new TIC Agreement is entered into with a new Homeowner in connection with the House or (ii) the sale of the House, the Quarter Contingency Fund may continue paying the monthly TIC Fee to the Asset Token holders whose Asset Tokens may be linked to the SPE, other than the Impact Investors, to the extent the funds held in the Quarter Contingency Fund are sufficient to do so.

In this example, the total purchase price for a House can be $120,000, the Homeowner can purchase their TIC Interests for $20,000, and the SPE can purchase the remaining TIC Interests for $100,000. Assume there are two Asset Token Purchasers (Investor #1 and Investor #2) whose purchase money sitting in the Cash Funding Pool can be distributed to a newly formed SPE so the SPE can purchase the TIC Interests in the House. Using this example transaction we can calculate the Investors' contribution to the Quarter Contingency fund, the Fractionalization Fee contribution to be paid by the Investors and determine each Investor's Proportionate Share of future distributions.

Example House Boarding Transaction

Figure 30:
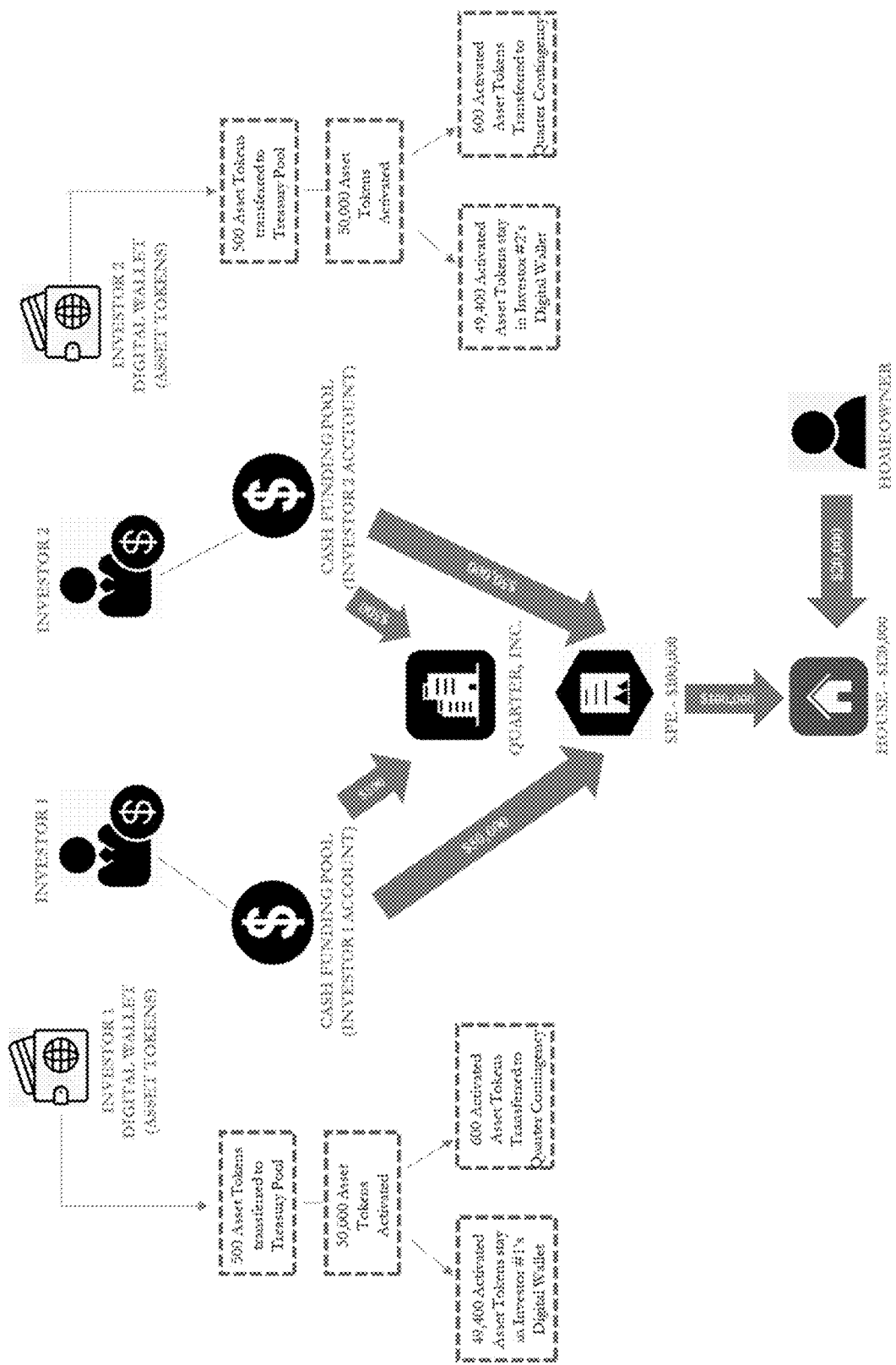

In the example house boarding transaction illustrated in FIG. 30, the total purchase price for a House can be $120,000, the Homeowner can purchase their TIC Interests for $20,000, and the SPE can purchase the remaining TIC Interests for $100,000. Assume there are two Asset Token Purchasers (Investor #1 and Investor #2) whose purchase money sitting in the Cash Funding Pool can be distributed to a newly formed SPE so the SPE can purchase the TIC Interests in the House. Using this example transaction we can calculate the Investors' contribution to the Quarter Contingency fund, the Fractionalization Fee contribution to be paid by the Investors and determine each Investor's Proportionate Share of future distributions.

Applying the Quarter Contingency Fund Contribution formulas described above to the example transaction in FIG. 30, we can determine that the purchase price of the Homeowner's TIC Interests can be equal to 16.6667% of the total purchase price of the House $(I_h/(I_s+I_h)=\$20,000/\$120,000=16.6667\%)$. Given that 16.6667% is less than 50%, the Quarter Contingency Fund Contribution can be 1% of the Current Valuation of the House divided by the Original Asset Token Nominal Value, or $1,200—i.e., 1,200 (=1%×$120,000/$1).

Next, we can calculate the Fractionalization Fee for this example using the Fractionalization Fee formulas described above. Given that the Homeowner's TIC Interests can be equal to 16.67% of the total purchase price of the House $(I_h/(I_s+I_h)=\$20,000/\$120,000=16.6667\%)$, which can be greater than 10% and less than 50%, the Fractionalization Fee can be calculated as $(1/(0.5-0.1))\times(0.5-(I_h/(I_s+I_h)))\times 0.01\times$the Current Valuation of the House, or $1,000—i.e., $1,000 (=1/0.4×(0.5-16.6667%)×0.01×$120,000).

Assuming an equal investment between Investor #1 and Investor #2, Quarter can allocate $50,500 from each of Investor #1's Cash Funding Pool account and Investor #2's Cash Funding Pool for the investment ($50,000 to fund the TIC Interests to be purchased by the SPE and $500 to fund the Fractionalization Fee ($1,000/2=$500)). Quarter can then Activates 50,000 ($50,000/$1.0000) Asset Tokens held by Investor #1 and Investor #2, respectively, so that they can be linked to SPE. Quarter can then transfer 500 issued but not Activated Asset Tokens held by Investor #1 and 500 issued but not Activated Asset Tokens held by Investor #2 to the Treasury Pool to account for the cash allocated to the Fractionalization Fee.

Contemporaneously, $50,500 can be released from Investor #1's account with the Cash Funding Pool and $50,500 can be released from Investor #2's account with the Cash Funding Pool (for a total of $101,000). The Fund can deliver $100,000 to the SPE for the SPE to purchase the SPE's TIC Interests in the House and can deliver the $1,000 Fractionalization Fee to Quarter.

After the closing of the purchase of the House, 100,000 Asset Tokens can be Activated, calculated based on the total purchase price paid by the SPE ($100,000) divided by the Original Asset Token Nominal Value. Of these 100,000 Activated Asset Tokens, 1,200 Activated Asset Tokens (600 Activated Asset Tokens from Investor #1's Digital Wallet and 600 Activated Asset Tokens from Investor #2's Digital Wallet) can be transferred to Quarter Contingency Fund's Digital Wallet as the Quarter Contingency Fund Contribution.

Investor #1's Digital Wallet can realize a net of 49,400 (=50,000−600) Activated Asset Tokens, and Investor #2's Digital Wallet can realize a net of 49,400 (=50,000−600) Activated Asset Tokens. Thus, Proportionate Share for each of Investor #1 and Investor #2 can be 49.4% (=49,400/100,000). The Proportionate Share for the Quarter Contingency Fund can be 1.2% (=1,200/100,000).

Each of Investor #1, Investor #2, and the Quarter Contingency Fund can receive the distributions from the proceeds generated by the House in proportion to both the number and total nominal value of the Activated Asset Tokens they hold in their respective Digital Wallet.

Allocation of the Asset Tokens to the purchase and sale of Homeowner's TIC Interests During Homeowner's occupancy of the House, Homeowner may have the right to request the SPE to purchase a portion (and not all) of the TIC Interests owned by the Homeowner pursuant to the TIC Agreement. If the SPE agrees to purchase such TIC Interests, Quarter can allocate the Asset Tokens subject to the purchase among Asset Token Purchasers who can hold the Asset Tokens linked to the SPE (the "Existing Investors") and who have funds sitting in the Cash Funding Pool. If the funds sitting in the Cash Funding Pool held by the Existing Investors are not sufficient for the SPE to purchase the TIC Interests offered by the Homeowner, Quarter can allocate the remaining Asset Tokens subject to the purchase among other Asset Token Purchasers (excluding, for example, the Existing Investors) who can have cash sitting in the Cash Funding Pool, up to the total amount of Asset Tokens subject to the purchase. Quarter can then remove the "time lock" from such subscribed Asset Tokens sitting in the subscribed Asset Token Purchaser's Digital Wallet and can release the respective purchase money from the respective subscribed Asset Token Purchaser's account sitting in the Cash Funding Pool to the Homeowner.

During Homeowner's occupancy of the House, Homeowner can have the right to request the SPE to purchase all of the TIC Interests owned by the Homeowner pursuant to the TIC Agreement. If the SPE agrees to purchase all of the Homeowner's TIC Interests, the Fund can use funds sitting in the Quarter Contingency Fund to purchase such TIC Interests. When any or all TIC Interests purchased by the Quarter Contingency Fund are resold, the net proceeds can be distributed to the Quarter Contingency Fund.

When the Homeowner requests that the SPE sell any TIC Interests owned by the SPE to the Homeowner and the SPE agrees to sell such TIC Interests, Quarter can notify the Existing Investors of the pending transaction, and/or notify them of the pro rata amount of their holdings that can be included in the transaction, which pro rata amount can be determined by Quarter. The Existing Investors can have the obligation to sell their Asset Tokens in an amount to be determined by Quarter, up to the total Current Adjusted Asset Token Nominal Value of all the Asset Tokens they hold which are linked to the SPE. The Asset Tokens sold by the Existing Investors can then be transferred to the Treasury Pool and the net proceeds from the sale can be distributed to the Existing Investors' Cash Funding Pool accounts, in proportion to the number of Asset Tokens sold by the Existing Investors and transferred to the Treasury Pool.

Transfer of Tokens

Asset Tokens transferred between Asset Token Purchasers while the Current Valuation can be at or above the HPI High-water Mark for such Asset Tokens can be processed by (i) calculating the number of Asset Tokens to be transferred by dividing the total purchase price (net of any applicable fees) by the Applicable Asset Token Nominal Value of the Asset Tokens to be transferred, and (ii) transferring the calculated number of Asset Tokens to the new Asset Token Purchaser.

Asset Tokens transferred when the Current Valuation is below the HPI High-water Mark for the subject Asset Tokens can proceed, for example, as described in the "Example Overview of HPI Tokens" section below.

Example Overview of HPI Tokens

HPI Tokens can represent a pool of equity generated by appreciation of some or all Houses boarded to the Quarter Platform and/or can provide their holders the Home Appreciation Right from some or all Houses on the Quarter Platform. The amount of HPI Tokens attributable to holders of Asset Tokens can be determined by the number of purchased Asset Tokens and the link to a specific home. It can be a predetermined amount of HPI Tokens per 1 Asset Token.

Quarter can establish predetermined time periods, known as HPI Intervals (which HPI Interval is initially set to be annually) when it can update the Current Valuation for each House then-existing on the Quarter Platform for the purpose of calculating the change in the Current Valuation of each House during that period. At a designated time at the end of each HPI Interval, the Home Price Appreciation (HPA) and/or Home Price Depreciation (HPD) can be calculated. The calculation date can be referred to as the "HPA/HPD Determination Date"). The first HPA/HPD Determination Date may not occur prior to the removal of the "transfer lock" of the HPI Tokens. The calculation can be the difference between (i) the Current Valuation of a particular House then-existing on the Quarter Platform conducted at the end of the current HPI Interval and (ii) the Current Valuation of a particular House conducted at the end of the immediately preceding HPI Interval. If the difference is a positive number, the difference can be deemed to be the Home Price Appreciation (HPA). If the difference is a negative number, the difference can be deemed to be the Home Price Depreciation (HPD). If the difference is zero, then there may be no HPA or HPD. In the event that a House was boarded onto the Quarter Platform during the current and/or immediately preceding HPI Interval and/or the Occupancy Token was transferred to a new Homeowner during the current and/or immediately preceding HPI Interval, then the Current Valuation of such particular House at the time of boarding or transfer (the "Reset Current Valuation") can be substituted for the previous HPI Interval's Current Valuation for such particular House.

In the event that the Current Valuation for a particular House at the end of the current HPI Interval exceeds either (i) the Current Valuation for such particular House at the end of any previous HPI Intervals which have occurred during the term of ownership of the current Asset Token holders whose Asset Tokens are linked to the SPE for such particular House, or (ii) the Reset Current Valuation, then this Current Valuation can be deemed as the HPI High-water Mark for such particular House. In the event that the Current Valuation for a particular House for the current HPI Interval does not exceed the HPI High-water Mark for such particular House, then no HPI Tokens may be Unlocked for the current Asset Token holders whose Asset Tokens are linked to the SPE for such particular House. In that event that (i) the Current Valuation for a particular House falls below the HPI High-water Mark as a result of one or more periods of the decrease in the Current Valuation for a particular House and/or (ii) the Asset Tokens linked to the SPE are transferred to a new Investor:
  A. The High-water Mark can be removed.
  B. The new Asset Token holder's future right to Unlocked HPI Tokens can be based on the Current Valuation for such particular House at the time of transfer and/or from the end of the immediately preceding HPI Interval prior to the transfer to the new Investor.
  C. The Original Asset Token Nominal Value can be replaced with the Current Adjusted Asset Token Nominal Value for the transferred tokens which can be calculated as the proportional value of Asset Tokens based on the lesser of (i) the Current Valuation at time of transfer and/or (ii) the Current Valuation at the end of the immediately preceding HPI Interval.

In the event of a Home Price Appreciation, if the Current Valuation for a particular House at the end of the current HPI Interval is greater than the High-water Mark, then HPI Tokens held by holders of Asset Tokens linked to such particular SPE for such particular House can be Unlocked based on the following example formula. (Note that many variations of this formula may also be used. For example, in some embodiment, some variables may not be used and/or some variables may be added):

$$T_u = \text{MIN}((V_c - V_p)/V_p, (V_c - H_w)/H_w) * R * \text{MIN}(N_o, N_p)/T_v$$

$T_u$=HPI Tokens Unlocked
$V_c$=Current Valuation
$V_p$=Previous HPI Interval Current Valuation
$H_w$=HPI High-water Mark
$R$=HPI Realization Percentage
$N_o$=Original Asset Token Nominal Value
$N_p$=Current Adjusted Asset Token Nominal Value
$T_v$=HPI Token Market Value As shown in the above formula, the number of HPI Tokens Unlocked for each Asset Token for a particular SPE can be computed as follows:
  Step 1: multiplying (A) the lesser of (i) Current Valuation (in USD) of a particular House at the time of the valuation minus the Current Valuation (in USD) at the end of the immediately preceding HPI Interval (the "Previous HPI Interval Current Valuation"), the result of which shall then be divided by the Previous HPI Interval Current Valuation (in USD) for a particular House, or (ii) Current Valuation (in USD) of a particular House at the time of the valuation minus the HPI High-water Mark (in USD), the result of which shall then be divided by the HPI High-water Mark (in USD), by (B) the HPI Realization Percentage (initially set at 90%).
  Step 2: The result of Step 1 can then be multiplied by (a) the Original Asset Token Nominal Value and/or (b) the Current Adjusted Asset Token Nominal Value.
  Step 3: The result of Step 2 can then be divided by (D) the then-existing market price of the HPI Tokens ("HPI Token Market Value").
  If the result of Step 3 is a negative number, then no HPI Tokens may be Unlocked.

When a House which has appreciated sufficiently to cause the Unlock of HPI Tokens to the holders of Asset Tokens to which the House is linked to is sold and leaves the Quarter Platform, proceeds can be distributed according to the Real Estate Agreement rules.

In the event that Homeowner purchases a portion of the Real Estate Interests owned by the SPE from the SPE during any HPI Interval or prior to any HPI Interval, then the closing date of such purchase can be substituted for the schedule HPI determination date, and the number of HPI Tokens Unlocked for each Asset Token for such SPE linked to the House can be computed and released to the Asset Token holder's Digital Wallets. The sales proceeds can be distributed according to the Real Estate Agreement rules.

In the event that Homeowner sells a portion of the Real Estate Interests owned by the Homeowner to the SPE during any HPI Interval or prior to any HPI Interval, then the closing date of such sale can be substituted for the scheduled HPI determination date, and/or the number of HPI Tokens Unlocked for each Asset Token for such SPE linked to the House can be computed and released to the Asset Token holder's Digital Wallet.

If (i) the supply of HPI Tokens issued to Asset Token holders at the time when the Asset Tokens are issued to the Asset Token holders is exhausted or (ii) the value of the total issued but locked HPI Tokens falls below a predetermined amount and/or percentage of the Total Current Valuation, then additional locked HPI Tokens can be issued by the Fund to the Investors, which can be delivered to the HPI Token Escrow Pool in proportion to the amount of Asset Tokens they have, to replenish the supply in amounts as Quarter may determine from time to time. In addition, HPI Tokens in the amount of a predetermined amount and/or percentage of all issued HPI Tokens can be issued to Quarter by the Fund, but such issued HPI Tokens can be initially locked. In the event of a Home Price Appreciation, if the Current Valuation for a particular House at the end of the current HPI Interval is greater than the High-water Mark, then HPI Tokens issued to Quarter pursuant to this paragraph can be Unlocked in the amount calculated pursuant to the following example formula. (Note that many variations of this formula may also be used. For example, in some embodiment, some variables may not be used and/or some variables may be added):

$$T_u = MIN(V_c - V_p, V_c - H_w) * S_i * Q_h / T_v$$

$T_u$ = Amount of the Unlocked HPI Tokens
$V_c$ = Current Valuation
$V_p$ = Previous HPI Interval Current Valuation
$H_w$ = HPI High-water Mark
$S_i$ = Real Estate Interests of a particular SPE
$Q_h$ = Quarter Pro-Rata HPI
$T_v$ = HPI Token Market Value As shown in the above formula, the number of HPI Tokens Unlocked for the benefit of Quarter for a particular SPE can be computed as follows:
- Step 1: multiplying (A) the lesser of (i) Current Valuation (in USD) of a particular House at the time of the valuation minus the Previous HPI Interval Current Valuation, or (ii) Current Valuation (in USD) of a particular House at the time of the valuation minus the HPI High-water Mark, by (B) Real estate Interests of a particular SPE.
- Step 2: the result of Step 1 can then be multiplied by (C) the amount of the HPI Tokens Quarter is entitled to receive pursuant to this offering (i.e. 5%) (the "Quarter Pro-Rata HPI").
- Step 3: the result of Step 2 can then be divided by (D) HPI Token Market Value.

HPI Tokens can be fungible tokens which can represent a pool of assets generated by appreciation of every House (or a subset of Houses) boarded to the Quarter Platform and can entitle their holders to the assets held by the HPI Asset Pool, which can include both the Aggregate Appreciation Value and any cash in the HPI Asset Pool Cash Account.

The number of HPI Tokens attributable to holders of Asset Tokens can be determined by the number of Asset Tokens issued and the link to a specific House. It can initially be set to a certain value (e.g., at 10 HPI Tokens per 1 Asset Token). The Fund can reserve the right to change the number of HPI Tokens included in the sale of the Bundle from time to time. In addition, the Fund can sell rights to HPI Tokens only, without the purchase of any Asset Token, to HPI Token Rights Purchasers for purposes of raising working capital and other general corporate purposes for the Fund, including, without limitation, to the development of Tokens, paying manager and other consultants, and supporting the Quarter Platform ecosystem. The number of HPI Tokens Unlocked to the HPI Token Rights Purchasers can be based on whether the HPI Tokens are purchased as part of the Bundle or separate from the purchase of Asset Tokens, and the total price paid for Bundles or rights to HPI Tokens pursuant to this Memorandum.

HPI Intervals

Since HPI Tokens can be Unlocked periodically based on the appreciation of Houses on the Quarter Platform, Quarter can establish predetermined time periods, which can be known as HPI Intervals (which HPI Interval can be initially set to be annually) when it can update the Current Valuation for each House then-existing on the Quarter Platform for the purpose of calculating the change in the valuation of each House during that period. At a designated time at the end of each HPI Interval, the House Price Appreciation (HPA) or House Price Depreciation (HPD) can be calculated. The calculation date can be referred to as the "HPA/HPD Determination Date"). The first HPA/HPD Determination Date may not occur prior to the removal of the "transfer lock" of the HPI Tokens. The calculation can be the difference between (i) the Current Valuation of a particular House then-existing on the Quarter Platform conducted at the end of the current HPI Interval (the "End Current Valuation") and (ii) the Current Valuation of a particular House conducted at the end of the immediately preceding HPI Interval (the "Start Current Valuation"). If the difference is a positive number, the difference can be deemed to be the House Price Appreciation (HPA). If the difference is a negative number, the difference can be deemed to be the House Price Depreciation (HPD). If the difference is zero, then there may be no HPA or HPD.

High-Water Marks

To keep track of the historical changes in valuation for the purposes of determining when HPI Tokens are to be Unlocked, Quarter can establish HPI High-water Marks which can be the highest valuation which the House has reached in a given period of time. If the Current Valuation for a particular House at the end of a certain HPI Interval exceeds the Current Valuation for such particular House at the end of all previous HPI Intervals, then such Current Valuation can be deemed as the HPI High-water Mark for such particular House for the HPI Interval immediately following such HPI Interval for holders of all Asset Tokens linked to such House. When a House is boarded onto the Quarter Platform, the initial HPI High-water Mark can be the Current Valuation when the House is boarded to the Quarter Platform.

In the event the End Current Valuation for a particular House at the end of a certain HPI Interval does not exceed the Start Current Valuation for such particular House for all previous HPI Intervals, but does exceed the End Current Valuation which has occurred at the end of all previous HPI Periods during the term of ownership of any current Asset Token holders whose Asset Tokens are linked to the SPE for such particular House, such Current Valuation can be deemed as the HPI High-water Mark for those particular Asset Tokens for such particular House for the HPI Interval immediately following such HPI Interval.

In the event that at the time the Asset Tokens linked to the SPE are to be transferred to a new Investor after the then Current Valuation for a particular House has fallen below the HPI High-water Mark for such Asset Tokens as a result of one or more periods of the decrease in the Current Valuation for that particular House, the transfer can proceed as follows using any combination or all of the following:

(i) Determine the Current Adjusted Asset Token Nominal Value for the transferred tokens, which can be calculated using the following example formula:

$$V_a = \text{MIN}(N_v + ((V_e - V_{HW})/V_{HW}) \times N_v, N_v)$$

$V_a$=The Current Adjusted Asset Token Nominal Value
$N_v$=The Applicable Asset Token Nominal Value
$V_e$=End Current Valuation
$V_{HW}$=High-water Mark The Current Adjusted Asset Token Nominal Value can be calculated as the lesser of (A) the sum of (i) the Applicable Asset Token Nominal Value plus (ii) product of (iii) the quotient of the difference between the End Current Valuation minus the High-water Mark divided by the High-water Mark multiplied by (iv) the Applicable Asset Token Nominal Value, or (B) the Applicable Asset Token Nominal Value.

(ii) Calculate the total number of Asset Tokens to be transferred from the current holder by dividing the net amount to be paid for the transfer by the Current Adjusted Asset Token Nominal Value, which number can be rounded down to a whole number.

(iii) Calculate the total number of Asset Tokens which are transferred to the new Investor by dividing the product of the Current Adjusted Asset Token Nominal Value multiplied by the number of Asset Tokens to be transferred by the transferor by $1.0000, which number can be rounded down to a whole number.

(iv) The Applicable Asset Token Nominal Value for the Asset Tokens transferred to the new Investor can be replaced or updated (as applicable) with the Transferred Asset Token Nominal Value with a value set (e.g., at $1.0000).

(v) The HPI High-water Mark can be updated to the Current Valuation for the House at the time of the transfer for the Asset Tokens to the new Investor.

(vi) The new Investor's future right to Unlocked HPI Tokens for the transferred Asset Tokens can be based on the HPI High-water Mark which can be updated to the Current Valuation for such House at the time of the transfer to the new Investor.

(vii) The total number of Asset Tokens transferred from the transferor of the Asset Tokens can be higher than the total number of Asset Tokens transferred to the new Investors given the difference between the Current Adjusted Asset Token Nominal Value and $1.0000. The remaining Asset Tokens which were not transferred to the new Investor (the "Excess Asset Tokens"), if any, can have the Applicable Asset Token Nominal Value replaced or updated with the Redeemed Asset Token Nominal Value, which can be set (e.g., to $0.0000), and can be transferred to the Quarter Contingency Fund. However, such Asset Tokens transferred to the Quarter Contingency Fund can still be eligible to receive the pro rata share of the TIC Fee distributed from the Fund.

Unlocking HPI Tokens for Asset Token Holders

If on a certain HPA/HPD Determination Date, the End Current Valuation does not exceed the HPI High-water Mark for a specific Asset Token held by an Investor linked to the SPE for such particular House, then no HPI Tokens may be Unlocked for the current Asset Token holder of that Asset Token which is linked to the SPE for such particular House.

If on a certain HPA/HPD Determination Date, the End Current Valuation is greater than the HPI High-water Mark for a specific Asset Token held by an Investor linked to the SPE for such particular House, then HPI Tokens held by the current Asset Token holder of that Asset Token which is linked to the SPE for such particular House may be Unlocked based on the following example formula:

$$T_u = \text{MIN}((V_e - V_s)/V_s, (V_e - H_w)/H_w) \times R \times N_v / \text{MAX}(T_b, T_v)$$

$T_u$=Number of HPI Tokens Unlocked for each Asset Token
$V_e$=End Current Valuation
$V_s$=Start Current Valuation
$H_w$=HPI High-water Mark
$R$=HPI Realization Percentage
$N_v$=The Applicable Asset Token Nominal Value
$T_v$=HPI Token Market Value*
$T_b$=HPI Token Book Value**

\* The HPI Token Market Value may not exist until a secondary market for the trading of HPI Tokens has been established. Prior to such secondary market, HPI Token Book Value may be used.

\*\* The HPI Token Book Value can be the quotient of the sum of the Aggregate Appreciation Value and cash balance in the HPI Asset Pool Cash Account divided by the then existing total number of Unlocked HPI Tokens.

As shown in the above formula, the number of HPI Tokens Unlocked for each Asset Token for a particular SPE can be computed with any combination or all of the following:

Step 1: multiplying (A) the lesser of (i) End Current Valuation (in US Dollars) of a particular House at the time of the valuation minus the Start Current Valuation (in US Dollars), the result of which can then be divided by the Start Current Valuation (in US Dollars), or (ii) End Current Valuation (in US Dollars) of a particular House at the time of the valuation minus the then existing HPI High-water Mark (in US Dollars), the result of which can then be divided by the HPI High-water Mark (in US Dollars), by (B) the HPI Realization Percentage.

Step 2: The result of Step 1 can then be multiplied by the Applicable Asset Token Nominal Value.

Step 3: The result of Step 2 can then be divided by (C) the greater of the HPI Token Book Value or the then-existing market price of the HPI Tokens ("HPI Token Market Value").

If the result of Step 3 is zero or a negative number, then no HPI Tokens can be Unlocked.

Unlocking HPI Tokens Issued without Asset Tokens

In addition to the HPI Tokens issued to Asset Token holders as part of the Bundle, certain amounts of Unlocked HPI Tokens can be issued to Quarter and the HPI Token Rights Purchasers by the Fund; provided, however, in some embodiments, in no event can the pro-rata share of the House Price Appreciation used to calculate the number of HPI Tokens Unlocked to Quarter and the HPI Token Rights Purchasers (the "Quarter HPI Realization") pursuant to this Memorandum exceed a certain percentage (e.g., 5.00%) of the total House Price Appreciation of a particular House during a given HPI Interval for which HPI Tokens are Unlocked. If on a certain HPA/HPD Determination Date, the End Current Valuation is greater than the HPI High-water Mark for such particular House, then the number of HPI Tokens Unlocked to Quarter and the HPI Token Rights Purchasers pursuant to this paragraph can be an amount calculated pursuant to the following example formula:

$$T_u = (V_e - H_w)/H_w \times A_{tot} \times R_q / \text{MIN}(T_b, T_v)$$

$T_u$=Number of Unlocked HPI Tokens
$V_e$=End Current Valuation
$H_w$=HPI High-water Mark of House
$A_{tot}$=Total Current Asset Token Nominal Value
$R_q$=Quarter HPI Realization
$T_v$=HPI Token Market Value
$T_b$=HPI Token Book Value As shown in the above formula, the number of HPI Tokens Unlocked for the benefit of Quarter and the HPI Token Rights Purchasers for a particular SPE can be computed using any combination or all of the following:

Step 1: dividing (A) End Current Valuation (in US Dollars) of a particular House at the time of the valuation minus the HPI High-water Mark, by (B) the HPI High-water Mark of the House.

Step 2: the result of Step 1 can then be multiplied by the Total Current Asset Token Nominal Value. To calculated this, following example formula can be used:

$$A_{tot}=(V_a^1+V_a^2+\ldots+V_a^n) \text{ where } n=\text{the total number of Activated Asset Tokens linked the SPE}$$

$A_{tot}$=Total Current Asset Token Nominal Value
$V_a$=Current Adjusted Asset Token Nominal Value As shown in the formula above, to determine the Total Current Asset Token Nominal Value for all the Asset Tokens linked to the SPE, one can add together the Current Adjusted Asset Token Nominal Value for every Asset Token linked to the SPE.

Step 3: the result of Step 2 can then be multiplied by the Quarter HPI Realization.

Step 4: the result of Step 3 can then be divided by (C) the lesser of the then-existing HPI Token Market Value or HPI Token Book Value.

HPI Asset Pool Allocations from Sale Activities

When a House that has appreciated sufficiently to cause the Unlock of HPI Tokens for the holders of Asset Tokens to which the House is linked to is sold and leaves the Quarter Platform, a portion of the sales proceeds can be paid to the HPI Asset Pool. The mechanics of the sale and calculation of the sales proceeds to be paid to the HPI Asset Pool is as follows:

(i) If a House is sold during any HPI Interval, then the closing date of the sale of the House can be substituted for the scheduled HPA/HPD Determination Date, and the number of HPI Tokens Unlocked for each Asset Token for such SPE linked to the House can be computed and released to the Asset Token holder's Digital Wallets. Each Asset Token holder can be entitled to distribution of a share of the sale proceeds generated by the sale of the SPE's TIC Interest which can be equal to the Current Adjusted Asset Token Nominal Value for each Asset Token held as of the date of closing of the sale of the House linked to the SPE. The Fund can use the sales proceeds received by the HPI Asset Pool (as calculated below) to buy back the Unlocked HPI Tokens associated with the Asset Tokens sold by the Investors and transferred to the Treasury Pool as part of the sale, which HPI Tokens can then be transferred to the HPI Token Escrow Pool.

(ii) The amount of the sale proceeds allocated to the HPI Asset Pool can be calculated using the following example formula:

$$H_a=S_p-A_{tot}$$

$H_a$=HPI Asset Pool Sale Proceeds Allocation
$S_p$=Sale Proceeds from SPE's TIC Interests
$A_{tot}$=Total Current Asset Token Nominal Value Step 1: One can determine the Total Current Asset Token Nominal Value for all the Asset Tokens linked to the SPE.

Step 2: Once can calculate the HPI Asset Pool Sale Proceeds allocation, which can be the amount equal to the sale proceeds from the sale of the TIC Interests held by the SPE minus the Total Current Asset Token Nominal Value and can be paid to the HPI Asset Pool at the time of the closing of the sale.

The Fund can then use the sales proceeds received by the HPI Asset Pool to buy back Unlocked HPI Tokens equal to the amount of the sales proceeds received in the HPI Asset Pool, which Unlocked HPI Tokens can then be transferred to the HPI Token Escrow Pool.

In the event that the Homeowner sells a portion of the TIC Interests owned by the Homeowner to the SPE during any HPI Interval, then the closing date of such sale can be substituted for the start date of the HPI Interval for the next immediately scheduled HPA/HPD Determination Date, and the number of HPI Tokens Unlocked for each Asset Token for such SPE linked to the House can be computed and released to the Asset Token holder's Digital Wallet on a certain date (e.g., the next immediately scheduled HPA/HPD Determination Date which occurs); and accordingly, the closing date of such sale can be used to determine the Start Current Valuation of the House.

If (i) the supply of HPI Tokens issued to Asset Token holders at the time when the Asset Tokens are issued to the Asset Token holders is exhausted, (ii) the market or book value (as applicable) of the total issued but locked HPI Tokens (calculated on an post Unlocked basis) falls below a certain amount (100% of the increase in the Aggregate Appreciation Value during the most recent 12 month period), or (iii) the market of book value (as applicable) of the total issued but locked HPI Tokens (as calculated on a post Unlocked basis) held by Asset Tokens holders for a specific SPE linked to a specific House falls below a certain amount (e.g., 100% of the House Price Appreciation during the most recent HPI Interval), then additional locked HPI Tokens can be issued by the Fund to the Investors and other Asset Token or HPI Token rights holders, which can be delivered to the HPI Token Escrow Pool in proportion to the amount of Asset Tokens or HPI Token rights they hold, to replenish the supply in amounts as Quarter may determine from time to time.

Illustrations and Examples of how the HPI Token Mechanisms can Work

Note that modifications to these examples can be made for use in other embodiments. FIG. 31 illustrates an example scenario with no transfer of the Asset Tokens during any of the HPI Intervals.

A House is boarded to the Quarter Platform at the Current Valuation of $250,000. Accordingly, the HPI High-water Mark is initially $250,000. The HPI Realization Percentage is 90%.

The Homeowner purchases TIC Interests of 20% and the SPE purchases TIC Interests of 80%. Thus, the total amount paid by the SPE is $200,000 (=$250,000×80%).

The Original Asset Token Nominal Value is $1.0000, therefore a total of 200,000 Activated Asset Tokens are linked to the SPE ($200,000/$1.0000), of which 2,500 (=250,000×1%) Activated Asset Tokens will be transferred to Quarter Contingency Fund. 197,500 (=200,000−2,500) Activated Asset Tokens will be held by Asset Token Purchasers.

Since there is no transfer of the Asset Tokens during any of the HPI Intervals, Original Asset Token Nominal Value will be used as the Applicable Asset Token Nominal Value in this example.

At the end of HPI interval #1, the Current Valuation of the House rises from $250,000 to $312,500, which is higher than the HPI High-water Mark ($250,000). As a result, the number of HPI Tokens to be Unlocked for each Asset Token held by the holders shall be calculated as follows:

$$T_u = \text{MIN}((V_e - V_s)/V_s, (V_e - H_w)/H_w) \times R \times N_v / \text{MAX}(T_b, T_v)$$

$V_e$=End Current Valuation=$312,500
$V_s$=Start Current Valuation=$250,000
$H_w$=HPI High-water Mark=$250,000
R=HPI Realization Percentage=90%
$N_v$=Applicable Asset Token Nominal Value=Original Asset Token Nominal Value=$1.0000
$T_v$=HPI Token Market Value=$1.0000
$T_b$=HPI Token Book Value=$1.0000

In this example: $(V_e - V_s)/V_s = (V_e - H_w)/H_w$ since there is no decline of the House's Current Valuation. Since the Asset Tokens have not been transferred, the Original Asset Token Nominal Value will be used.

Thus, $T_u = (($312,500 - $250,000)/$250,000) \times 90\% \times $1.000/$1.0000 \approx 0.225$.

For each Activated Asset Token, 0.225 HPI Tokens will be unlocked. For the 197,500 Activated Asset Tokens held by the Asset Token Purchasers in our example, the total number of HPI Tokens Unlocked is $44,437.50 = T_u \times 197,500$. For the 2,500 Activated Asset Tokens held by the Quarter Contingency Fund, the total number of HPI Tokens Unlocked is $562.50 = T_u \times 2,500$.

The number of the HPI Tokens Unlocked to Quarter and HPI Token Rights Purchasers shall be calculated as follows:

$$T_u = (V_e - H_w)/H_w \times A_{tot} \times R_q / \text{MIN}(T_b, T_v)$$

$T_u$=Number of the Unlocked HPI Tokens
$V_e$=End Current Valuation=$312,000
$H_w$=HPI High-water Mark=$250,000
$A_{tot}$=Total Current Asset Token Nominal Value=$200,000
$R_q$=Quarter HPI Realization=5%
$T_v$=HPI Token Market Value=$1.0000
$T_b$=HPI Token Book Value=$1.0000
Thus, $T_u = ($312,500 - $250,000)/$250,000 \times $200,000 \times 5\%/$1.0000 = 2,500$ At the end of the HPI Interval #1, the new HPI High-water Mark is set to $312,500, which will be used in HPI Interval #2 because the End Current Valuation of HPI Interval #1 is greater than the then-current HPI High-water Mark ($250,000). At the end of the HPI Interval #1, a total of 47,500 (=44,437.50+562.50+2,500) HPI Tokens are Unlocked.

For HPI Interval #2, the same formulas used in HPI Interval #1 will be used. Because the End Current Valuation ($375,000) is greater than the then-current HPI High-water Mark ($312,500), 27,580.65 HPI Tokens will be Unlocked for Asset Token holders (27,235.89 for the Asset Token Purchasers and 344.76 for the Quarter Contingency Fund) and 1,532.26 HPI Tokens will be Unlocked for Quarter and HPI Token Rights Purchasers. A Total of 29,112.90 HPI Tokens will be Unlocked during HPI Interval #2. At the end of the HPI Interval #2, a cumulative total of 76,612.90 (=29,112.90+47,500.00) HPI Tokens will have been Unlocked. The new HPI High-water Mark is set to $375,000 which will be used in HPI Interval #3 because the End Current Valuation of HPI Interval #2 is greater than the then-current HPI High-water Mark ($312,500).

For HPI Interval #3, HPI Interval #4, and HPI Interval #5, because of the deprecation of the House's value, the End Current Valuation is not greater than the then current HPI High-water Mark ($375,000), no HPI Tokens will be Unlocked for Asset Token holders or Quarter.

For HPI Interval #6, because of the appreciation of the House's value, the End Current Valuation ($450,000) is greater than the then current HPI High-water Mark ($375,000), using the same formula, 22,607.09 HPI Tokens will be Unlocked for the Asset Token holders (22,324.50 for the Asset Token Purchasers and 282.59 for the Quarter Contingency Fund) and 1,255.95 HPI Tokens will be Unlocked for Quarter and HPI Token Rights Purchasers. A Total of 23,863.04 HPI Tokens will be Unlocked for HPI Interval #6. At the end of the HPI Interval #6, the cumulative HPI Tokens Unlocked will be 100,475.94 (=23,863.04+76,612.90).

FIGS. 32A and 32B illustrate an example scenario with the transfer of Asset Tokens during the HPI Intervals. A House is boarded to the Quarter Platform at the Current Valuation of $250,000. Accordingly, the HPI High-water Mark is initially $250,000. The HPI Realization Percentage is 90%.

In this example, Investor A and Investor B both invest in the SPE, and in return, receive both the Asset Tokens and the HPI Tokens. Investor A holds 100,000 Activated Asset Tokens and Investor B also holds 100,000 Activated Asset Tokens. They each transfer 1,250 Activated Asset Tokens to the Quarter Contingency Fund leaving Investor A with 98,750 Activated Asset Tokens and Investor B with 98,750 Activated Asset Tokens.

The Current Valuation of the House rises in HPI Intervals #1 and #2, and certain amounts of Investor A's and Investor B's HPI Tokens are released from the "time lock" at the end of HPI Intervals #1 and #2, respectively, as follows:

At the end of HPI Interval #1:

$(V_e - V_s)/V_s = (V_e - H_w)/H_w$, since there is no decline of the House's Current Valuation. Since the Asset Tokens have not been transferred, the Original Asset Token Nominal Value will be used.

A total of 22,218.75 HPI Tokens held by Investor A shall be Unlocked. (($312,500−$250,000)/$250,000)×90%×$1.0000/$1.0000×98,750,000=22,218.75.

A total of 22,218.75 HPI Tokens held by Investor B shall be Unlocked. (($312,500−$250,000)/$250,000)×90%×$1.0000/$1.0000×98,750,000=22,218.75.

A total of 562.50 HPI Tokens held by the Quarter Contingency Fund shall be Unlocked=(($312,500−$250,000)/$250,000)×90%×$1.0000/$1.0000×2,500=562.50.

A total of 2,500 HPI Tokens held by Quarter shall be Unlocked=($312,500−$250,000)/$250,000×$200,000×5%/$1.0000=2,500.

At the end of HPI Interval #2:

$(V_e - V_s)/V_s = (V_e - H_w)/H_w$, since there is no decline of the House's Current Valuation. Since the Asset Tokens have not been transferred, the Original Asset Token Nominal Value will be used.

A Total of 13,617.94 HPI Tokens held by Investor A shall be Unlocked. (($375,000−$312,500)/$312,500)×90%×$1.0000/$1.3053×98,750=13,617.94.

A Total of 13,617.94 HPI Tokens held by Investor B shall be Unlocked. (($375,000−$312,500)/$312,500)×90%×$1.0000/$1.3053×98,750=13,617.94.

A total of 344.76 HPI Tokens held by the Quarter Contingency Fund shall be Unlocked. (($375,000−$312,500)/$312,500)×90%×$1.0000/$1.3053×2,500=344.76.

A total of 1,532.26 HPI Tokens held by Quarter shall be Unlocked. ($375,000−$312,500)/$312,500×$200,000×5%/$1.3053=1,532.26.

At the end of HPI Interval #3: the Current Valuation of the House then drops in HPI Interval #3 and is lower than the then current HPI High-water Mark. Therefore, no HPI Tokens will be Unlocked for Investor A, Investor B or the Quarter Contingency Fund.

However, Investor A holds her Asset Tokens as does the Quarter Contingency fund while Investor B sells his Asset Tokens to a new Investor, Investor C, after the Current Valuation drops at the end of HPI Interval #3. As stated above, in the event that at the time the Asset Tokens linked to the SPE are transferred to a new Investor, and the then Current Valuation for the particular House owned by the SPE the Asset Tokens are linked to has fallen below the HPI High-water Mark, the HPI High-water Mark value applicable to the transferred tokens shall be removed and replaced by the Current Valuation for the House at the time of the transfer to the new Investor, and Applicable Asset Token Nominal Value to be used shall be the Transferred Asset Token Nominal Value with a value set at $1.0000. Meanwhile, the Excess Asset Tokens in an amount of 19,750 (=98,750−79,000) are transferred to the Quarter Contingency Fund.

The mechanics work as follows:
Starting by determining the Current Adjusted Asset Token Nominal Value.

$V_a = MIN(N_v + ((V_e - V_{HW})/V_{HW}) \times N_v, N_v)$ $V_a$=The Current Adjusted Asset Token Nominal Value
$N_v$=The Applicable Asset Token Nominal Value
$V_e$=End Current Valuation
$V_{HW}$=Highwater Mark In this example the Original Asset Token Nominal Value is applicable since there is no transfer or redemption of the Asset Tokens, so $V_a$=MIN ($1.0000+(($300,000−$375,000)/$375,000×$1.0000, $1.0000), thus the Current Adjusted Asset Token Nominal Value is $0.8000.

Next, determine the amount of Asset Tokens transferred to Investor C.

In this example, Investor B is selling all 98,750 of his Asset Tokens at the Current Adjusted Asset Token Nominal Value of $0.8000 which is equal to $79,000.00 (98,750×$0.8000=$79,000). Since the Asset Tokens transferred to Investor C shall have the Applicable Asset Token Nominal Value set to the Transferred Asset Token Nominal Value, which will be set at $1.0000, we can calculate that Investor C shall receive 79,000 Asset Tokens ($79,000×$1.0000=79,000). The HPI High-water Mark for these 79,000 tokens shall be reset to $300,000, which is the Current Valuation for the House at the time of the transfer to Investor C.

Then, determine the amount of Asset Tokens transferred to the Quarter Contingency Fund.

In this example, Investor B sold 98,750 of his Asset Tokens and Investor C received 79,000 of them. This leaves 19,750 Asset Tokens (98,750−79,000=19,750) to be transferred to the Quarter Contingency Fund. Those Asset Tokens will have their Applicable Asset Token Nominal Value set to the Redeemed Asset Token Nominal Value, which will be set at $0.0000. Notably, these tokens are no longer eligible to Unlock HPI Tokens, so the HPI High-water Mark is not applicable.

At HPI Interval #3, HPI Interval #4, and HPI Interval #5, the Current Adjusted Asset Token Nominal Value of the Asset Tokens held by Investor A and the Quarter Contingency Fund drops but then increases during the subsequent HPI Intervals as the Current Valuation rises again (as illustrated in FIG. 32A) as Investor A did not transfer her Asset Tokens and neither did the Quarter Contingency Fund. Since Investor B transferred his tokens, the Current Adjusted Asset Token Nominal Value of the Asset Tokens held by Investor B drops but resets when Investor B sells his Asset Tokens to Investor C and Applicable Asset Token Nominal Value of the Asset Tokens transferred to Investor C is replaced with the Transferred Asset Token Nominal Value, which is set to $1.0000 and remains unchanged during HPI Intervals #4, #5, and #6. For Investor C, the HPI High-water Mark for HPI Interval #4 is $300,000 because it is the Current Valuation at the time of transfer of the Asset Tokens to Investor C. Investor A and Quarter Contingency Fund do not Unlock any additional HPI Tokens until the HPI High-water Mark of $375,000 is surpassed in HPI Interval #6. Investor C Unlocks HPI Tokens at the end of HPI Intervals #4, #5 and #6.

At the end of HPI Interval #4, with respect to Investor C only, the Transferred Asset Token Nominal Value of $1.0000 will be used as the Applicable Asset Token Nominal Value in the formula. A total of 5,198.18 HPI Tokens held by Investor C shall be Unlocked=(($325,000−$300,000)/$300,000)×90%×$1.0000/$1.1398×79,000=5,198.18.

The HPI High-water mark becomes $325,000 for HPI Interval #5 for Investor C.

At the end of HPI Interval #5, with respect to Investor C only, the Transferred Asset Token Nominal Value of $1.0000 will be used as the Applicable Asset Token Nominal Value in the formula. A total of 8,224.20 HPI Tokens held by Investor C shall be Unlocked=(($375,000−$325,000)/$325,000)×90%×$1.0000/$1.3300×79,000=8224.20. The HPI High-water mark becomes $375,000 for HPI Interval #6 for Investor C, which is also the HPI High-water Mark for Investor A's and Quarter Contingency Fund's Asset Tokens.

At the end of HPI Interval #6, a total of 11,013.92 HPI Tokens held by Investor A shall be Unlocked=(($450,000−$375,000)/$375,000)×90%×$1.0000/$1.6139×98,750=11,013.92. Since there has been no transfer by Investor A, the Applicable Asset Token Nominal Value shall be the Original Asset Token Nominal Value.

A total of 8,811.13 HPI Tokens held by Investor C shall be Unlocked=(($450,000−$375,000)/$375,000)×90%×$1.0000/$1.6139×79,000=8,811.13. The Applicable Asset Token Nominal Value of the Asset Tokens transferred to Investor C is replaced with the Transferred Asset Token Nominal Value, which is set to $1.0000 at the time of transfer and remains unchanged during HPI Intervals #4, #5, and #6.

A total of 278.83 HPI Tokens held by the Quarter Contingency Fund shall be Unlocked=(($450,000−$375,000)/$375,000)×90%×$1.0000/$1.6139×2,500=278.83. Since there has been no transfer by the Quarter Contingency Fund, the Applicable Asset Token Nominal Value shall be the Original Asset Token Nominal Value.

No HPI Tokens shall be Unlocked for the 19,750 Asset Tokens transferred to the Quarter Contingency Fund by Investor B as they are not eligible to receive Unlocked HPI Tokens. However, such 19,750 Asset Tokens are still eligible to receive the pro rata share of the TIC Fee distributed from the Fund.

If the House in our example transaction is sold and removed from the Quarter Platform at the end of HPI Interval #6, each Asset Token holder is entitled to distribution of a share of the sale proceeds generated by the sale of the SPE's TIC Interest which is equal to the Current Adjusted Asset Token Nominal Value for each Asset Token held as of the date of closing of the sale of the House linked to the SPE.

In our example, there are four discrete groups of Asset Tokens for which we can calculate the entitlement to sales proceed distributions.

Investor A's 98,750 Asset Tokens have a Current Adjusted Asset Token Nominal Value of $1.0000 at the time of the closing of the sale. Thus, the share of the sale proceeds from the sale of the SPE's TIC Interests for each of Investor A's Asset Tokens is $1.0000. Therefore, Investor A's share of the sale proceeds from the sale of the House her Asset Tokens are linked to is $98,750=98,750×$1.0000.

Investor C's 79,000 Asset Tokens have a Current Adjusted Asset Token Nominal Value of $1.0000 at the time of the closing of the sale. Thus, the share of the sale proceeds from the sale of the SPE's TIC Interests for each of Investor C's Asset Tokens is $1.0000. Therefore, Investor C's share of the sale proceeds from the sale of the House her Asset Tokens are linked to is $79,000=79,000×$1.0000.

The Quarter Contingency Fund's 2,500 Asset Tokens which were transferred at boarding and have a Current Adjusted Asset Token Nominal Value of $1.0000 at the time of the closing of the sale. Therefore, the share of the sale proceeds from the sale of the SPE's TIC Interests for each of the Quarter Contingency Fund's Asset Tokens held since boarding of the House on the Quarter Platform is $2,500=2,500×$1.0000.

The Quarter Contingency Fund's 19,750 Asset Tokens have a Current Adjusted Asset Token Nominal Value of $0.0000 at the time of the closing of the sale. Therefore, the share of the sale proceeds from the sale of the SPE's TIC Interests for each of the Quarter Contingency Funds Asset Tokens is $0.0000=19,750×$0.0000.

The HPI Asset Pool is also entitled to a share of the proceeds from the sale of the SPE's TIC Interests which is calculated as follows:

$$H_a = S_p - A_{tot}$$

$H_a$=HPI Asset Pool Sale Proceeds Allocation
$S_p$=Sale Proceeds from SPE's TIC Interests
$A_{tot}$=Total Current Asset Token Nominal Value Determine the Total Current Asset Token Nominal Value for all the Asset Tokens linked to the SPE by adding together Current Adjusted Asset Token Nominal Value for all of the Asset Tokens linked to the SPE as follows:

$$A_{tot} = (V_a^1 + V_a^2 + \ldots + V_a^n) \text{ where } n = \text{the total number of Activated Asset Tokens linked the SPE}$$

$A_{tot}$=Total Current Asset Token Nominal Amount
$V_a$=Current Adjusted Asset Token Nominal Value In this example, at the end of HPI Interval #6, Investor A holds 98,750 Asset Tokens, each with a Current Adjusted Asset Token Nominal Value of $1.0000, Investor C holds 79,000 Asset Tokens, each with a Current Adjusted Asset Token Nominal Value of $1.0000, and the Quarter Contingency Fund holds 2,500 Asset tokens with a Current Adjusted Asset Token Nominal Value of $1.0000, and also holds 19,750 Asset Tokens, each with a Current Adjusted Asset Token Nominal Value of $0.0000.

Therefore, $A_{tot}$=((98,750×$1.000)+(79,000× $1.0000)+(2,500×$1,0000)+(19,750×$0.0000))= $180,250.

Applying the Total Current Asset Token Nominal Value of $180,250 as calculated above, the amount of sales proceeds to be allocated and paid to the HPI Asset Pool are determined as follows:

$$H_a = S_p - A_{tot}$$

$H_a$=HPI Asset Pool Sales Proceeds Allocation
$S_p$=Sale Proceeds from the SPE's TIC Interests
$A_{tot}$=Total Current Asset Token Nominal Value In this example, the Sales Proceeds SPE's TIC Interests is $360,000 which we calculate by multiplying (A) the Current Valuation of the House at the time of the closing of the sale by (B) the TIC Interests held by the SPE=$450,000× 80%=$360,000.

Therefore, $H_a$=($360,000−$180,250)=$179,750.

In summary, Investor A will receive $98,750 from the sale of the House at the end of HPI Interval #6, Investor C will receive $79,000 from the sale of the House at the end of HPI Interval #6, The Quarter Contingency Fund will receive $2,500 ($2,500 for the Asset Tokens held since boarding and $0.0000 from the Asset Tokens transferred from Investor B) from the sale of the House at the end of HPI Interval #6, and The HPI Asset Pool will receive $179,750 from the sale of the House at the end of HPI Interval #6.

Example Terms and Conditions for the Real Estate Agreement

Payments

Figure 26:
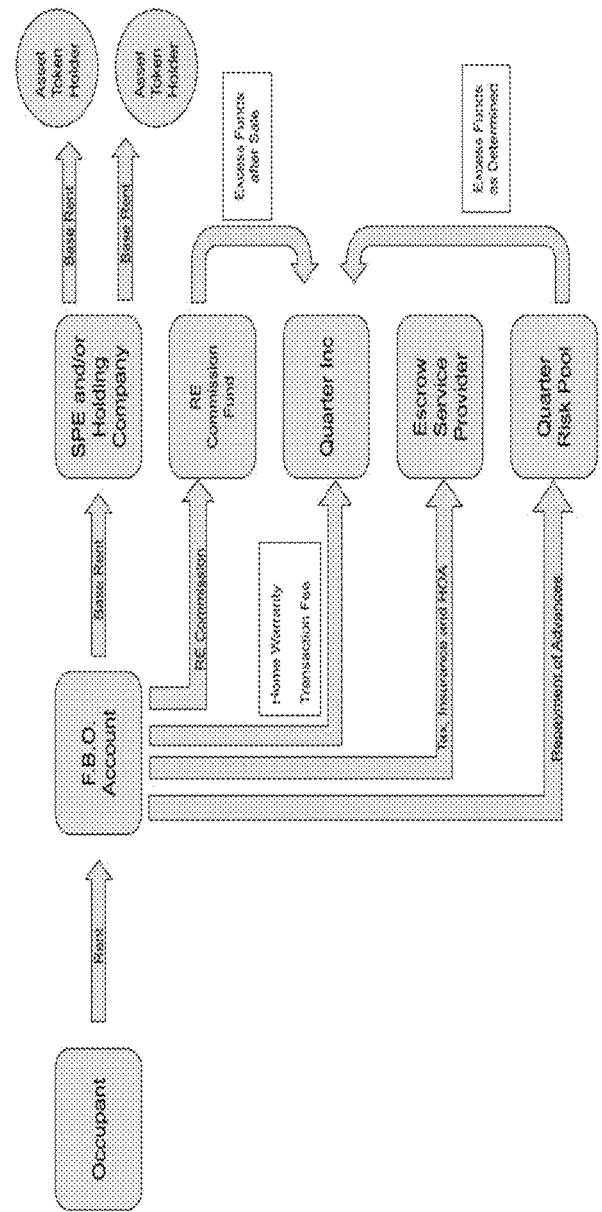

In consideration of Homeowner's right to live in the House (via the Occupancy Token), Homeowner can make the Payments through the Quarter Platform Homeowner Dashboard. For example, Occupancy Tokens may not be offered for sale. Upon the sale of the House, the real estate sales commission can be paid by the Quarter Real Estate Commission Fund, up to the amounts linked to the House sitting with the Quarter Real Estate Commission Fund. To the extent that the amounts linked to the House sitting with the Quarter Real Estate Commission Fund are insufficient to pay the real estate sales commission, the Homeowner can pay the deficiency at closing. If the amounts linked to the House sitting with the Quarter Real Estate Commission Fund exceed the actual real estate sales commission, the excess can be paid to Quarter. The Payments received from the Homeowner can be distributed as shown in FIG. 26, with the Homeowner being the Occupant.

The Quarter Platform can decide whether an escrow is required for real estate taxes, insurance, and HOA fees (the "Property Escrow Account"). The determination of whether there will be a Property Escrow Account can be based on an algorithm using various consumer and property data points as well as local jurisdictional requirements and can be determined by Quarter from time to time. Any escrow payments (the "Property Escrow Amounts") can be paid by Homeowner as a part of the Payments and can be distributed to Property Escrow Account maintained by a third-party escrow services provider. Unless included in the Payments as the Escrow Amounts, real estate taxes, insurance premiums, and HOA fees (including fines) as they become due can be paid by the Homeowner directly to the appropriate taxing, insurance, or HOA authorities/agent(s). Payments can be made in fiat currency (e.g., USD).

Purchase and Sale Rights

Subject to the following paragraph, the Homeowner can have the right to sell a portion of the Real Estate Interests held by the Homeowner to the SPE. Some or all Investors can have the right to purchase the Homeowner's Real Estate Interests at a price determined via a pre-determined formula in proportion to total Asset Tokens linked to the SPE. As a result of the sale, the Homeowner can receive the sales proceeds and the Base Rent paid by the Homeowner can be increased pursuant to a pre-determined formula set forth below. The Homeowner can also have the right to purchase a portion of Real Estate Interests held by the SPE at a pre-determined price and/or Investors whose Asset Tokens are linked to the SPE can have the obligation to sell their Asset Tokens in proportion to their existing percentages of the total Asset Tokens linked to the SPE. The Homeowner's Base Rent can thereby be reduced pursuant, such as according to the example pre-determined formula set forth below. (Note that many variations of this formula may also be used. For example, in some embodiment, some variables may not be used and/or some variables may be added). Homeowner can pay the recordation or transfer taxes on the sale of Real Estate Interests or the House, if any.

Homeowner can have the right to purchase and/or sell Real Estate Interests as follows:
  (i) If there is no uncured default by Homeowner pursuant to the Real Estate Agreement, Homeowner can have the right to purchase any and all portion of the Real Estate Interests held by SPE at any time (the "Interests subject to Purchase"). The purchase price payable by Homeowner can, for example, be equal to (A) (i) the Current Valuation of such Interests subject to Purchase determined by Quarter at the time of purchase if the transaction amount is no more than a predetermined amount, and if the Interests subject to Purchase is no more than a predetermined amount and/or percentage of the total interests in the property or (ii) the Current Enhanced Valuation of such Interests subject to Purchase determined by Quarter at the time of purchase if the transaction amount exceeds a predetermined amount or if the Interests subject to Purchase exceeds a predetermined amount and/or percentage of the total interests in the House, plus (B) all of the transfer and recordation taxes and other fees that become due as a result of the purchase of such Real Estate Interests, and the applicable Platform Transaction Fee.
  (ii) If there is no uncured default by Homeowner pursuant to the Real Estate Agreement, Homeowner can have the right to sell a portion (but, in some embodiments, not all) of the Real Estate Interests, up to the amount of the Excess Equity (the "Interests subject to Sale"). [The purchase price payable by Homeowner can be equal to (A) (i) the Current Valuation of such Interests subject to Sale determined by Quarter at the time of sale if the amount of Excess Equity is no more than a predetermined amount, and if the Interests subject to Sale is no more than a predetermined amount or percentage of the total Real Estate Interests in the House or (ii) the Current Enhanced Valuation of such Interests subject to Sale determined by Quarter at the time of sale if the amount of Excess Equity exceeds a predetermined amount or if the Interests subject to Sale exceeds a predetermined amount or percentage of the total Real Estate Interests in the House, plus (B) all of the transfer and recordation taxes and other fees that become due as a result of the sale of such Real Estate Interests, and the applicable Platform Transaction Fee.
  (iii) If the Homeowner either purchases or sells Real Estate Interests, the Quarter Platform could make changes of respective Real Estate Interests held by Homeowner and SPE in the House via amendment(s) to the Real Estate deed. An escrow mechanism can be used (e.g., to avoid possible frequent deed recordation and/or for other reasons) whereby the deeds to be recorded to evidence the change of respective Real Estate Interests held by the Homeowner and/or SPE in the House can be delivered to a third-party escrow agent retained by Quarter. Homeowner, SPE and the escrow agent can enter into a tri-party escrow agreement such that the escrow agent can record the then existing deeds between the Homeowner and SPE at a designated time by Quarter (e.g. annually, quarterly, or otherwise). Prior to next designated recording time, if there is further change to respective Real Estate Interests held by the Homeowner and the SPE, the new amended deed can replace the preceding deed in the escrow agent's possession and/or the preceding deed can be destroyed such that the escrow agent may be able to hold the most recent deed to reflect the then-current respective Real Estate Interests held by the Homeowner and the SPE.

The Homeowner can have the right to sell the House in its entirety to a third-party purchaser as follows:
  (i) The Homeowner can give notice to Quarter through the Quarter Platform Homeowner Dashboard of Homeowner's intent to sell the House.
  (ii) The Homeowner can be barred from requesting to sell the House in its entirety within a pre-determined amount of days of buying or selling Homeowner's Real Estate Interests without first receiving a waiver from Quarter.
  (iii) The Quarter Platform can notify the Investors whose Asset Tokens are linked to the House of the Homeowner's intent to sell the House, and any further trading of such Asset Tokens that are linked to the SPE by the Investors can be barred unless a waiver is obtained from Quarter.
  (iv) Upon receipt of the Homeowner's intent to sell, the Quarter Platform can refer the House to a Quarter Preferred Agent Provider who can recommend a listing price.
    (1) If the suggested listing price is equal to or greater than the Current Valuation of the House, the Homeowner can list the House for sale on the Quarter Platform, or any other platform or website.
    (2) If the suggested listing price is lower than the Current Valuation, then Quarter can conduct a Current Enhanced Valuation. Upon receipt of the Current Enhanced Valuation, the listing price can be set at the greater of the suggested listing price or the Current Enhanced Valuation amount.
    (3) The listing price that satisfies the foregoing clause (1) and (2) shall be deemed to be the "Final Listing Price".
  (v) Homeowner can reimburse the Quarter Platform for the costs incurred by the Quarter Platform in connection with the sale of the House, including the fees incurred by Quarter Platform in connection with the determination of the Current Valuation and the Current Enhanced Valuation.
  (vi) Homeowner can use listing and purchase contract addendums provided by the Quarter Platform (collectively, the "Real Estate Documents").
  (vii) Upon receipt of an offer that is acceptable to the Homeowner and is not less than a predetermined amount and/or percentage below the Final Listing Price (the "Listing Price Floor"), the sale can be deemed approved and the House can proceed to closing pursuant to the Real Estate Documents.

(viii) Upon receipt of an offer that is acceptable to the Homeowner and is lower than the Listing Price Floor, if Homeowner agrees to pay the SPE the difference between the Listing Price Floor and the actual listing price, the sale can be deemed approved, and the House can proceed to closing pursuant to the Real Estate Documents.

(ix) In the event that there is no offer or no offer that is acceptable to the Homeowner within a predetermined amount of time after Quarter Platform's receipt of Homeowner's notice of Homeowner's intent to sell the House, Homeowner can have the right to request Quarter's consent to lower the Final Listing Price or the Listing Price Floor, as applicable, which consent can be made in Quarter's sole discretion.

(x) In the event that the House is sold to a third-party buyer who is an existing user of the Quarter Platform, and/or who used the Quarter Platform to fund the acquisition of the House, Occupancy Token held by the Homeowner can be transferred to such third-party buyer, the then current Payments can be recalculated based upon the sale price of the House.

(xi) To the extent that the amounts (including the Commission Credit) linked to the House sitting with the Quarter Real Estate Commission Fund is insufficient to pay the real estate sales commission at closing date of the sale of the House (the "Sales Closing"), such deficiency ("RE Commission Deficiency") can be deducted from the Homeowner's settlement proceeds. The amounts available in the Quarter Real Estate Commission Fund with respect to the House can be calculated using (A) a credit for a predetermined amount and/or percentage of the gross sale price (valuation at the time of the boarding of the property on the Quarter Platform of the House for each month Homeowner has held its Occupancy Token, up to a maximum of a predetermined amount of time (e.g., 96 months) (the "Commission Credit") and/or (B) the actual amounts linked to the House sitting with the Quarter Real Estate Commission Fund. Capital to fund such Commission Credit will come from the Quarter Real Estate Commission Fund. If the amounts (including the Commission Credit) linked to the House sitting with the Quarter Real Estate Commission Fund exceed the actual real estate sales commission payable at the Sales Closing, the excess can be paid to Quarter for use as general funds without further obligation.

(xii) The Homeowner can be assessed an exit fee in the amount of a predetermined amount and/or percentage of the gross sale price of the House (the "Exit Fee"), which Exit Fee can be paid to Quarter on the Sales Closing unless the Homeowner uses the sales proceeds to purchase another House on the Quarter Platform, in which case the Exit Fee can be a predetermined amount and/or percentage of the gross sale price of the House (the "Reduced Exit Fee") and provided some or all of the following conditions are met:
  (1) In order to qualify for the Reduced Exit Fee, the Homeowner can sign a letter to indicate their intent to use Quarter Platform to purchase a new House prior to the closing of the sale of their existing House (the "Closing").
  (2) The Homeowner can identify a replacement House within 90 days after the Closing, and can close the purchase transaction of a new House through the Quarter Platform within 180 days after the Closing.
  (3) Homeowner can pay the recordation or transfer taxes on the sale of their existing House.

(xiii) If the House is sold to a third-party buyer who is not an existing user of the Quarter Platform, or who is an existing user of the Quarter Platform but did not fund the acquisition via the Quarter Platform, and as a result, the House leaves the Quarter Platform, the Occupancy Token held by the Homeowner can be redeemed by the SPE and Burned, the Real Estate Agreement can automatically terminate on the closing date of the sale to such third party buyer.

(xiv) Homeowner can make payments in fiat currency (USD).

(xv) Sales proceeds from a sale of the entire House can be distributed on the Closing as set forth below (the "Distributions Waterfall"). Note that the proceeds can also be distributed in any other order:
  (1) The proceeds can first be used to pay SPE in proportion to SPE's Real Estate Interests (for illustration purposes, if the proceeds are $300,000 and SPE's Real Estate Interests are 80%, then $240,000 can be paid to SPE). SPE can then distribute the proceeds received to the Fund, and the Fund can then distribute the proceeds received (i) first, to the Asset Token holders other than the Impact Investors, (ii) second, to the HPI Token holders, and (iii) third, to the Impact Investors, all in proportion to the amount of the activated Asset Tokens and the Unlocked HPI Tokens they have with respect to the House.
  (2) The proceeds can next be used to pay any accrued and unpaid amounts advanced by the Quarter Risk Pool.
  (3) The proceeds can then be used to pay any accrued and unpaid Payments (other than the Payments to the Quarter Risk Pool).
  (4) The proceeds can then be used to pay the Exit Fee or the Reduced Exit Fee, as applicable.
  (5) The proceeds can then be used to pay the RE Commission Deficiency.
  (6) The proceeds can then be used to pay Quarter Platform for the costs incurred by the Quarter Platform in connection with the sale of the House, including the fees incurred by Quarter Platform in connection with the determination of the Current Valuation and the Current Enhanced Valuation, as applicable.
  (7) The proceeds can then be used to pay the recordation and transfer tax in connection with the Closing and title policy premiums and other fees charged by the Title Company, as well as the other seller charge shown on the settlement statement in connection with the Closing; except, however, Homeowner has the right to use the balance of the Property Escrowed Amounts held in the Property Escrow Account to pay the seller's pro-rata share of the real estate taxes and HOA dues. After Homeowner's application of the Property Escrowed Amounts linked to the House sitting with the Property Escrow Account, any remaining balance of the Escrowed Amounts can be refunded to the Homeowner.
  (8) Any proceeds remaining can be paid to Homeowner.

Notwithstanding the foregoing, if the proceeds are insufficient to pay any of the foregoing (1)-(7) charges (the "Closing Cost Deficiency"), Homeowner can be responsible for the payment of the Closing Cost Deficiency. If Homeowner is not financially capable to pay such Closing Cost Deficiency, Real Estate Agreement rules can apply.

Default

Homeowner's defaults can include the failure to make the Payments, imposition of liens on the House, failure to repair and maintain the property in good condition, and/or other events set forth in the Real Estate Agreements.

If the Homeowner is found not to be in compliance for any reason costs can be added to the amount of the next scheduled Payment, to be distributed to the Quarter Risk Pool.

In the event Homeowner fails to make the Payments, Platform Transaction Fees and other fees imposed on the Homeowner pursuant to the Real Estate Agreement, SPE can have the right, but not the obligation to cause the Quarter Risk Pool to advance the funds required to pay the delinquent amounts, and such an advance by Quarter Risk Pool at the request of Homeowner can constitute a recourse loan to Homeowner. In the event that there is not sufficient Excess Equity to fully reimburse SPE for such advances, then a lien can be placed on the entirety of Homeowner's Minimum Retained Equity represented by the applicable Interests held by Homeowner for the amount of the shortfall. Placement of a lien can trigger an eviction proceeding, revocation of the Occupancy Token, sale of the Property, and dissolution of the Real Estate Agreement, as determined by Quarter in its sole discretion, on behalf of the SPE.

Homeowner's defaults can include the failure to make the Payments, imposition of liens on the House, failure to repair and maintain the property, and other events set forth in the TIC Agreement.

If the Homeowner is not in compliance with the maintenance requirements and does not cure non-compliance within a certain time (e.g., thirty (30) days of notification of the non-compliance0, then the Homeowner can be considered in breach and a third-party contractor may be hired at the Homeowner's sole expense to perform the necessary maintenance work to bring the House back into compliance, which costs can be due and payable by the Homeowner and added to the amount of the next Payment, to be distributed to the Quarter Contingency Fund.

If the Homeowner does not submit interior and exterior photos of the House within a certain time (e.g., fifteen (15) days following their due date), the Homeowner can be notified of their non-compliance. If the Homeowner is still in non-compliance fifteen (15) days after notification of non-compliance, a third-party can be contracted to inspect the House and photograph and upload the photos at the sole cost of the Homeowner, which costs can be added to the amount of the next scheduled Payment, to be distributed to the Quarter Contingency Fund.

In the event the Homeowner fails to make the Payments, applicable Platform Transaction Fees payable by Homeowner and/or other fees imposed on the Homeowner pursuant to the TIC Agreement, the SPE can have the right, but not the obligation to cause the Quarter Contingency Fund to advance the funds required to pay the delinquent amounts, to the extent that such funds are available to do so.

Contemporaneously with the TIC Agreement, (i) Homeowner, SPE, and an escrow agent selected by Quarter (the "Deed Escrow Agent") can execute and deliver a deed escrow agreement, and (ii) the Homeowner can execute a quit claim deed in connection with its TIC Interests in the House and can deliver such duly executed and duly notarized quit claim deed to the Deed Escrow Agent in escrow (e.g., pursuant to the deed escrow agreement). Deed Escrow Agent can have the right to record the quit claim deed among the land records in the jurisdiction where the House is located if the Homeowner fails to sell its TIC Interests pursuant to a final arbitration award that is entered and confirmed by any federal or state court with jurisdiction (the "Judgment Default") as a result of SPE's exercise of its remedies under the TIC Agreement as a result of the Homeowner's default under the TIC Agreement, beyond any applicable notice and cure period.

With respect to a circumstance in which (i) a default by the Homeowner occurs for which Quarter Contingency Fund advances funds to pay the delinquent amounts and the Homeowner fails to repay the advances made by Quarter Contingency Fund within a certain time (e.g., thirty (30) days after written notice of advance is sent to the Homeowner by Quarter), or (ii) the Homeowner has committed a default that can be cured by the payment of money and Quarter Contingency Fund does not elect to advance the funds required to pay the delinquent amounts or Quarter Contingency Fund's advance is less than the total delinquent amounts (the "Unpaid Delinquent Amounts or Cure Amounts"), the Homeowner can transfer to SPE for zero consideration, a portion (but not its entire TIC Interests in the House, in some embodiments) of its TIC Interests to SPE in an amount equal to (A) (i) repayment amounts owed to Quarter Contingency Fund, and/or (ii) the Unpaid Delinquent Amounts or Cure Amounts, as applicable, and all of the Closing Costs as a result of such transfer of Homeowner's TIC Interests, divided by (B) the then-existing Current Valuation of the House at the time of the transfer by Homeowner, expressed in a percentage form, provided that there is sufficient Excess Equity available to transfer to fully reimburse Quarter Contingency Fund for such advances and/or to fully pay the Unpaid Delinquent Amounts or Cure Amounts and fund the Closing Costs. After the sale pursuant to the foregoing sentence by the Homeowner, the monthly Payments to be paid by Homeowner can be recalculated to reflect the change in the Homeowner's TIC Interests in the House. In the event that there is not sufficient Excess Equity to fully reimburse Quarter Contingency Fund for such advances and/or to fully pay the Unpaid Delinquent Amounts or Cure Amounts and fund the Closing Costs, the Homeowner can have the right to (i) sell all (but not less than all) of the TIC Interests held by Homeowner to SPE pursuant to the Put Option mechanism under Section 3(iv) of the section entitled "Major Terms and Conditions of the TIC Agreement" of this Memorandum; provided, however, the Put Price payable by SPE can be reduced by the unpaid advances made by Quarter Contingency Fund and/or the Unpaid Delinquent Amounts or Cure Amounts, and the Closing Costs, as applicable, or (ii) sell the Interests subject to Sale under a Qualifying Life Event if the Homeowner has a Qualifying Life Event pursuant to the mechanism described in Section 3(i) of the section entitled "Major Terms and Conditions of the TIC Agreement" of this Memorandum, provided that after the sale of the Interests subject to Sale under a Qualifying Life Event, Quarter Contingency Fund can be fully reimbursed for its advances and/or be fully paid the Unpaid Delinquent Amounts or Cure Amounts, the Closing Costs can be fully paid and there is no longer a default by the Homeowner existing under the TIC Agreement. After the sale of all the TIC Interests held by the Homeowner pursuant to the foregoing sentence, the TIC Agreement can automatically terminate and the Homeowner's right to residency in the House can automatically terminate accordingly. Upon such termination, the Homeowner can surrender the possession of the House to SPE in the Surrender Conditions.

If the Homeowner defaults in its obligation to sell its TIC Interests in accordance with the TIC Agreement, the SPE can have the right, in addition to any other remedies that may be available to it, to seek specific performance of the Homeowner's obligations to sell its TIC Interests.

In the event that the Homeowner fails to surrender the possession of the House after the termination of the TIC Agreement, the SPE can have the right to bring an unlawful detainer or trespass action against the Homeowner and enter the House and remove the Homeowner or any other occupants to take possession of the House.

If either the Homeowner or the SPE is in bankruptcy, the other party can have the right to buy all of the bankrupt party's TIC Interests in the House for the fair market value to be determined pursuant to the procedures determined under the TIC Agreement. If, under federal bankruptcy law, similar debtor relief laws, or other laws affecting the House, the foregoing option to purchase is voided or declared unenforceable, the non-bankrupt party can have a right of first refusal to buy the TIC Interests of a bankrupt party in the event of any proposed transfer by a trustee, receiver, conservator, liquidator, guardian, or other custodian. Such right of first refusal can provide that the non-bankrupt party may buy the bankrupt party's TIC Interests in the House at the same price and on the same terms as such TIC Interests is proposed to be sold by such trustee, receiver, conservator, liquidator, guardian or other custodian. If, under federal bankruptcy law, similar debtor relief laws, or other laws affecting the House, such right of first refusal requires an order from a judge of the bankruptcy court having jurisdiction permitting such sale of the bankrupt party's TIC Interests in the House, the Homeowner and the SPE can cooperate to obtain such order.

Any dispute, controversy or claim arising out of or relating in any way to the TIC Agreement, can be exclusively resolved by mandatory, final, and binding arbitration upon a party's submission of the dispute to arbitration; provided, however, the SPE has the right to proceed concurrently with the unlawful detainer action or trespass action against the Homeowner in the courts having jurisdiction in the event that the Homeowner fails to surrender the possession of the House after the termination of the TIC Agreement. The demand for arbitration can be made within a reasonable time after the claim, dispute or other matter in question has arisen, and in some embodiments, in no event can it be made after a certain time (e.g., one (1) year from when the aggrieved party knew or should have known of the controversy, claim, dispute or breach). The parties can maintain the confidential nature of the arbitration proceeding and the arbitration award, including the arbitration hearing, except as may be necessary to prepare for or conduct the arbitration hearing on the merits, or except as may be necessary in connection with a court application for a preliminary remedy, a judicial challenge to an award or its enforcement, or unless otherwise required by law or judicial decision. The decision of the arbitrator may not be appealed. The decision of the arbitrator may be submitted to any court of competent jurisdiction by the party designated in the decision. If, for any reason, the arbitration clauses in the TIC Agreement are found to be unenforceable or inapplicable, then the Homeowner and the SPE agree that a court designated in the TIC Agreement have jurisdiction over any dispute arising out of or relating to the TIC Agreement; provided, however, under no circumstances in some embodiments, can any proceeding before such court be a jury proceeding and the parties can avail themselves of any available accelerated trial options available under applicable law or court procedure.

Capital Improvements

Subject to the conditions below and other conditions set forth in the Real Estate Agreement, Homeowner can have the right to make capital improvements to the House.

A. Homeowner must notify the Quarter Platform not less than a predetermined amount of time in advance of any plans to make capital improvements to the House.

B. A Current Enhanced Valuation can be ordered by Quarter to determine the pre- and post-improvement value of the House in order to calculate the Capital Improvement Value. The post-improvement valuation can require an onsite inspection to confirm the work has been completed. Homeowner can bear all the costs for valuations and inspections. The Capital Improvement Value can be calculated by subtracting the pre-improvement value from the post-improvement value. Upon the sale of the House, Homeowner can be entitled to receive a credit equal to the Capital Improvement Value.

Subject to any combination or all of the conditions below and other conditions set forth in the TIC Agreement, the Homeowner can have the right to make capital improvements to the House.

A. The Homeowner can notify Quarter via the Quarter Platform Dashboards not less than a certain time (e.g., 30 days in advance of any plans to make capital improvements to the House), the total cost of which exceed an amount specified in the TIC Agreement (the "Major Capital Improvements").

B. A Current Enhanced Valuation can be ordered by Quarter to determine the pre- and post-improvement value of the House in order to calculate the Capital Improvement Value (as defined below). The Homeowner can provide Quarter's designee the right to inspect the House prior to the commencement of the Major Capital Improvements, and upon the completion of such Major Capital Improvements, to determine the pre- and post-improvement value of the House to calculate the capital improvement value, which can be calculated by subtracting the post-improvement value from the pre-improvement value (the "Capital Improvement Value"). The Homeowner can bear all the costs for valuations and inspections. On the Put Closing Date, the Homeowner can be entitled to receive a credit equal to the Capital Improvement Value (the "Capital Improvement Value Credit"), subject to adjustments based on the changes in the fair market value of such Major Capital Improvements and the depreciation over the useful life of such Major Capital Improvements, after taking into considerations of any rebates or incentives in connection with the Major Capital Improvements.

High Equity Boarding Events

In the event the TIC Interests held by the Homeowner at the closing of the purchase or payoff of existing finance of the House equal or exceed the High Equity Boarding Threshold, any combination or all of the following can apply:

1. The portion of Homeowner's monthly Payments allocable to the Quarter Contingency Fund can be calculated by amortizing 4% of the Current Valuation of the House at the time of boarding, into the Payment each month over the estimated average term of occupancy of a Homeowner. To prevent this from becoming too large a component of the overall Payment, the monthly contribution can be calculated as follows:
  (i) When the Homeowner's initial equity position immediately after boarding is estimated to be at or below a certain amount (e.g., 50%), then the amount of contribution to the Quarter Contingency Fund from each monthly Payment can be calculated by dividing the product of the Quarter Contingency Fund Contribution (e.g., 4%) multiplied by the Current Valuation at the time of boarding onto the Quarter Platform by the anticipated tenure of the Homeowner in the House boarded onto the Quarter Platform (in months), which initially can be assumed to be 8 years (but is subject to future adjustment).
  (ii) When the Homeowner's initial equity position is estimated to be above a certain amount (e.g., 50%), then the amount of contribution to the Quarter Contingency Fund from each monthly Payment can be calculated by dividing the product of the Quarter Contingency Fund Contribution multiplied by the Current Valuation at the time of boarding onto the Quarter Platform by the anticipated tenure of the Homeowner in the House boarded on the Quarter Platform (e.g., in months), the result of which can decline linearly until it reaches a certain amount (e.g., 100%) of the calculated amount when the TIC Interests are calculated to reach a certain amount (e.g., 90%).
  (iii) In the event that the aggregate contribution made to the Quarter Contingency Fund over the anticipated tenure of the House on the Quarter Platform is calculated to be below a certain amount (e.g., 4%) pursuant to this section, the MRE can be increased to offset the amount which is not amortized.
2. The Fractionalization Fee amortization component of the TIC Fee calculation can also be modified as follows:
  (i) If the Homeowner's initial equity position is estimated to be at or less than a certain amount (e.g., 10%) of the Current Valuation at the time of boarding onto the Quarter Platform, then the Fractionalization Fee can be a certain amount (e.g., 100%) funded by amortizing it into the Payment based on the estimated average tenure of a Homeowner in a House.
  (ii) If the Homeowner's initial equity position is estimated to be greater than a certain amount (e.g., 10%) but less than another amount (e.g., 50%) of the Current Valuation at the time of boarding onto the Quarter Platform, then the Fractionalization Fee amount to be amortized in the TIC Fee can decline linearly starting when the Homeowner's equity position is estimated to exceed, for example, 10% declining until it reaches zero at, for example, a 50% equity position.
  (iii) The amount of the Fractionalization Fee which is not amortized into the Payment as described in the foregoing clause 2(u) can be paid by the Homeowner in US Dollars at the closing of the House. If the Homeowner's equity is calculated to be greater than a certain amount (e.g., 50%) of the Current Valuation at the time of boarding onto the Quarter Platform, then the Fractionalization Fee may be required to be paid in full by the Homeowner in US Dollars at the closing of the House.
3. The Asset Token Purchasers' contribution to the Quarter Contingency Fund can be calculated as follows:
  (i) The amount of the Quarter Contingency Fund Contribution which is funded in Asset Tokens by the Asset Token Purchasers can decrease linearly based on the amount of equity the Homeowner is estimated to initially hold post-closing, beginning at a certain amount (e.g., 1%) of the Current Valuation of the House at the time of boarding onto the Quarter Platform when the Homeowner's initial equity position is estimated at a certain amount (e.g., 50%) and decreasing linearly until it is reduced to a certain amount (e.g., 0.25%) when the Homeowner's initial equity is estimated to reach a certain amount (e.g., 90%).
  (ii) In parallel with the decrease in the Quarter Contingency Fund described in clause 3(i), the MRE calculation can be modified by adding an amount of equity proportional, but not necessarily equal to, the amount of decrease in the contribution to the Quarter Contingency Fund.

Quarter Platform's Services

1. Prior to the boarding of a House to the Quarter Platform, Quarter can have the right to retain third parties to conduct any combination or all of the following due diligence services: (i) inspect the property condition of the House or use other technology to evaluate the condition of the House, (ii) determine the valuation of the House, or (iii) conduct other customary due diligence services in the purchase of residential properties, as determined by Quarter in its sole discretion.
2. Prior to accepting an Applicant to be a Homeowner onto the Quarter Platform, Quarter can retain third parties to conduct any combination or all of the following Applicant due diligence: (i) prepare credit analysis such as credit reports, (ii) prepare capacity-to-pay analysis such as income verification, (iii) conduct asset verification, and (iv) conduct KYC and AML checks, and other customary due diligence services, as determined by Quarter in its sole discretion.
3. Prior to the purchase of a House or release of the funding to pay-off the existing financing on and/or fund the sale of equity in a House presently owned by the Applicant, Quarter can determine the Minimum Retained Equity, which amount can become the minimum purchase price required to be paid by the Applicant to purchase the TIC Interests in the House, or the minimum value of the TIC Interests required to be held by the Applicant after the payoff of existing financing and/or completion of an equity sale in a House presently owned by the Applicant.

Prior to the closing of the purchase of the House, the Applicant can transfer the amount of US Dollars equal to the value of the Minimum Retained Equity plus all closing costs in connection with the purchase of the House to the third-party settlement agent retained by the Quarter. Such Minimum Retained Equity can be applied to the purchase price of Homeowner's TIC Interests on the closing of the purchase of the House. A portion of the Homeowner's Minimum Retained Equity may be provided in part by an Impact Investor. The section captioned "Impact Investing on the Quarter Platform" sets forth additional details about the rights and obligations of an Impact Investor.

Prior to the closing of the funding to pay-off the existing financing on and/or fund the sale of equity in a House presently owned by the Applicant, the Applicant can (i) be required to demonstrate sufficient equity ownership in the House to retain post transaction TIC Interests equal to the value of the Minimum Retained Equity, and (ii) transfer the amount of US Dollars equal to all closing costs in connection with the closing of the House to the third-party settlement agent retained by Quarter.
4. Quarter can retain a third-party settlement agent to conduct the closing of the transaction. Settlement agent's services can include, without limitation, any combination or all of the following: (i) prepare closing statement and other title documents, (ii) fund escrow accounts and make disbursements, (iii) record the deeds, and (iv) issue an owner's title policy.
5. If Quarter determines it is necessary to set up any real estate tax, HOA, insurance, and other escrow accounts in connection with the House, Quarter can set up such escrow accounts and can service or retain a third party to service such escrow accounts after the closing of the purchase of House.
6. After the House is boarded onto the Quarter Platform, Quarter can monitor Homeowner's occupancy of the House. In the event of a Homeowner's default under the TIC Agreement, Quarter can have the right to retain a third-party servicing company to service such defaults.

Major Terms and Conditions of the Purchase and Sale Agreement Addendum

The Purchase and Sale Agreement used in connection with the purchase of a particular House by the Homeowner and a SPE can be supplemented by the local law addendum provided by Quarter (the "Purchase and Sale Agreement Addendum"). The Purchase and Sale Agreement Addendum can include, any combination or all of the following terms and conditions:
1. Provisions which permit the Homeowner to partially assign the Purchase and Sale Agreement to the SPE at closing as the co-purchasers and provides for the specific allocation of the TIC Interests to be determined on or prior to the Closing.
2. An indemnity from the Homeowner and the SPE, holding Quarter, the Fund, and their respective employees, agents, consultants, affiliates, members, directors, officers, and investors harmless from any claims which arise during the purchase process.
3. An appraisal contingency, which appraisal can be conducted and approved by Quarter in its sole discretion.
4. An inspection contingency, which provides a contingency for inspection pursuant to Quarter's approved procedure and vendors. This contingency may be in conjunction with the acceptance into a home warranty program.
5. A contingency for acceptance of title, survey, zoning, environmental, and other property matters by Quarter.

Major Terms and Conditions of the TIC Agreement

The TIC Agreement can address and can include the following key terms and provisions. The form TIC Agreement can have the state specific addendum for properties in different states and counties to meet certain local requirements.

Payments

Figure 33:
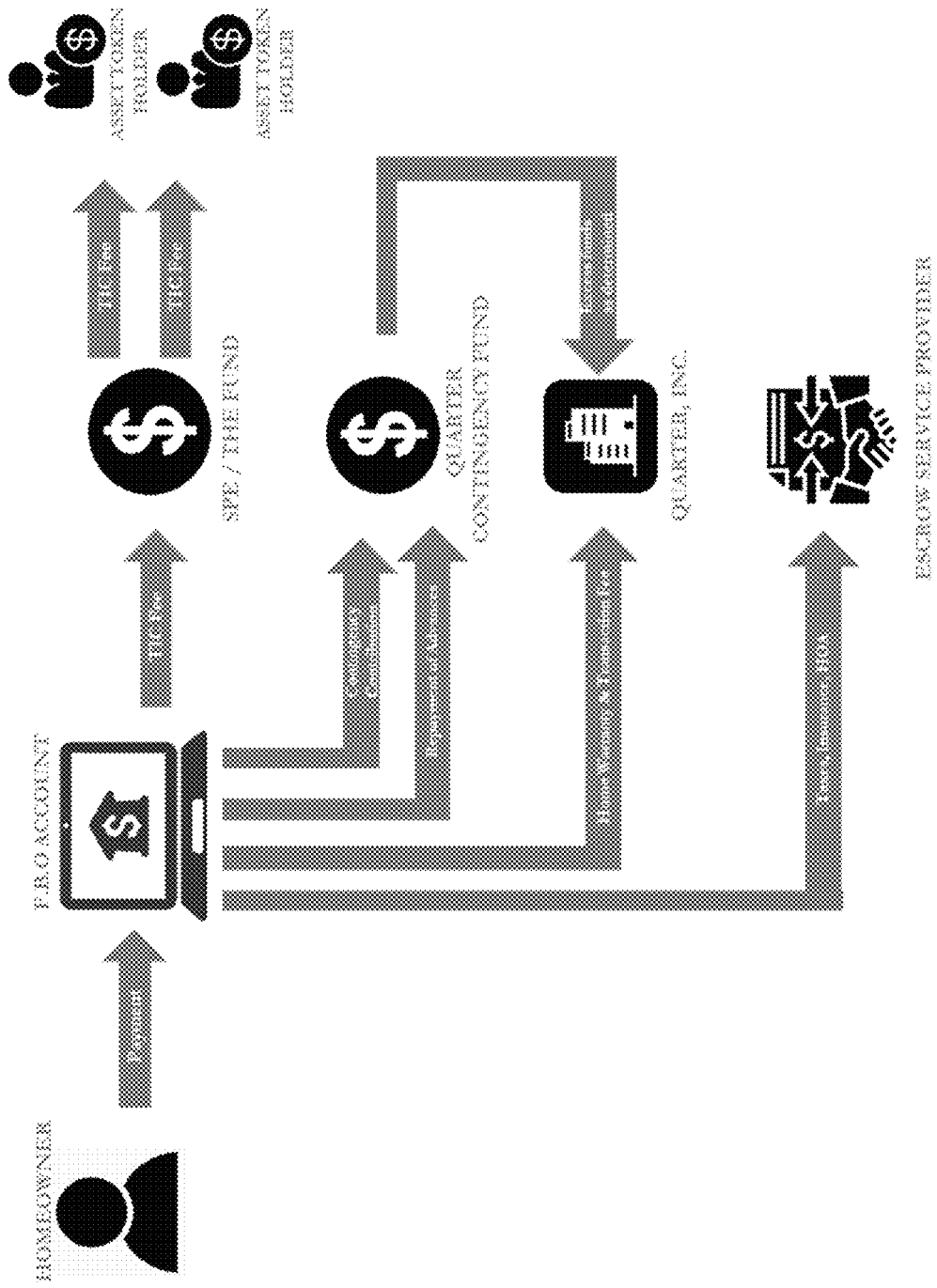

In consideration of Homeowner's right to live in the House, Homeowner can make Payments through the Quarter Platform Dashboards. The monthly Payments received from the Homeowner can be distributed, for example, as shown in FIG. 33.

The Quarter Platform can decide whether an escrow is required for real estate taxes, insurance, and/or HOA fees (the "Property Escrow Account"). The determination of whether there will be a Property Escrow Account can be based on an algorithm using various consumer and property data points as well as local jurisdictional requirements and can be determined by Quarter from time to time. Any escrow payments (the "Property Escrow Amounts") can be paid by Homeowner as a part of the Payments and can be distributed to Property Escrow Account maintained by an escrow services provider, as may be changed by Quarter from time to time with prior notice to the Homeowner. Unless included in the Payments as the Property Escrow Amounts, real estate taxes, insurance premiums, and/or HOA fees (including the fines) as they become due can be paid by the Homeowner directly to the appropriate taxing, insurance, or HOA authorities/agent(s) (the "Direct Property Costs Payments"). Payments can be made in US Dollars. Payments that are not made within a certain period when due can result in a late fee set forth in the TIC Agreement (the "Late Fees"), subject to the applicable state laws. The Late Fees can be distributed to the Quarter Contingency Fund. In addition to the Payments, the Homeowner can timely pay any obligation that may become a lien on the House, including any combination or all of the following: water or other utility bills, code enforcement fines, special assessments, and maintenance or service fees incurred by the contractors hired by the Homeowner to perform work or services on the House. Deductibles incurred under the terms of any home warranty and hazard insurance can be paid by the Homeowner.

Homeowner's Obligations

The Homeowner can have an obligation to perform and/or pay for all routine maintenance of the House that are not covered under a House warranty and that may be required under the terms of the TIC Agreement. The Homeowner can be required on each annual anniversary of the closing date of the purchase of the House to take and submit interior and exterior photos of the House through Quarter Platform Dashboards.

Purchase and Sale Rights

Subject to the following paragraphs, the Homeowner can have the right to sell a portion (but not all in some embodiments) of the TIC Interests held by the Homeowner to the SPE, in which case, all Asset Token Purchasers can have the right to purchase the Homeowner's TIC Interests at a price established by a pre-determined formula in proportion to total Asset Tokens linked to the SPE, except for those Interest subject to Sale under a Qualifying Life Event as defined below which can be purchased by the Quarter Contingency Fund. As a result of the sale, the Homeowner can receive the sales proceeds and the TIC Fee paid by the Homeowner can be increased pursuant to a pre-determined formula as set forth below. The Homeowner can have the right to sell all of the TIC Interests held by the Homeowner pursuant a put option described below. The Homeowner can also have the right to purchase a portion or all of TIC Interests held by the SPE at a pre-determined price and Asset Token Purchasers whose Asset Tokens are linked to the SPE can have the obligation to sell their Asset Tokens in proportion to their Proportionate Share of the total Asset Tokens linked to the SPE or on a first-in, first out basis, or as otherwise determined by Quarter at Quarter's sole discretion. The Homeowner's TIC Fee can thereby be reduced pursuant to a pre-determined formula, an example of which is set forth below.

If the Homeowner either purchases or sells TIC Interests, the Quarter Platform can make changes to the respective TIC Interests held by the Homeowner and SPE in the House via amendment(s) to the deed. To avoid possible frequent deed recordation, an escrow mechanism can be used whereby the deeds to be recorded to evidence the change of respective TIC Interests held by the Homeowner and SPE in the House can be delivered to an escrow agent selected by Quarter. The Homeowner, SPE and the escrow agent can enter into a tri-party escrow agreement such that the escrow agent can record the then existing deed between the Homeowner and SPE at a designated time by Quarter (e.g. annually, quarterly, or otherwise). Prior to the next designated recording time, if there is further change to the respective TIC Interests held by the Homeowner and the SPE, a new amended deed can replace the preceding deed in the escrow agent's possession and the preceding deed can be destroyed such that the escrow agent can hold the most recent deed which can reflect the then-current respective TIC Interests held by the Homeowner and the SPE. Quarter's blockchain digital ledger can serve as the system of record for tracking transfers which can occur between deed recordation's.

Homeowner can have the right to purchase and sell TIC Interests as follows:

(i) If there is no uncured default by Homeowner pursuant to the TIC Agreement, Homeowner can have the right to sell a portion (but not all in some embodiments) of the TIC Interests, up to a certain amount (e.g., 100%) of the Excess Equity (the "Interests subject to Sale up to Excess Equity"). The purchase price payable by the SPE can be equal to (i) the Current Valuation of Record of such Interests subject to Sale up to Excess Equity as determined by Quarter at the time of sale if the Interests subject to Sale up to Excess Equity are no more than 15% of the total TIC Interests in the House or (ii) the Current Enhanced Valuation of such Interests subject to Sale up to Excess Equity as determined by Quarter at the time of sale if the Interests subject to Sale up to Excess Equity exceed 15% of the total TIC Interests in the House. After a Homeowner has sold all of their Excess Equity, if the Homeowner has a Qualifying Life Event (as defined, for example, below), the Homeowner can have the right to sell its TIC Interests to SPE comprising a portion of their Minimum Retained Equity, up to a certain amount (e.g., (A) four (4) times of the monthly Payments during the month immediately preceding to the closing of the sale, divided by (B) the Current Valuation of Record of the House prior to the closing of the sale (the "Interests subject to Sale under a Qualifying Life Event", together with Interests subject to Sale up to Excess Equity, "Interests subject to Sale")); provided, for example, (i) there is no uncured event of default by Homeowner or (ii) there is a default by Homeowner but after the sale of the Interests subject to Sale under a Qualifying Life Event, the Quarter Contingency Fund can be fully reimbursed for its advances and/or be fully paid the Unpaid Delinquent Amounts or Cure Amounts (each as defined below), the Closing Costs (as defined below) can be fully paid and there may no longer be a default by Homeowner existing under the TIC Agreement (the "Homeowner Hardship Program"). The purchase price payable by SPE can be equal to the Current Valuation of Record of such Interests subject to Sale under a Qualifying Life Event; provided, however, if there is a default by Homeowner under the TIC Agreement, the purchase price payable by SPE can be reduced by the unpaid advances made by the Quarter Contingency Fund and/or the Unpaid Delinquent Amounts or Cure Amounts, as applicable. Homeowner's obligation to pay the Transaction Closing Costs (as defined below) can be waived if Homeowner sells Interests subject to Sale under a Qualifying Life Event pursuant to this paragraph. A Qualifying Life Event can mean, for example, (i) loss of a job or income, (ii) health emergency of Homeowner or Homeowner's immediate family member, (iii) divorce, and (iv) other events as determined by Quarter from time to time. The Homeowner can be responsible for the Closing Costs as a result of the sale of such Homeowner's TIC Interests pursuant to this section, except that the Homeowner may not be responsible for the Transaction Closing Costs in connection with the Homeowner's sale of Interests subject to Sale under a Qualifying Life Event. The closing of the purchase and sale can occur within 15 days after the determination of the Current Valuation of Record or the Current Enhanced Valuation of such Interests subject to Sale, as applicable. After the sale pursuant to this section by the Homeowner, the monthly Payments by the Homeowner can be recalculated to reflect the change in the Homeowner's TIC Interests in the House.

(ii) If there is no uncured default by the Homeowner pursuant to the TIC Agreement, the Homeowner can have the right to purchase any and all portions of the TIC Interests held by SPE at any time (the "Interests subject to Purchase"). The purchase price payable by the Homeowner can be equal to (A) (i) the Current Valuation of Record of such Interests subject to Purchase determined by Quarter at the time of purchase if the Interests subject to Purchase is no more than a certain amount (e.g., 15% of the total TIC Interests in the House) or (ii) the Current Enhanced Valuation of such Interests subject to Purchase determined by Quarter at the time of purchase if the Interests subject to Purchase exceeds a certain amount (e.g., 15% of the total TIC Interests in the House), plus (B) the Closing Costs. Notwithstanding the foregoing, for a period of twenty-four (24) months following the closing of the sale of the Interests subject to Sale under a Qualifying Life Event by the Homeowner, the Homeowner can have the right, but not the obligation to repurchase any and all portion of Interests subject to Sale under a Qualifying Life Event (the "Interests subject to Repurchase"). The purchase price payable by the Homeowner can be equal to the sum of (A) the purchase price paid by SPE in connection with the closing of the Interests subject to Sale under a Qualifying Life Event, plus (B) the Third Party Closing Costs. If the Homeowner repurchases any or all Interests subject to Sale under a Qualifying Life Event pursuant to the foregoing, the Homeowner can be eligible to participate in the Homeowner Hardship Program again at a later time if a Qualifying Life Event occurs.

(iii) The Homeowner can be responsible for all of the transfer and recordation taxes and other fees assessed by a party other than the SPE or Quarter (the "Third Party Closing Costs") and the fees assessed by Quarter (the "Transaction Closing Costs") that become due as a result of any sale or purchase of the TIC Interests pursuant to the TIC Agreement. Third Party Closing Costs and Transaction Closing Costs can be collectively referred to as the "Closing Costs".

(iv) If there is no uncured default by the Homeowner pursuant to the TIC Agreement or if the Homeowner is in default under the TIC Agreement and is required to sell its TIC Interests pursuant to the terms of the TIC Agreement (the "Put Obligation"), the Homeowner can have the right or obligation, as applicable, to sell e.g., all (but not less than all) of the TIC Interests held by the Homeowner ("TIC Interests Subject to Put Option"), as follows (the "Put Option"):

(a) The Homeowner can give not less than ninety (90) days' prior notice (the "Put Notice") to Quarter through the Quarter Platform Dashboards of Homeowner's intent to exercise the Put Option. This requirement may not be applicable under the Put Obligation.

(b) Upon receipt of the Homeowner's intent to exercise the Put Option or upon its exercise of enforcement of the Put Obligation, Quarter can determine the purchase price for the TIC Interests Subject to the Put Option. The Quarter Contingency Fund can purchase the TIC Interests Subject to Put Option and can become a tenant-in-common with the SPE. The purchase price payable by the Quarter Contingency Fund can be equal to the Current Enhanced Valuation of the TIC Interests Subject to the Put Option at the time when Quarter receives the Homeowner's intent to exercise the Put Option (the "Put Price"). Quarter can notify the Homeowner of the Put Price determined by an appraiser retained by Quarter (the "Quarter's Appraiser"), and can provide a copy of the appraisal to the Homeowner together with the supporting valuation documents. In the event that the Homeowner does not agree to the Put Price, the Homeowner can have the right to retain their own appraiser to determine the Put Price within a certain time (e.g., ten (10) days after receipt of Quarter's Put Price); provided such appraiser can be a residential real estate broker or appraiser licensed in the jurisdiction where the House is located, e.g., having no less than a certain amount (e.g., ten (10) years') experience in such field, and recognized as ethical and reputable within the field (the "Homeowner's Appraiser"). The Homeowner's Appraiser can determine, within a certain time (e.g., ten (10) days) after his or her appointment, such Put Price. If the Homeowner's Appraiser and Quarter's Appraiser do not agree on the Put Price, then the two individuals can appoint a third similarly qualified individual within a certain amount (e.g., ten (10) days) after such disagreement. The third individual can, within a certain time (e.g., ten (10) days after his or her appointment), select either Quarter's Appraiser's determination or the Homeowner's Appraiser's determination (this being, e.g., the third appraiser's sole function) as being closest to the applicable fair market Put Price, and can notify the parties of such selection. If the Homeowner fails to timely object to the Put Price or deliver its determination of the Homeowner's Appraiser or a third individual, as applicable, then Quarter's determination of the Put Price can be final and conclusive. The third appraiser's decision can be final and conclusive, and binding on both the Homeowner and Quarter, acting on behalf of the Quarter Contingency Fund. The Homeowner and the Quarter Contingency Fund can each bear the cost of its appraiser and can share equally the cost of the third appraiser.

(c) The Quarter Platform can notify the Investors whose Asset Tokens are linked to the SPE (thus, the House) of the Homeowner's intent or obligation to exercise the Put Option, and any further trading of such Asset Tokens that are linked to the SPE by the Investors can be barred unless a waiver is obtained from Quarter.

(d) The Quarter Contingency Fund can use funds sitting in the Quarter Contingency Fund to purchase the TIC Interests Subject to Put Option and can enter into a new TIC Agreement as tenants in common with the SPE. When any or all TIC Interests Subject to Put Option are resold, the net proceeds can be distributed to the Quarter Contingency Fund.

(e) The Homeowner can be responsible for the payment of any or all the transfer and recordation taxes and other fees that become due as a result of the sale of the TIC Interests Subject to Put Option. The Payments and the Direct Property Costs Payments (if any) can be prorated on the closing of the purchase of the TIC Interests Subject to Put Option (the "Put Closing Date"). On the Put Closing Date, (i) the Homeowner can pay any unpaid amounts advanced by the Quarter Contingency Fund and pay any accrued and unpaid Payments (other than, e.g., the Payments to the Quarter Contingency Fund), and (ii) the Homeowner can receive a credit in an amount of the Capital Improvement Value Credit (as defined below).

(f) On or prior to the Put Closing Date, the Homeowner can do any combination or all of the following: (i) remove all of the Homeowner's unattached and movable equipment or furniture, or other personal property brought into the House by the Homeowner ("Homeowner's Personal Properties"), (ii) repair damages to the House caused by the Homeowner or Homeowner's agents as a result of such removal, (iii) quit and surrender the House to SPE, free and clear of occupants and tenants, broom clean, and in good order, condition and repair, ordinary wear and tear excepted, and (iv) return all keys to the House to SPE (collectively, the "Surrender Conditions"). The Homeowner can be required to repair any damage and perform such other work as is reasonably necessary to restore the House to the Surrender Conditions. Prior to the Put Closing Date, Quarter's designee can have the right to enter in and upon the House or any part thereof to inspect the condition of the House. If in Quarter's reasonable opinion, the House is not in a good habitable condition, is damaged or in a condition that is no longer suitable to be a residence, or otherwise doesn't meet the Surrender Conditions, the Homeowner can be required to perform required repairs and restoration work to restore the House in broom clean and in good order, condition and repair to the reasonable satisfaction of Quarter (the "Repair Work") within a certain time (e.g., fifteen (15) days following the Homeowner's receipt of a written notice from Quarter). Notwithstanding anything to the contrary contained in the TIC Agreement, it can be a condition precedent to the Put Closing Date that the Homeowner completes the Repair Work and surrenders the House in Surrender Conditions. The Quarter Contingency Fund may not be obligated to pay the Put Price until the Homeowner completes the Repair Work and surrenders the House in Surrender Conditions. If the Homeowner fails to remove any of Homeowner's Personal Properties from the House prior to the Put Closing Date, SPE, at its option, may deem all or any part of such Homeowner's Personal Property to have been abandoned by the Homeowner and title thereof can immediately pass to SPE.

(g) After the consummation of the purchase of the TIC Interests Subject to Put Option, Homeowner's right to residency and other rights and obligations can automatically terminate, and the SPE and the Quarter Contingency Fund can enter into a new tenants-in-common agreement to reflect, among other things, that the Quarter Contingency Fund is the record owner of the TIC Interests Subject to Put Option.

Quarter may have the right to sell TIC Interests as follows:

(i) Quarter can list any or all of the TIC Interests Subject to Put Option for sale on the Quarter Platform, or any other platform or website. During the pendency of the sale to a new homeowner, any further trading of such Asset Tokens that are linked to the SPE by the Investors can be barred unless a waiver is obtained from Quarter.

(xvi) Prior to accepting a new Applicant to be a Homeowner on the Quarter Platform, Quarter can retain third parties to conduct any combination or all of the following Applicants' due diligence: (i) prepare credit analysis such as credit reports, (ii) prepare capacity-to-pay analysis such as income verification, (iii) conduct asset verification, and (iv) conduct KYC and AML checks, and other customary due diligence services, as determined by Quarter (e.g., in its sole discretion).

(xvii) Upon the consummation of the sale of TIC Interests to a new Homeowner, which may be more or less than the TIC Interests Subject to Put Option, the Fund can cause the SPE to enter into a new TIC Agreement with the new Homeowner and the then current Payments prior to the Put Closing Date can be recalculated based upon the sale price, the amount of TIC Interests purchased by the new Homeowner, and the post-sale value of the TIC Interests held by the SPE as follows:

The first step can be to determine how many Asset Tokens either need to be issued or redeemed based on the post-sale value of the TIC Interests held by the SPE. In order to determine whether Asset Tokens are to be issued or redeemed we can first look at the pre-sale value of the TIC Interests held by the SPE and compare it against the post-sale value of the TIC Interests held by the SPE.

(i) To determine the pre-sale value of the TIC Interests held by the SPE, we can use the following example formula:

$$V_{spe-pre} = V_{pre} \times I_{spe-pre}$$

$I_{spe-pre}$=TIC Interests held by the SPE prior to sale
$V_{pre}$=Pre-sale value of the House (ii) To determine the post-sale value of the TIC Interests held by the SPE, we can use the following example formula:

$$V_{spe-post} = V_{post} \times I_{spe-post}$$

$I_{spe-post}$=TIC Interests held by the SPE post-sale
$V_{post}$=Post-sale value of the House If $V_{spe-post} > V_{spe-pre}$, then issuance of new Asset Tokens may be necessary.

If $V_{spe-post} < V_{spe-pre}$, then redemption of Asset Tokens may be necessary.

Issuance of New Asset Tokens

If $V_{spe-post} > V_{spe-pre}$, then an issuance of new Asset Tokens may be needed. The next step in determining if new Asset Tokens need to be issued, can be to determine if the SPE's TIC Interest percentage has gone up or down. If the SPE TIC Interest percentage has increased ($I_{spe-post} > I_{spe-pre}$), and if $V_{spe-post} > V_{spe-pre}$, then new Asset Tokens may need to be issued. If on the other hand the SPE's TIC Interest percentage has either decreased or stayed the same ($I_{spe-post} \leq I_{spe-pre}$), then no new Asset Tokens may need to be issued.

The total number of new Asset Tokens that may need to be issued can be calculated using the following example formula, rounded down:

$$A_{new} = (I_{spe-post} - I_{spe-pre}) \times V_{post}$$

$A_{new}$=Total number of New Asset Tokens to be issued

These Asset Tokens can be distributed to the existing Asset Token Purchasers whose Asset Tokens are linked to the House (the "Existing Investor"), pro rata based on the current SPE ownership. If the funds sitting in the Cash Funding Pool held by the Existing Investors are not sufficient for the new issuance of Asset Tokens, Quarter can allocate the remaining newly issued Asset Tokens among other Asset Token Purchasers (excluding, in some embodiments, the Existing Investors) who have cash sitting in the Cash Funding Pool, up to the total amount of newly issued Asset Tokens.

Redemption of Asset Tokens and HPI Tokens

If $V_{spe-post} < V_{spe-pre}$, then redemption of Asset Tokens may be necessary. Quarter can redeem Asset Tokens pro-rata from Asset Token holders until they hold a minimum of Asset Tokens representing 1% of the SPE's TIC Interests in the House at its post-sale value. To determine the number of Asset Tokens to redeem, the following example formula can be used:

If $N_a - (V_{spe-pre} - V_{spe-post}) < V_{spe-post} * 1\%$ $$A_{red} = N_a - V_{spe-post} * 1\%$$

Otherwise, $$A_{red} = V_{spe-pre} - V_{spe-post}$$

$A_{red}$=Number of Asset Tokens to be redeemed
$N_a$=Total number of Activated Asset Tokens These Asset Tokens can be redeemed from current Asset Tokens holders, pro rata based on the current SPE ownership.

Once we have redeemed Asset Tokens, we can determine whether we still may need to redeem HPI Tokens. This can be the case if the number of Asset Tokens redeemed is not enough to account for the decrease in value in the SPE's TIC Interests. The only time HPI Tokens can be redeemed, in some embodiments, is if the Asset Tokens have been reduced to a certain amount (e.g., 1% of the SPE's TIC Interests in the House at post-sale value).

If $N_a - (V_{spe-pre} - V_{spe-post}) < V_{spe-post} * 1\%$, we may need to redeem HPI Tokens in addition to the Asset Tokens being redeemed. The number needed to be redeemed can be calculated using the following example formula:

$$V_{spe-pre} - V_{spe-post} - A_{red-tot} - V_{spe-post} * 1$$

$A_{red-tot}$=Total Current Redeemed Asset Token Nominal Value

To determine the Total Current Redeemed Asset Token Nominal Value for all redeemed Asset Tokens linked to the SPE, the following example formula can be used:

$A_{red-tot} = (V_a^1 + V_a^2 + \ldots \pm V_a^n)$ where $n$=the total number redeemed Asset Tokens linked the SPE $A_{red-tot}$=Total Current Asset Token Nominal Value for redeemed asset tokens
$V_a$=Current Adjusted Asset Token Nominal Value As shown in the formula above, to determine the Total Current Redeemed Asset Token Nominal Value for all the redeemed Asset Tokens linked to the SPE, we can add together the Current Adjusted Asset Token Nominal Value for every Redeemed Asset Token linked to the SPE.

These HPI tokens can be redeemed pro rata based on the current SPE ownership. If there are not enough HPI Tokens amongst the current SPE owners, Quarter can have the ability to determine which HPI Token Holders they will redeem HPI Tokens from, for a fair book value.

The Quarter Contingency Fund can receive the sales proceeds from the sale of the TIC Interests Subject to Put Option to the new Homeowner. Upon the consummation of the sale of the TIC Interests to a new Homeowner, the Quarter Contingency Fund can transfer the residual TIC Interests and the then-existing TIC Agreement by and between the Quarter Contingency Fund and the SPE can automatically terminate.

In the event Quarter is unable to resell the TIC Interests subject to Put Option or enter into the new TIC Agreement with a new Homeowner within a certain time (e.g., 90 days after Put Closing Date), Quarter can have the right to sell the House in its entirety to a third-party purchaser as follows:

(i) Quarter can refer the House to a Quarter Preferred Agent Provider who can recommend a listing price.
  (a) If the suggested listing price is equal to or greater than the then-existing Current Valuation of the House, Quarter may list the House for sale on the Quarter Platform, or any other platform or website.
  (b) If the suggested listing price is lower than the then-existing Current Valuation, then Quarter can conduct a Current Enhanced Valuation. Upon receipt of the Current Enhanced Valuation, the listing price can be set (e.g., at the greater of the suggested listing price or the Current Enhanced Valuation amount).
  (c) The listing price that satisfies the foregoing clause (1) and (2) can be deemed to be the "Final Listing Price."
(ii) Upon receipt of an offer that is acceptable to Quarter and is not less than a certain amount (e.g., 2%) below the Final Listing Price (the "Listing Price Floor"), the sale can be deemed approved and the House can proceed to closing.
(iii) In the event that there is no offer or no offer that is acceptable to the Quarter within a certain time (e.g., 120 days after Quarter's notice to the Asset Token holders of Quarter's intent to sell the House), Quarter can have the right to lower the Final Listing Price or the Listing Price Floor, as applicable, in Quarter's sole discretion.
(iv) In the event that the House is sold to a third-party buyer who uses the Quarter Platform to fund the acquisition of the House (the "House Stay Event"), the SPE can enter into a new TIC Agreement with the third-party buyer, the then current Payments can be recalculated based upon the number of Activated Asset Tokens linked to the SPE; provided, however, Quarter can reserve the right to waive a portion of the Payments that are calculated based on the number of Activated Asset Tokens with a Redeemed Asset Token Nominal Value.
(v) If the House is sold to a third-party buyer who is not an existing user of the Quarter Platform, or who is an existing user of the Quarter Platform but did not fund the acquisition via the Quarter Platform, the House can leaves the Quarter Platform (the "House Leaving Event").
(vi) Sales proceeds from a sale of the entire House can be distributed on the closing date of such sale (the "Sales Closing") as set forth in the example below (the "Distributions Waterfall"):
  (a) The proceeds can first be used to pay Quarter and the Quarter Contingency Fund for the costs incurred by Quarter and the Quarter Contingency Fund in connection with the sale of the House, including the fees incurred by Quarter in connection with the determination of the Current Valuation.
  (b) The proceeds can then be used to pay the recordation and transfer tax in connection with the Sales Closing and title policy premiums and other fees charged by the title company, as well as the other seller charge shown on the settlement statement in connection with the Sales Closing.
  (c) The proceeds can then be distributed to SPE, in any combination or all of the following:
    (1) If House Stay Event occurs, the SPE can then distribute the proceeds received to the Fund as described in the section herein detailing Quarters right to sell TIC Interests.
    (2) If a House Leaving Event occurs, the SPE can then distribute the proceeds received to the Fund, and the Fund can then distribute the proceeds received (i) first, to the Asset Token holders, (ii) second, to the HPI Asset Pool, and (iii) third, to the Impact Investors, all in proportion to the amount of the Activated Asset Tokens and Appreciation Value accrued to the HPI Asset Pool with respect to the House.

Right of Partition

The Homeowner and the SPE can have the right to have the House partitioned, and to file a complaint or institute any proceeding at law or in equity to have the House partitioned in accordance with and to the extent provided by applicable law ("Partition Action"). The Partition Action may result in a forced sale by the Homeowner and the SPE. To avoid the inequity of a forced sale and the potential adverse effect on the Homeowner and the SPE, as a condition precedent to filing a Partition Action, the party filing such action (the "Initiating Party") can first make a written offer to the other party (the "Recipient Owner") that can: (i) specify the price at which the Initiating Party would be willing to transfer the House (such price, the "Offer Price"), (ii) specify the amount (as reasonably calculated by the Initiating Party) that would be distributed to the Recipient Owner (its "Distribution Amount") if the House was sold for the Offer Price and the net proceeds (assuming typical transaction costs such as repayment of debt, transfer taxes, a five percent (5%) brokerage fee, and legal fees not to exceed $5,000) after paying or providing for all liabilities of the House were distributed to the tenants in common in accordance with the TIC Agreement, and/or (iii) state that the Initiating Owner desires to either (A) sell its TIC Interests to the Recipient Owner for the Initiating Owner's Distribution Amount (the "Recipient Sale Option"), or (B) to (I) sell the House (including the TIC Interests owned by the Recipient Owner) to a bona-fide third party for a purchase price no less than the Offer Price with a sale to occur within a certain time (e.g., 90 days thereafter) and/or (II) at the Initiating Owner's option, initiate a Partition Action (the "Third Party Sale Option"). The failure to timely elect any such option by the Recipient Owner can be deemed an election by such Recipient Owner of the Third Party Sale Option. If the Recipient Owner fails to close under the Recipient Sale Option on or prior to a deadline set forth in the TIC Agreement, the Third Party Sale Option can be deemed to have been elected. If the Initiating Owner fails or refuses to close, the exercising Recipient Owner may sue for specific performance and enforcement costs. If the Third Party Sale Option is duly elected (or deemed elected, as applicable), the Recipient Owner can execute all documents and instruments necessary in the ordinary course of consummating such sale. If the Third Party Sale Option is duly elected (or deemed elected, as applicable) and a closing has not occurred in connection therewith by the deadline set forth in the TIC Agreement, the Initiating Owner can proceed to file the Partition Action, and if no Partition Action has been filed within certain period as specified in the TIC Agreement, the related buy-sell notice can be null and void and no such transactions may occur without the Initiating Owner first sending a new buy-sell notice subject to the process set forth above.

Home Swap Option

Provided that Homeowner has not been in default under the TIC Agreement during the immediately preceding time period (the "Home Swap Qualification Period"), which can be initially set (e.g., to be 180 days and is subject to change by Quarter from time to time), a Homeowner can have the right, subject to Quarter's underwriting approval, to exchange their current House with a new House via the Quarter Platform ("Home Swap Option") by providing notice to Quarter via the Quarter Platform Dashboards of their intention to exercise the Home Swap Option (the "Home Swap Option Notice"). Quarter can notify the Homeowner whether or not Quarter approves such Home Swap Option within a certain time (e.g., five (5) business days after Quarter receives the Home Swap Option Notice). If Quarter approves the Homeowner's Home Swap Option, it can be deemed that the Homeowner has provided Quarter with the Put Notice and Homeowner can proceed with the Home Swap Option. In that case, the Homeowner can transfer all of the TIC Interests held by the Homeowner in the current House to the SPE pursuant to the mechanism descried under Section 3(iv) of the section entitled "Major Terms and Conditions of the TIC Agreement" of this Memorandum; except that, rather than having the SPE disburse the sales proceeds payable to the Homeowner in connection with the Put Option (the "Homeowner's Equity") to the Homeowner, the Homeowner can authorize the Quarter Contingency Fund to disburse funds from the sale of the Homeowner's Equity to purchase the Homeowner's TIC Interests in the new House. The Fund can set up a new SPE to purchase the TIC Interests in the new House, together with the Homeowner. Accordingly, new Asset Token Purchasers' purchase money can be released from the Cash Funding Pool by the Fund for the purchase of the new SPE's TIC Interests in the new House, in an amount equal to the Applied Asset Token Holder Equity (for example, as defined below) and in return, the new holder's Asset Tokens (for example, in proportion to the invested amount in the new House) can be colored to show the link to the new SPE and be Activated, pursuant to the same mechanism the Asset Tokens are Activated described in this Memorandum.

The funds to purchase the new House can come from the following sources in connection with the current House, the sum of which can be referred to as the "Allocable Purchase Price":

i. The Homeowner's Equity,
ii. the Total Current Asset Token Nominal Value for the Asset Tokens linked to the current House (the "Asset Token Holder Equity"), and
iii. the Appreciation Value of the current House that has been transferred to the HPI Asset Pool (the "HPI Asset Pool Equity").

If the new House's purchase price equals the Allocable Purchase Price, the entire Allocable Purchase Price can be applied in the purchase of the new House.

If the new House's purchase price is greater than the Allocable Purchase Price, the entire Allocable Purchase Price can be applied in the purchase of the new House, and in addition, additional Asset Tokens from new Asset Token Purchasers can be colored to link to the new SPE and Activated in an amount equal to the difference between the purchase price of the new House and the Allocable Purchase Price.

If the new House's purchase price is less than the Allocable Purchase Price, Quarter can apply by order of priority Homeowner's Equity, HPI Asset Pool Equity, and Asset Token Holder Equity in the purchase of the new House.

Quarter can calculate Homeowner's Payments in connection with the new House based on (i) the Asset Token Holder Equity actually spent by the new SPE, plus (ii) the product of the number of the additional Activated Asset Tokens linked to the new SPE to purchase the new SPE's TIC Interests in the new House, if any, multiplied by (e.g., $1.0000) (the "Applied Asset Token Holder Equity"). To the extent the amount of the Asset Token Holder Equity actually spent by the new SPE is less than the total allocable Asset Token Holder Equity, Quarter can calculate the Homeowner's Payments in connection with the new House based on the applied amount of the Asset Token Holder Equity. Notwithstanding the foregoing, in some embodiments, in no event shall the Applied Asset Token Holder Equity be less than a certain amount (e.g., 1% of the purchase price of the new House) because the minimum TIC Interests held by the new SPE can be required to be a certain amount (e.g., at least 1%).

The Quarter Contingency Fund can disburse the Homeowner's Equity on behalf of the Homeowner to purchase Homeowner's TIC Interests in the new House.

The Fund can reserve the right to charge the Closing Costs with the purchase of the new House, and the Minimum Retained Equity can be recalculated, as can the Payments to incorporate new real estate taxes, insurance, and/or HOA fees in connection with the new House.

Below is an illustration about how the mechanism can work.

A House was boarded onto the Quarter Platform with a Current Valuation of $1,000,000, and the Current Valuation has subsequently increased to $2,000,000 over several years. The original purchase price paid by the SPE at the time when the House was boarded onto the Quarter Platform was $900,000 and the Total Current Asset Token Nominal Value is $900,000. The Homeowner decides to exchange the current House with a new House. Homeowner's Equity is $200,000. At the time of the purchase, the Appreciation Value of the current House is $900,000.

Thus, Homeowner's Equity is $200,000
Asset Token Holder Equity is $900,000
HPI Asset Pool Equity is $900,000

As a result, the Allocable Purchase Price is $2,000,000 (=$200,000+$900,000+$900,000), which Homeowner and the new SPE could use to purchase a new House.

New House Purchase Scenario #1 (Equal Value)

The Homeowner decides to purchase a new House for $2,000,000. Quarter Contingency Fund will disburse the $200,000 of Homeowner's Equity on behalf of the Homeowner to purchase Homeowner's TIC Interests in the new House. A new SPE set up to purchase the new House will disburse $900,000 from funds raised from the sale of new Asset Tokens linked to that new SPE. The Fund will disburse $900,000 HPI Asset Pool Equity from the HPI Asset Pool in the purchase of the new SPE's TIC Interests in the new House. Of the $2,000,000, Homeowner's Payments for the new House shall be calculated based on $900,000 Asset Token Holder Equity.

New House Purchase Scenario #2 (Higher Value)

The Homeowner decides to purchase a new House for $2,200,000. In this scenario, the entire $2,000,000 of the Allocable Purchase Price is applied, and the requisite number of additional Asset Tokens will be Activated to fund the shortfall of $200,000. The monthly Payments the Homeowner is responsible for the new House will increase accordingly based on $1,100,000 (=$900,000+$200,000) of Applied Asset Token Holder Equity.

New House Purchase Scenario #3 (Lower Value)

The Homeowner decides to downsize and to purchase a new House for $1,500,000. In this scenario, Quarter Contingency Fund will disburse the $200,000 of Homeowner's Equity on behalf of the Homeowner to purchase Homeowner's TIC Interests in the new House. The Fund will disburse $900,000 HPI Asset Pool Equity from the HPI Asset Pool and a new SPE set up to purchase the new House will disburse $400,000 (=$1,500,000−$200,000−$900,000) from funds raised from the sale of new Asset Tokens linked to that SPE to purchase of the new SPE's TIC Interests in the new House. The Homeowner's Payments for the new House shall be calculated based on $400,000 of Applied Asset Token Holder Equity.

New House Purchase Scenario #4 (Much Lower Value)

The Homeowner decides to downsize and to purchase a new House for $1,100,000. In this scenario, the Applied Asset Token Holder Equity is $0 (=$1,100,000−$200,000−$900,000). Since the Applied Asset Token Holder Equity is less than 1% of the purchase price of the new House, purchasing the new House is not permitted.

Impact Investing on the Quarter Platform

In order to facilitate home purchases by Applicants who would not otherwise qualify to purchase a House on the Quarter Platform and/or in order to reduce the Homeowner's default risks, which default can subject the Homeowner to the eviction from the House, Quarter can use an infrastructure that can allow Impact Investors to leverage the Quarter Platform to assist those Applicants and Homeowners.

Below is a description of example Impact Investor's permitted assistance:
1. Impact Investor can have the right to assist with funding the Minimum Retained Equity and/or a portion of the Closing Cost by purchasing Asset Tokens linked to the SPE (thus the specific House) in an amount equal to the difference between the Minimum Retained Equity and/or the purchase money to be paid by the Applicant for the purchase of the House; provided, however, Applicant may pay not less than a predetermined amount and/or percentage of the entire purchase money for the purchase of the House from their own funds without the assistance of the Impact Investor.
2. The minimum credit score requirement imposed by Quarter Platform can be waived in order to allow the Impact Investor to set their own minimum qualification criteria.
3. Asset Tokens held by Impact Investors can be entitled to their pro-rata share of the Base Rent plus the Enhanced Rent paid by the Homeowner. Impact Investors Asset Tokens can be entitled to pro-rata distribution of net proceeds in the event of sale of the entire House, as further described in the "Distributions Waterfall" provisions in the section captioned "Major terms and conditions of the Real Estate Agreement." The section captioned "Overview of Asset Tokens" sets forth more details about the Impact Investors' rights associated with the Asset Tokens.
4. In the subscription agreement by the Impact Investor, the following major terms and conditions can apply:
   (1) The Impact Investor can guarantee the performance of the Homeowner and can pledge the Asset Tokens it owns as collateral to the Fund, as the secured party.
   (2) In exchange for a supplemental payment by Homeowner to purchase additional Real Estate interests from the SPE each month, the SPE can redeem a portion of the Asset Tokens held by the Impact Investor equal to the amount of Real Estate Interests purchased each month by the Homeowner from the SPE.
   (3) The Impact Investor may not be entitled to HPI Tokens.
   (4) Fiat Currency paid by Impact Investors to purchase Asset Tokens may be held in the Cash Funding Pool and/or can be released to the SPE upon acquisition of the House.

To facilitate House purchases by Applicants who would not otherwise qualify to purchase a House on the Quarter Platform and in order to reduce the Homeowner's default risks, which default may subject the Homeowner to the eviction from the House, Quarter has created an infrastructure that allows Impact Investors to leverage the Quarter Platform to assist those Applicants and Homeowners.

Below are examples of the Impact Investor's permitted assistance.
1. Impact Investor can have the right to assist with funding the Minimum Retained Equity (if Applicant is not able to afford the Minimum Retained Equity) by purchasing Asset Tokens linked to the SPE (thus the specific House) in an amount equal to the positive difference between the Minimum Retained Equity and the purchase money to be paid by the Applicant for the purchase of the House, and also with funding a portion of the Closing Costs with cash contributions from the Cash Funding Pool, in the same mechanism as the payment of the Fractionalization Fee; provided, however, Applicant may be required to pay not less than a minimum percentage of the entire purchase money, as determined by the Impact Investor, for the purchase or the pay-off amount of the existing financing of the House from their own funds without the assistance of the Impact Investor.
2. The minimum credit score requirement imposed by Quarter Platform can be waived in order to allow the Impact Investor to set their own minimum qualification criteria.
3. Asset Tokens held by Impact Investors can be entitled to their pro rata share of the TIC Fee plus the Enhanced TIC Fee paid by the Homeowner. Impact Investors' Asset Tokens can be entitled to pro rata distribution of net proceeds in the event of sale of the entire House, as further described in the "Distributions Waterfall" provisions in the section captioned "Major terms and conditions of the TIC Agreement." The section captioned "Overview of Asset Tokens" sets forth more example details about the Impact Investors' rights associated with the Asset Tokens.

4. In the subscription agreement by the Impact Investor, the following major terms and conditions can apply:
   (i) The Impact Investor can guarantee the performance of the Homeowner and can pledge the Asset Tokens and HPI Tokens it owns as collateral to the Quarter Contingency Fund, as the secured party. If the Homeowner defaults under the TIC Agreement and the entire TIC Interests held by the Homeowner are transferred to the SPE, the Fund can have the right to redeem all of the Asset Tokens linked to the SPE held by the Impact Investor for zero consideration and the HPI Tokens in an amount equal to such Impact Investor's pro rata share of the Appreciation Value of the House, after Impact Investor receives the distributions as a result of the sale of the Homeowner's TIC Interests. If the Homeowner defaults under the TIC Agreement and a portion of the TIC Interests held by the Homeowner are transferred to the SPE, the Fund can have the right to redeem a portion of the Asset Tokens linked to the SPE held by the Impact Investor for zero consideration and the HPI Tokens in an amount equal to such Impact Investor's pro rata share of the Appreciation Value of the House, after Impact Investor receives the distributions as a result of the sale of the Homeowner's TIC Interests.
   (ii) In exchange for a portion of the Enhanced TIC fee paid by the Homeowner to purchase additional TIC Interests from the SPE each month, the SPE can redeem a portion of the Asset Tokens held by the Impact Investor equal to the amount of TIC Interests purchased each month by the Homeowner from the SPE.
   (iii) The Impact Investor can purchase the Bundle in the same way as other Asset Token Purchasers and pursuant to any or all of the following:
      (a) US Dollars paid by Impact Investors to purchase Asset Tokens can be held in the Cash Funding Pool and can be released to the SPE upon acquisition of the House. Such Asset Tokens can be pledged by the Impact Investors for the benefit of the Quarter Contingency Fund.
      (b) US Dollars paid by Impact Investors to fund Closing Costs can be held by the Cash Funding Pool and released to fund the Closing Costs in an amount determined by the Impact Investors for the benefit of the Homeowner upon acquisition of the House.

Example Requirements

Example requirements are discussed herein. All the items listed herein are optional, and any requirement included in this document can be deleted and additional requirements can be added to achieve various embodiments.

1. Overview
   a. Landing Pages (e.g., deploy marketing to convert leads to actions, measure the results and adjust the campaigns)
      i. Ability to independently create and maintain separate landing pages for a number of user types such as consumers and investors (e.g., home investors, home angels), vendors, realtors, settlement agents, etc.
         1. Can support creation and deployment of n number of landing pages (where N>1) for all user types as there can be both marketing campaigns to drive traffic to the landing page as well as ongoing efforts to test and improve call to action messaging on the pages.
         ii. Ability to perform A/B testing.
         iii. Can track and report stats on source of traffic (e.g., to be able to invoice/pay lead providers for unique clicks).
         iv. Can identify and track unique users using typical web tracking techniques such as cookies.
   b. Account registration (e.g., to enable a consumer or investor or other type of user to register to use the Quarter Platform)
      i. Can support many user types (consumers, investors, vendors, realtors, etc.).
         1. Can add additional user types.
         2. Can delete user types.
      ii. Registration can be split over two pages.
         1. Page one can be (i) email, password and/or (ii) third-party OAuth.
            a. The user id can be different from the email address.
               i. The user id composition can follow best practices.
            b. Passwords composition can follow best practices.
               i. Passwords can display a weak, medium and strong message to users as they create them.
               ii. Passwords which do not meet minimum security requirements may not be accepted.
               iii. Passwords can be double entered when created or changed.
         2. Can verify email address before moving on (double entry match)
         3. Can collect name and/or other information
      iii. Can be two factor authentication (e.g., email and/or text and/or physical authentication devices like USB)
      iv. Can support typical self-help functions (user id/password reset, other)
      v. Can support typical customer service functions such as live chat.
   c. User account maintenance. (Job—user maintains and updates Quarter account preferences, and can request support)
      i. Can enable a user to edit their user profile and preferences.
      ii. Can enable a user to request customer or tech support.
      iii. Can allow a user to close their account.
   d. Consumer pre application (Job—determine if the consumer is a good candidate for Quarter before expending resources on due diligence)
      i. Can gather initial applicant data (user entered via online forms which is used as a pre-screening).
         1. Can allow a user to enter data for more than one applicant (for example a husband and wife).
         2. Data can include: self-reported income and credit data, ability to make down payment, info on home equity, zip code from home purchases, address for refinance, etc., or any combination thereof.
      ii. Can split applicant paths into refinance or purchase based on user supplied info.
         1. If the consumer is a purchase applicant, then they can enter a target price for a home purchase which they can arrive at using a home price calculator or by simply entering a price.

2. If the consumer's proposed transaction is a refinance, then can collect data on the home they wish to refinance.
   a. This data can include the address, value and their estimated equity which may be computed by collecting their mortgage balances and subtracting from the estimated value.
   b. Value estimates can be provided by using address data to lookup on third party sites (such as Zillow).
      i. Can allow the user to edit any third-party valuations supplied.
iii. Can run the MRE engine using the unverified consumer supplied data as inputs (this can be an estimated MRE for use in making the initial go/no-go decision).
iv. Can make an initial go/no-go determination based on the user self-reported data including an initial determination of need for down payment assistance for purchase or homeowner assistance for a refinance.
   1. For refinances, can assess the need for assistance using the self-reported equity in their home and the MRE.
   2. For purchases, can assess the need for assistance using the home value generated by the calculator or entered by the applicant.
   3. If the decision is a no-go, then may not proceed.
      a. Can generate any required adverse decision notifications and display and/or send to the applicant if the decision is a no-go.
v. Can match with a down payment assistance program (purchase) or a homeowner assistance program (refinance) if needed.
   1. Can use self-reported data only.
   2. Can run a matching engine for assistance programs that can use both self reported data as described here and verified data later in the application process.
   3. A match can occur when there is at least 1 assistance program the applicant qualifies for based on the user reported data.
vi. Can make a go/no-go determination using the MRE calculations and downpayment assistance determinations (if applicable) and notify the applicant of the decision.
   1. Can generate any required adverse decision notifications and display/send to the applicant if the decision is a no-go.
   2. In the event of a go decision, can inform the applicant that this is not a final approval but rather a check to ensure that it is possible for Quarter to meet their needs based on their self-report information.
vii. If the proposed transaction is a purchase, can show a calculator which can show the payment and MRE and display homes from MLS which they can afford using the self-reported data collected.
   1. User can view and select/save but the next steps to move forward should funnel them into the application.
viii. If the proposed transaction is a refinance AND the applicant DOES NOT need an assistance program, then can present a calculator which displays MRE, payment amount, cash out amount, all based on their self-reported data and/or incorporating data looked up with third party data sources using their property address.
   1. This calculator can show how the monthly payment changes as the cash out amount is moved higher and lower.
   2. Can also display various scenarios such as ownership % based on cash out amounts, equity positions with various future HPI increases or decreases, etc.
ix. Can display "next step" or "apply" messaging.
e. Consumer application (e.g., collect information from consumer to determine if the consumer is qualified for Quarter)
   i. Can allow >1 applicant to apply for the same transaction.
      1. Can allow each to have unique logins and accounts.
         a. Can enable applicants to invite other applicants to register for an account.
         b. Can enable joint portions of application to be filled out by all joint applicants, and hold applicants until all parties have completed.
            i. Can enable messaging of status updates/reminders to all parties for joint applications.
   ii. Can collect data required for funding approval and to conduct KYC/AML checks.
   iii. Can gather consent to run credit/verify employment/perform KYC/AML checks/verify assets, etc.
   iv. Can collect application fee from applicant(s).
      1. Joint applications may use different fees.
      2. Can be the same payment options allowed for rent, equity purchases and other payments and should integrate into the same payment system.
   v. Down payment or homeowner assistance application can be completed based on applicant data inputs.
      1. Can display all assistance programs which an applicant(s) appears to qualify for and allow them to choose which ones to apply to.
      2. Can include down payment or homeowner assistance applications as needed.
   vi. Can enable download/upload of documents as needed during the application process.
   vii. Can track unique applications by lead source for invoicing/payment of lead providers.
      1. Can report on starts, abandons and completed applications by lead source.
         a. This can include typical stat collections such as time spent in application, where they left, how many times they came back, etc.
   viii. Can enable application centric customer service functions (chat, calls, etc.).
f. Post application submittal but pre-approval (e.g., enable consumer to track status of application, communicate with underwriting/assistant programs and to supply additional information if requested)
   i. Can create an application tracking dashboard of some kind which shows where they are in the process, what is left to complete, pending tasks, etc.
      1. Can include the same tracking for assistance programs.
   ii. Can enable messaging so applicants and underwriters can communicate.
   iii. Can enable messaging so applicants and assistance programs can communicate.
   iv. Can enable downloading/uploading of additional documents as required.

v. Can track and archive all communications which occur.
g. Underwriting (e.g., determine if applicant is qualified to use Quarter)
   i. If an applicant needs a down payment or homeowner assistance program, can confirm that there is a program they qualify for based on application data.
      1. If there is no program available, then can notify the applicant and do not proceed with further underwriting processes. In other words, do this first based on completed but unverified application data only.
         a. Can ensure that any adverse action notifications are sent.
   ii. Can send data file and copy of consent documents to underwriting.
      1. This can initially go through one vendor (Evolve) but the platform can support multiple vendors and can determine which vendor receives any given application.
      2. API can securely transfer data.
   iii. Can receive credit and income underwriting information back from underwriting.
      1. E.g., via secure API.
   iv. Can flow credit, income, and asset data into the MRE engine and determine MRE amount.
   v. Can determine if Escrow accounts are required.
      1. Can use an algorithm to automate this decision.
         a. Manual overrides may be allowed.
         b. Homeowner and down payment assistance program providers can make the determination when they are involved.
            i. Can allow the assistance program the option to use the Quarter algorithm for their decision.
            1. This option can be selected at the time they set up their assistance program.
            ii. If they don't use Quarter's algorithm, then they can either enter that data on a case by case basis or create parameters which can be automatically applied.
            1. Can allow the assistance program provider to edit the parameters for each program they are operating.
   vi. Can notify the applicant of go/no-go decision, the amount of MRE and, if no assistance program is needed, the decision about escrow accounts (if applicable).
      1. If no-go then can send notice of adverse action (as required).
   vii. For applicants who need an assistance program, can rerun the assistance program match using verified data from the underwriting process to ensure the applicant still matches at least 1 program.
   viii. If an applicant is qualified for multiple assistance programs, then can present data about each of them to the consumer and allow them to pick which ones they wish to apply to.
      1. If there are no material changes to the program details from when this step was done previously, then may not present to the applicant but can submit the applications based on their previous choices, removing any which they no longer are qualified for.
   ix. Can pass applicant data to homeowner or down payment assistance programs for underwriting (if applicable).
      1. Via, e.g., secure API.
   x. Can receive go/no-go from homeowner or down payment assistance program and notify applicant of decision.
   xi. If more than one program approves the applicant, then can present details of all the approvals received and allow the applicant to choose which one to accept.
      1. Can make final determination of escrow account requirements based on the chosen assistance program.
         a. As described previously this can be determined by the assistance program.
   xii. If declined by all programs, then can send notice of adverse action (as required).
h. Post approval—pre boarding (purchase only) (e.g., help consumer choose a home to purchase)
   i. Can enable purchase applicants to view homes on MLS which they are fully qualified to purchase. Note that this can also support non MLS listed properties such as those owned by builder partners of Quarter or other homes entered by the applicant.
      1. Can collect property specific data such as estimated taxes, HOA fees, etc. and provide in a calculator format to compare homes to each other.
         a. Can use third party data sources (such as Zillow) to collect or supplement data not provided by the MLS.
   ii. Can enable the ability to select and add homes to a shopping cart.
   iii. Can enable the applicant to directly connect with a Quarter, partner supplied or consumer sourced realtor to schedule showings of homes they have placed into the cart.
      1. Can enable the listing in the shopping cart to be shared/sent to others (such as the applicant's family, realtor, etc.)
      2. Can define how these communications occur (e.g., email, text, platform messaging)
   iv. Can store data on homes selected in this manner for future review.
   v. Can allow homes to be removed from the cart.
i. Network investor pre application
   i. Can present messaging that the pre application is the next step for the network investor after successful completion of the account registration process.
   ii. Can enable A/B testing of different next step messages.
   iii. May need to track unique applications by lead source for invoicing/payment of lead providers (if allowed)
      1. May need reporting on starts, abandons and completed applications by lead source
   iv. Can collect initial data to determine if the network investor is qualified to proceed to a full application.
   v. May need to customize the data collection based on jurisdictional requirements.
      1. This can mean different countries which will have different security law requirements than the US and therefore may need different data to evaluate investors subject to the laws of those jurisdictions.
      2. The platform may need the ability to set up and maintain data collection requirements based on discrete jurisdictional needs.

vi. Can make initial go/no-go decisions based on user entered data (are they accredited, what jurisdiction are they in, etc.)
 1. Can use an algorithm/rules engine for this based on jurisdictional requirements. (e.g., third party compliance provider)
 2. Can send notice of adverse action (as required)
j. Network investor application (e.g., Collect information from network investor to be used to conduct diligence to determine if they are qualified to be a Quarter network investor)
 i. Can present messaging that the application is the next step for the network investor after successfully passing pre application screening.
 ii. Can enable A/B testing for next step messaging.
 iii. Can collect application fees (if any).
 iv. Can collect network investor information sufficient to conduct diligence for KYC/AML/Accreditation/Other
  1. Can either apply data initially collected in pre-application to determine which jurisdiction rules will apply and therefore what data needs to be collected, or collect the data in a specific order to allow the application to be dynamically created during the session such that it complies with the correct jurisdictional requirements based on the users inputs.
 v. Can gather the network investors consent to run credit/verify employment/perform KYC/AML checks/verify assets, etc.
 vi. Can enable download/upload of documents as needed during the application process.
 vii. Can enable application centric customer service functions (chat, calls, etc.).
k. Post application preapproval (e.g., enable network investor applicants to track status of application, communicate with others (e.g., compliance vendors, Quarter reps) and to supply additional information if requested)
 i. Can create an application tracking dashboard of some kind which shows where they are in the process, what is left to complete, pending tasks, etc.
 ii. Can enable messaging to network investors.
 iii. Can enable downloading/uploading of additional documents as required.
 iv. Can track and archive all communications which occur.
l. Network investor diligence (e.g., determine if applicant is qualified to become a Quarter network investor)
 i. Can share information about network investor applicants with third-party compliance vendors so they can conduct appropriate checks.
  1. Via, e.g., secure API.
 ii. Can receive data back from third-party compliance vendors.
  1. Via, e.g., secure API.
 iii. Can make a go/no-go decision and notify the network investor.
  a. Can send notice of adverse action (as required).
m. Post approval funding by network investor (e.g., collect and deploy approved network investor's capital)
 i. Can provide approved network investors with access to PPM, subscription agreement, and other necessary documents to close and fund the investment.
  1. Can autofill the documents with previously captured data as much as possible.
  2. Can enable an approved network investor to fill out/edit data in documents as needed to complete.
 ii. Can enable execution of documents (DocuSign where allowed, download, wet sign and upload if not).
 iii. Upon receipt of executed documents, can review the documents for completeness and accuracy and confirm the final approval for the investment.
 iv. Can set up holding company escrow account for the network investor.
 v. Can gather funding account details (bank and/or wallet).
  1. Can support many types of payments, including newer versions such as stablecoin, crypto payments
 vi. Can enable network investors to transfer funds to holding company escrow accounts.
 vii. Can mint asset tokens (509 Holdings) and move to the holding company escrow wallet when funding arrives in the Funding Cash Pool.
  1. These tokens can be initially blank and can be subject to both a Time Lock and a Transfer Lock.
  2. Also, can mint HPI Tokens and move to the wallet for the HPI Token Escrow Pool.
   a. The HPI tokens can also be subject to both a Time Lock and a Transfer Lock.
   b. Different tokens can be minted at the same time or at different times.
n. Home Angel pre application
 i. Can present pre-application messaging as next steps to the impact investor after successful completion of account registration process.
 ii. Can enable A/B testing of next steps messaging.
 iii. Can track unique applications by lead source for invoicing/payment of lead providers (if allowed).
  1. Can do reporting on starts, abandons and completed applications by lead source.
 iv. Can collect initial data to determine if the impact investor is qualified to proceed to a full application.
 v. Can customize the data collection based on jurisdictional requirements.
  1. Different countries can have different security law requirements than the US and therefore may need different data to evaluate impact investors subject to the laws of those jurisdictions.
  2. The platform can have the ability to set up and maintain data collection requirements based on discrete jurisdictional needs.
 vi. Can make initial go/no-go decisions based on user entered data (are they accredited, what jurisdiction are they in, etc.)
  1. Can us an algorithm/rules engine for this (e.g., third party compliance provider)
  2. Can send notice of adverse action (as required)
o. Impact investor application (e.g., collect information from impact investor to be used to conduct diligence to determine if they are qualified to be a Quarter impact investor)
 i. Can present the full application as the next step for the impact investor after successfully passing pre application screening.
 ii. Can enable A/B testing for next step messaging.
 iii. Can collect application fees (if any).
 iv. Can collect impact investor information sufficient to conduct diligence for KYC/AML/Accreditation/Other
  1. Can either apply data initially collected in pre-application to determine which jurisdiction rules will apply and therefore what data needs to be collected, or collect the data in a specific order to allow the application to be dynamically created during the session such that it complies with the correct jurisdictional requirements based on the users inputs.
    v. Can gather the impact investors consent to run credit/verify employment/perform KYC/AML checks/verify assets, etc.
    vi. Can enable download/upload of documents as needed during the application process.
    vii. Can enable application centric customer service functions (chat, calls, etc.).
p. Impact investor diligence (e.g., determine if applicant is qualified to become a Quarter impact investor)
    i. Can share information with third-party compliance vendors so they can conduct diligence checks.
        1. Via, e.g., secure API.
    ii. Can receive data back from third-party compliance vendors.
        1. Via, e.g., secure API.
    iii. Can make a go/no-go decision and notify the impact investor.
        1. Can send notice of adverse action (as required).
q. Post approval funding by impact investor (e.g., collect and deploy approved impact investor's capital)
    i. Can provide access to PPM, subscription agreement and other documents necessary to close and fund the investment.
        1. Can autofill documents with previously collected data as much as possible.
        2. Can enable the impact investor to enter/edit data as needed.
    ii. Can enable execution of documents (DocuSign where allowed, download, wet sign and upload if not).
    iii. Can gather funding account details (bank and/or wallet).
    iv. Can enable funding transfer to Holding company escrow account.
    v. Upon receipt of executed documents, can review the documents for completeness and accuracy and confirm final approval for the investment.
    vi. Can set up holding company escrow account for the impact investor.
    vii. Can gather funding account details (bank and/or wallet).
    viii. Can mint Asset Tokens and move them to the Holding Company's escrow wallet when funding arrives in the Funding Cash Pool.
        1. These tokens can be initially blank and can be subject to both a Time Lock and Transfer Lock
r. Manage assistance program(s) (e.g., the impact investor sets up criteria which define the assistance programs it will offer and deploy capital for)
    i. Can enable the impact investor to set up 1 or more unique down payment or homeowner assistance programs.
        1. Can allow the impact investor to define the attributes of each program they wish to offer.
            a. Can enable the impact investor to choose a unique name for each program.
                i. All names can be submitted to Quarter for approval.
            b. Can set the financial parameters for each program. (Subject to certain term and conditions set by Quarter)
                i. Can set max and minimum amount to invest for each consumer.
                ii. Can set a target return on investment.
                iii. Can define the rules for escrow accounts.
                iv. Can allocate a funding amount to each program from their total funding commitment.
                v. Can allow them to prioritize so that funding $$ in their escrow account(s) are allocated to the programs designated as the highest priority.
            c. Can enable the impact investor to define the demographics of the consumers they wish to help in each program.
                i. Choices can be selected from a set of pre-established fields which Quarter alone will approve and maintain.
                ii. Can establish a review process to determine legality and suitability of any program which an impact investor desires to offer.
            d. Can define the characteristics of the properties that the impact investors will fund for each program (e.g., SFR vs townhome, geographical location, etc.)
                i. The property characteristics can be selected from a set of pre-established fields which Quarter can approve and maintain.
        2. Impact investors can have the ability to add, edit and delete these programs as they wish.
s. Collect consumer assistance application data (e.g., to gather the data needed for the impact investor to underwrite an assistance application)
    i. Can flow information gathered during the consumer application process into the assistance application and prefill fields to avoid redundant data entry.
    ii. Can create dynamic application forms for each consumer based on the specific assistance programs they have matched with.
    iii. Can filter the superset of data provided by the consumer to the specific subset needed for each unique assistance program application.
        1. For example, can create a single application flow which gathers a superset of information which can enable completion of ALL of the applications for ALL of the programs a consumer matched.
t. Underwrite assistance applications (e.g., decide which assistance applications are approved or denied)
    i. Human intervention may be enabled.
    ii. Underwriting can happen within an online impact investor portal and no PII should leave our servers.
        1. The applicant data shared can be pulled from the superset of information collected during the assistance application process and then filtered to the subset required for each of the specific programs being underwritten.
    iii. There can be a workflow queue for pending applications to assist each impact investor to manage their application flow (or to create the submission order for an automated underwriting engine). This workflow and queue can include the following functionality:
        1. Can be time based with options to change order based on TBD criteria (priority)
        2. Can be filtered and sorted by program.

iv. Can approve/deny and notify the consumer.
1. For down payment assistance programs, can have the ability to conditionally approve based on the consumer provided data only (e.g., approved subject to finding an acceptable property).
   a. Final approval can be issued once property is identified and passes diligence.
2. For homeowner assistance programs, the final approval may be immediately issued.
3. For both down payment or homeowner assistance denials, can notify the applicant and issue a notice of adverse action (if required).
4. Can track the balance in the impact investor funding account and place a block/hold on the amount of funds approved or conditionally approved but not yet disbursed.
   a. Can send messaging with preset alerts when account balances hit certain levels.

u. Property approval (purchase) (e.g., identity and approve the home a consumer intends to purchase using the Quarter platform)
i. Can allow applicants to invite their own realtor to create an account (if applicable).
   1. System can generate an invite and email.
ii. Can allow the applicant's realtor to create a user account (if applicable).
   1. Realtor's can be able to manage multiple clients on the system at the same time via one account.
iii. Can enable communication between the applicant and the Realtor.
iv. Can allow a consumer to terminate a realtor relationship.
   1. Can remove realtor from the transaction/communications
   2. Can enable feedback/comments from consumer and realtor in the event of termination.
v. Can allow consumers to add a new Realtor.
vi. Can collect initial data about the home from user entered or other data sources (such as MLS data from homes in the shopping cart).
vii. Can use data to analyze home for Quarter suitability, make initial go/no-go decision and notify applicant and, if applicable, the realtor.
   1. Can note that these filters should be run in advance on any MLS listing such that only homes which meet Quarter criteria are displayed.
viii. Can provide access to R/E contract documents (including addendums) to applicant and, if applicable, the realtor, and other approved users.
   1. Can flow any data from MLS or other data sources into contract documents
      a. Purchase properties not chosen from the MLS listings can be looked up on third party data sources (such as Zillow, CoreLogic, etc.) to validate that information used on the contract documents is correct.
   2. Can enable user data entry to fill out/edit purchase contract documents.
ix. Can allow download of generated purchase contract documents
   1. Approved users with access can do this.
x. Can allow approved users to upload executed contracts with addendums and possibly enable the seller to DocuSign on our system.
xi. Can review and approve executed contract w/addendums.
   1. Can have a work queue for this to notify the appropriate parties of the need for review and approval.
xii. Can enter contract details into the Quarter platform.
   1. Realtor, transaction coordinator, or another entity can do this.
xiii. Can order property diligence and closing services such as title, inspection, appraisal, settlement, etc.
xiv. Can allow property diligence vendors and closing services providers to create user accounts.
   1. Can enable closing Quarter realtor/transaction coordinator/other approved users to send invitations to vendors to create an account.
   2. Vendors can be Quarter approved.
   3. Each vendor can service multiple transactions from one account.
xv. Can enable upload of diligence documents
   1. Various parties can be permissioned to do this:
      a. Applicant
      b. Realtor
      c. Transaction coordinator
      d. Vendor
      e. Quarter system admin
xvi. Review diligence documents.
   1. Can have a workflow queue to manage this.
xvii. Can approve property or notify applicant/realtor of deficiencies.
xviii. Can cure deficiencies or reject property.
   1. This can be an exception queue and workflow for this.
   2. Additional documents can be uploaded by the same parties
   3. Can have review and approval processes v. Property approval (refinance) (e.g., confirm suitability of consumers existing home to board onto the Quarter platform)
i. Can generate documents using information entered into the Quarter platform.
   a. Obtain consumer agreement to diligence to be performed on the home.
ii. Can order property diligence and closing services (title, inspection, appraisal, settlement, etc.)
iii. Can allow property diligence vendors and closing services providers to create user accounts.
   1. Can enable closing Quarter transaction coordinator to send invitations to create accounts.
   2. Vendors can be Quarter approved
   3. Each vendor can service multiple transactions from one account.
iv. Can enable upload of diligence documents
   1. Various parties can be permissioned to do this:
      a. Applicant
      b. Transaction coordinator
      c. Vendor
      d. Quarter system admin
v. Can review diligence documents
   1. Can use a workflow queue to manage this.
vi. Can approve property or notify applicant of deficiencies
vii. Can cure deficiencies or reject property.
   1. This can be an exception queue and workflow for this.
   2. Additional documents can be uploaded by the same parties as outlined in (1)(v)(iv)(1).
   3. Can use the same review and approval processes which start at (1)(v)(v) occur again.

w. Close Quarter Funding Transaction (e.g., close real estate transaction using funding from Quarter investors)
  i. Can create SPE
  ii. Can notify investors of pending purchase of home.
    1. Can calculate the funding needs and message network investor with:
      a. Amount of investments.
      b. Date of anticipated closing.
    2. Can calculate the funding needs and message the impact investor with:
      a. Amount of downpayment assistance funding needed.
      b. Date of anticipated closing.
  iii. Can enable viewing of property/applicant diligence data and documents (anonymized and no PII for network investors, more detail for impact investors)
  iv. Can obtain approval to fund from the network investors
  v. Can generate closing documents and allow download/access for closing services providers.
  vi. Can enable upload of closing documents by closing service providers.
  vii. Can review and approve closing documents.
  viii. Can execute documents on behalf of SPE (DocuSign as much as possible).
  ix. Can fund purchase from holding company escrow account on behalf of SPE.
  x. Can color and transfer Asset Tokens to network investors, impact investors and the Risk Pool.
  xi. Can mint HPI Tokens (509 Holdings) and transfer to HPI Token Escrow Pool wallet.
  xii. Can mint Occupancy Token (SPE) and transfer to wallet
  xiii. Can fund escrow accounts, and collect boarding and other fees due from closing services providers.
  xiv. Can store final closing documents.
    1. Can hash closing documents, put the hash on-chain and store original images in the repository.
    2. Can ensure that trailing documents are collected, hashed and stored (such as recorded copy of deed, title policy).
    3. There can be reminders generated by the system to follow up periodically until all trailing documents are collected.
x. Servicing (e.g., collect payments from consumer and monitor compliance with terms of their TIC/lease agreement)
  i. Can enable occupant payment setup via online app (mobile and desktop).
  ii. Can accept payment via ACH and if debit or CC then add interchange fees to payment amount
  iii. Can deposit payments into F.B.O. account (check with accountants for actual bank account money flow).
  iv. Can enable payments to move from F.B.O. account to various destination accounts/wallets
  v. Can track all payments in accounting ledger/blockchain.
  vi. Can monitor/surveil payment of taxes/insurance/HOA dues.
    1. Can enable third party service providers to perform this service.
      a. Via, e.g., some type of integration/API.
  vii. Can monitor compliance with TIC/lease agreements.
  viii. Can manage customer support issues including renovation requests, hazard insurance claims, income interruption requests, etc.
  ix. Can send messages/notifications to occupant if any payments are late or they are out of compliance with the TIC/lease agreements.
    1. Can email/text/in app notification/snail mail.
    2. Can allow for customizable content and notification workflows based on local legal requirements.
  x. Can collect payments from the Risk Pool if the occupant does not timely make them.
  xi. Can send to special servicing in the event of default.
    1. Can set customizable triggers for this.
  xii. Can advance funds from Risk Pool to pay default costs.
  xiii. Can manage fractional transfers between SPE and occupant in support of down payment assistance programs.
    1. Can be automated and can occur upon receipt of each monthly payment made by the occupant.
    2. Can define when the deed is changed.
  xiv. Can manage fractional sales between SPE and occupant.
    1. MRE amount and Excess equity can be recalculated in and displayed to occupant in real-time, so they know what they have available to sell.
    2. Can provide occupant with a calculator which shows the impact on the rental payment for both purchase and sale transaction so they can model various simulated fractional transactions.
  xv. Can manage the sales process in the event the homeowner decides to sell the entire home.
  xvi. Can manage default processes as needed.
y. Customer Support (e.g., provide technical support to Quarter platform users)
  i. Tier 1 support can be self-help
  ii. Humans shall provide $2^{nd}$ tier tech support for users.
    1. Can enter and track and close tickets (e.g., Zendesk)
    2. Can log entries into customer records.
z. HPI token management (e.g., track home price appreciation and manage HPI token distributions)
  i. Can periodically update valuations for all boarded homes
    1. Via, e.g., API.
    2. Can automatically scrub and identify data which is suspect (e.g. >n % change or not in sync with expected ranges).
    3. Can have a review process for exceptions.
    4. Can have ability to upload enhanced valuations which override AVMs.
  ii. Can calculate HPI gains and determine HPI Token allocations at HPI Interval.
  iii. Can remove transfer lock and transfer HPI tokens to Asset token holder wallets at HPI Interval.
  iv. Can track the number of HPI tokens in the HPI Token Escrow Pool and mint, lock and transfer additional tokens to the pool as required.
  v. Can redeem HPI tokens and burn as required.
    1. Can acquire HPI tokens from the marketplace using cash generated upon sale of a home and burn.
    2. Can burn locked HPI tokens held by the HPI Token Escrow Pool when a home is sold and removed from the network.

aa. Occupancy Token Management
   i. Occupancy tokens can be locked and shall remain in an escrow and/or wallet
   ii. Occupancy tokens can be redeemed and burned in the event the home they are attached to is sold and leaves the networks.
   iii. An occupancy token may be transferred to another occupant in the future.
      1. Can support occupant to occupant transfer.
bb. Accounting
   i. Can track all movements of cash and other payments on the platform.
   ii. Can track all setup and ongoing admin costs for each SPE.
   iii. Can track all purchase and sales for homes into and out of SPE's.
   iv. Can track all expenses related to each SPEs ownership of a home.
   v. Can track all TIC purchases by homeowners.
   vi. Can track all expenses related to each homeowner's ownership of a home.
   vii. Can track all capital improvements made to each home.
   viii. Can track basis of homeowner and SPE for each home on the platform.
   ix. Can track appreciation or depreciation of each home.
   x. Can track deprecated value of each home.
   xi. Can track property tax, insurance, HOA payments for each home.
   xii. Can track any insurance claims and/or payments for each home.
   xiii. Can track escrow account balances for each network investor.
   xiv. Can track escrow account balances for each impact investor.
   xv. Can track risk pool advances for each home.
   xvi. Can track repayment of risk pool advances for each home.
   xvii. Can track real estate commission account balance for each home.
   xviii. Can track rental payments made by each homeowner
   xix. Can track all non-rent payments made by each homeowner.
   xx. Can track any late fees or fines accrued to each homeowner.
   xxi. Can track the issuance, redemption, purchases and sales of all asset and HPI tokens.
   xxii. Can track HPI pool assets.
   xxiii. Can track all sales costs and expenses when home leaves the network.
   xxiv. Can track all real estate related items (depreciation, taxes paid, etc.).
   xxv. Can generate periodic tax reporting documents and reports for all platform users including occupants/network investors/impact investors/vendors and Quarter entities.
   xxvi. Can make entries into the blockchain ledger for required transactions
   xxvii. Can search/download transactions written to the blockchain.
   xxviii. Can have CRMStore contact information for all platform users including consumers, investors, third-party vendors, realtors, etc.
   xxix. Can collect consumer and investor registration data by status including leads, full and partial (abandons) registrations.
   xxx. Can enable data collection/uploads to generate marketing lead lists which are external to the platform user base.
   xxxi. Can store sufficient info to support marketing campaigns.

2. Required Components
   a. In house technology
      i. Web Applications that can be used:
         1. Application portal (occupant)
         2. Application portal (network investor)
         3. Application portal (impact investor)
         4. Down payment assistance configuration portal (impact investor)
         5. Underwriting portal (vendor)
         6. Underwriting portal (occupant)
         7. Underwriting portal (impact investor if not automated)
         8. Occupant dashboard
         9. Network investor dashboard
         10. Impact investor dashboard
         11. Customer service dashboard
         12. System administration dashboard
         13. Closing coordinator portal
         14. Account management (all user types)
      ii. Mobile Apps can be used for:
         1. Occupant (TBD)
         2. Network investor (TBD)
      iii. Blockchain can be used
         1. Token creation/tracking
            a. Asset tokens
            b. HPI tokens
            c. Occupancy tokens
         2. Transaction tracking (writing to the ledger)
         3. Reporting and/or integration into accounting system and other Quarter services
      iv. Secondary exchange can be done
         1. A venue for selling fractional interests in homes using asset tokens
         2. All secondary transactions shall be recorded in the blockchain ledger
      v. Payments
         1. Ability to accept inbound payments from network investors, impact investors, occupants, and vendors (closing/settlement providers)
         2. Ability to perform outbound transfers (including internal transfers)
         3. Ability to transact payments in fiat and crypto
         4. Reporting and/or integration into blockchain and/or accounting system and other Quarter services
      vi. Data and document storage
         1. Ability to ingest, store, retrieve and output data in text and images generated/uploaded by any user type
         2. Ability to ingest, store, retrieve and output any data generated by any Quarter service
         3. Ability to hash all of the above
   b. Example vendors and third party solutions and services
      1. Website tracking conversion tools (Optimizely)
      2. Applicant diligence and underwriting (Evolve)
      3. Investor diligence KYC/AML/etc. (Polymath)
      4. AVM/valuation provider (Quantarium/Valligent)
      5. Title Insurance provider (FirstAm/ORT)
      6. Real estate form provider (NAR/Docmagic)
      7. Closing/settlement services 8. Electronic signature provider (Docusign)
9. Online/remote notary
10. Blockchain platform (Polymath/Etherum/Toko)
11. Token exchanges
12. Accounting platform
13. MLS Data provider (CoreLogic-Trestle)
14. Real Estate data provider (CoreLogic/Attom/Zillow/Drew)
15. Property tax and insurance escrow services (CoreLogic/FirstAm)
16. Property tax, insurance, and HOA monitoring services (CoreLogic/FirstAm)
17. Lien monitoring service (Corelogic/FirstAm)
18. Credit report provider initial pull (Evolve) and ongoing
19. Payment processing
20. Token exchange
21. Special servicer (Statebridge)
22. Quarter preferred realtor network Differentiating Information The use of multiple tokens in the disclosed embodiments enables the storage of data which can differentiate fungible tokens from each other by storing data using NFTs.

A specific example of this is the use case where a supply of Asset Tokens which are minted for a specific house which is boarded onto the platform, which represent the value of the fiat investment made in the house. The supply of such Asset Tokens is not fixed and may change from time to time based on various actions taken by the homeowner or the investors who hold the tokens.

When the supply of Asset Tokens is increased by minting additional tokens (which could occur when a homeowner sells a portion of their equity in the home), or when existing Asset Tokens are transferred between parties, there can be a need to identify the value of the underlying asset (e.g., the house). Furthermore, it can be beneficial to link that information to the specific Asset Tokens which were minted or transacted. However, given that the Asset Tokens are fungible, it is not possible to identify which specific tokens from the supply were transacted as all the token metadata within a supply of fungible tokens is identical.

However, by using multiple tokens, the deficiency can be overcome. An NFT which has at least one updatable metadata field supported in the tier 1 platform, can solve the data storage problem as the supply of fungible tokens can be linked to a specific NFT when the supply is created. This link will provide a link to the metadata field (e.g., a valuation field for the underlying home). At the time the NFT is created, as well as at the time of any subsequent metadata field update, a time stamp for initial minting and any subsequent updates is recorded in the digital ledger. By comparing the time stamp on the minting or updates of the NFT with the time stamps for the fungible token transactions, each specific fungible token can be identified and linked to the metadata field from the NFT. For example, the changing value of a home as immutably recorded in a metadata field in an NFT can be linked to specific fungible tokens in order to track the underlying value of a home at the time that specific transactions occurred, essentially enabling fungible tokens to take on non-fungible token properties as it relates to storage of token specific metadata.

The similar outcome can be achieved using an NFT which does not have an updatable metadata field by utilizing a decentralized, auditable log of immutable and timestamped events, such as the Hedera Consensus Service (HCS), where a message containing an update to an NFT's metadata field would be written to the ledger without updating the NFT itself.

A first example use case is as follows:

1. Assume a house is boarded onto the platform with a value at the time of boarding of $400,000 where the homeowner purchased $50,000 and an SPE purchased $350,000, both as tenants in common.
2. Upon purchase of the home, an NFT (an Occupancy Token) will be created which will contain an updateable metadata field which is used to record the valuation of the home at the time of boarding (i.e. $400,000). The minting of this NFT shall be recorded on a digital ledger with a time stamp for the time of minting.
3. A supply of fungible tokens (Asset Tokens) shall be "colored" by linking the tokens in this supply to a specific NFT which contains information about the home (including the valuation data) via a metadata field contained within each fungible token in that supply.
4. The investors who provided capital to the SPE in order to purchase its tenants in common interest shall be issued 350,000 Asset Tokens at a nominal value of $1.00. At the time of issuance, each of these tokens shall be assigned a highwater mark which is equal to the valuation at the time of boarding, or $400,000.
5. Assume that at the end of a predetermined period of time (the HPI Interval), the value of the home is assessed and determined to now be $440,000 which is a gain of 10%. The Occupancy Token NFT shall have its valuation metadata field updated from the previous value of $400,000 to the current value of $440,000 and that update will be recorded in the digital ledger with a time stamp. Each token within the supply will have its highwater mark updated, which shall be equal to the new valuation of $440,000.
6. Assume at the end of a the next HPI Interval, the value of the home is again assessed and is determined to be $418,000, a loss of 10%. The valuation metadata field in the Occupancy Token NFT shall be update and that update will be recorded and timestamped in the digital ledger. Since the valuation is still below the previous highwater mark of $440,000 for all of the Asset Tokens, the highwater mark shall remain unchanged for all Asset Tokens within the supply.
7. Assume that immediately after the valuation update to $418,000 and prior to the expiration of the current HPI Interval, 10,000 Asset Tokens from the original investor to a new investor. The transfer of these 10,000 Asset Tokens is recorded on the digital ledger and timestamped. The highwater mark for these 10,000 Asset Tokens is now $418,000 since they were transferred while the valuation was below the previous highwater mark. None of the other 340,000 Asset Tokens are transferred.
8. Assume at the end of the next HPI Interval, the value of the homes is assessed to be $434,720, a 4% gain. The valuation metadata field in the Occupancy Token NFT shall be update and that update will be recorded and timestamped in the digital ledger. The 10,000 Asset Tokens which were previously transferred should have their highwater mark updated to $434,720 while the remaining 340,000 Asset Tokens would retain their previous highwater mark of $440,000 since that value remains higher than the current valuation of $434,720. However, and in order to update the highwater marks for the 10,000 transferred tokens, those specific Asset Tokens need to be identified separately from the other 340,000 Asset Tokens in the supply, which is not possible given that each fungible token in a supply is identical (all meta is the same). Given this limitation, the use of multiple tokens enables us to solve this problem by comparing the time stamps of the minting and transfer events of fungible Asset Tokens recorded in the digital ledger to the time stamps in the digital ledger recording the minting of the NFT Occupancy Token and subsequent updates to its valuation metafile field to identify which tokens were transferred and which valuation was relevant at the time of transfer, thus enabling us to determine which Asset Tokens should have their highwater mark updated and which do not.

A second example use case is as follows:

1. Assume a house is boarded onto the platform with a value at the time of boarding of $400,000 where the homeowner purchased $50,000 and an SPE purchased $350,000, both as tenants in common.
2. Upon purchase of the home, an NFT (an Occupancy Token) will be created which link to a decentralized, auditable log of immutable and timestamped events which is used to record the valuation of the home at the time of boarding (i.e. $400,000). The minting of this NFT shall be recorded on a digital ledger with a time stamp for the time of minting.
3. A supply of fungible tokens (Asset Tokens) shall be "colored" by linking the tokens in this supply to a specific NFT which contains information about the home (including the valuation data) via the decentralized, auditable log referenced within each fungible token in that supply.
4. The investors who provided capital to the SPE in order to purchase its tenants in common interest shall be issued 350,000 Asset Tokens at a nominal value of $1.00. At the time of issuance, each of these tokens shall be assigned a highwater mark which is equal to the valuation at the time of boarding, or $400,000.
5. Assume that at the end of a predetermined period of time (the HPI Interval), the value of the home is assessed and determined to now be $440,000 which is a gain of 10%. The decentralized, auditable log shall have included a new message with the new valuation updated from the previous value of $400,000 to the current value of $440,000 and that update will be recorded in the digital ledger with a time stamp. Each token within the supply will have its highwater mark updated, which shall be equal to the new valuation of $440,000.
6. Assume at the end of a the next HPI Interval, the value of the home is again assessed and is determined to be $418,000, a loss of 10%. The valuation metadata field in the Occupancy Token NFT shall be update and that update will be recorded and timestamped in the digital ledger. Since the valuation is still below the previous highwater mark of $440,000 for all of the Asset Tokens, the highwater mark shall remain unchanged for all Asset Tokens within the supply.
7. Assume that immediately after the valuation update to $418,000 and prior to the expiration of the current HPI Interval, 10,000 Asset Tokens from the original investor to a new investor. The transfer of these 10,000 Asset Tokens is recorded on the digital ledger and time-stamped. The highwater mark for these 10,000 Asset Tokens is now $418,000 since they were transferred while the valuation was below the previous highwater mark. None of the other 340,000 Asset Tokens are transferred.
8. Assume at the end of the next HPI Interval, the value of the homes is assessed to be $434,720, a 4% gain. The valuation can be updated in a new message to the decentralized, auditable log and that update will be recorded and timestamped in the digital ledger. The 10,000 Asset Tokens which were previously transferred should have their highwater mark updated to $434,720 while the remaining 340,000 Asset Tokens would retain their previous highwater mark of $440,000 since that value remains higher than the current valuation of $434,720. However, and in order to update the highwater marks for the 10,000 transferred tokens, those specific Asset Tokens need to be identified separately from the other 340,000 Asset Tokens in the supply, which is not possible given that each fungible token in a supply is identical (all meta is the same). Given this limitation, the use of multiple tokens enables us to solve this problem by comparing the time stamps of the minting and transfer events of fungible Asset Tokens recorded in the digital ledger to the time stamps in the digital ledger recording the minting of the NFT Occupancy Token and subsequent updates to the decentralized, auditable log to identify which tokens were transferred and which valuation was relevant at the time of transfer, thus enabling us to determine which Asset Tokens should have their highwater mark updated and which do not.

EXAMPLE EMBODIMENT

In some embodiments, a method includes creating a non-fungible occupancy token, comprising an updateable metadata field comprising a first field representing a first value of a home and a second field representing a highmark value of the home for each of a supply of fungible asset tokens; creating the supply of fungible asset tokens, linked to the occupancy token; updating the first field, based on a second value of the home; in response to the second value being greater the first value, updating the second field to the second value; updating the first field, based on a third value of the home; transferring a portion of the supply of fungible asset tokens to another user; and updating the second field corresponding to the portion of the supply of asset tokens to the third value.

Example Computer System

Figure 5:
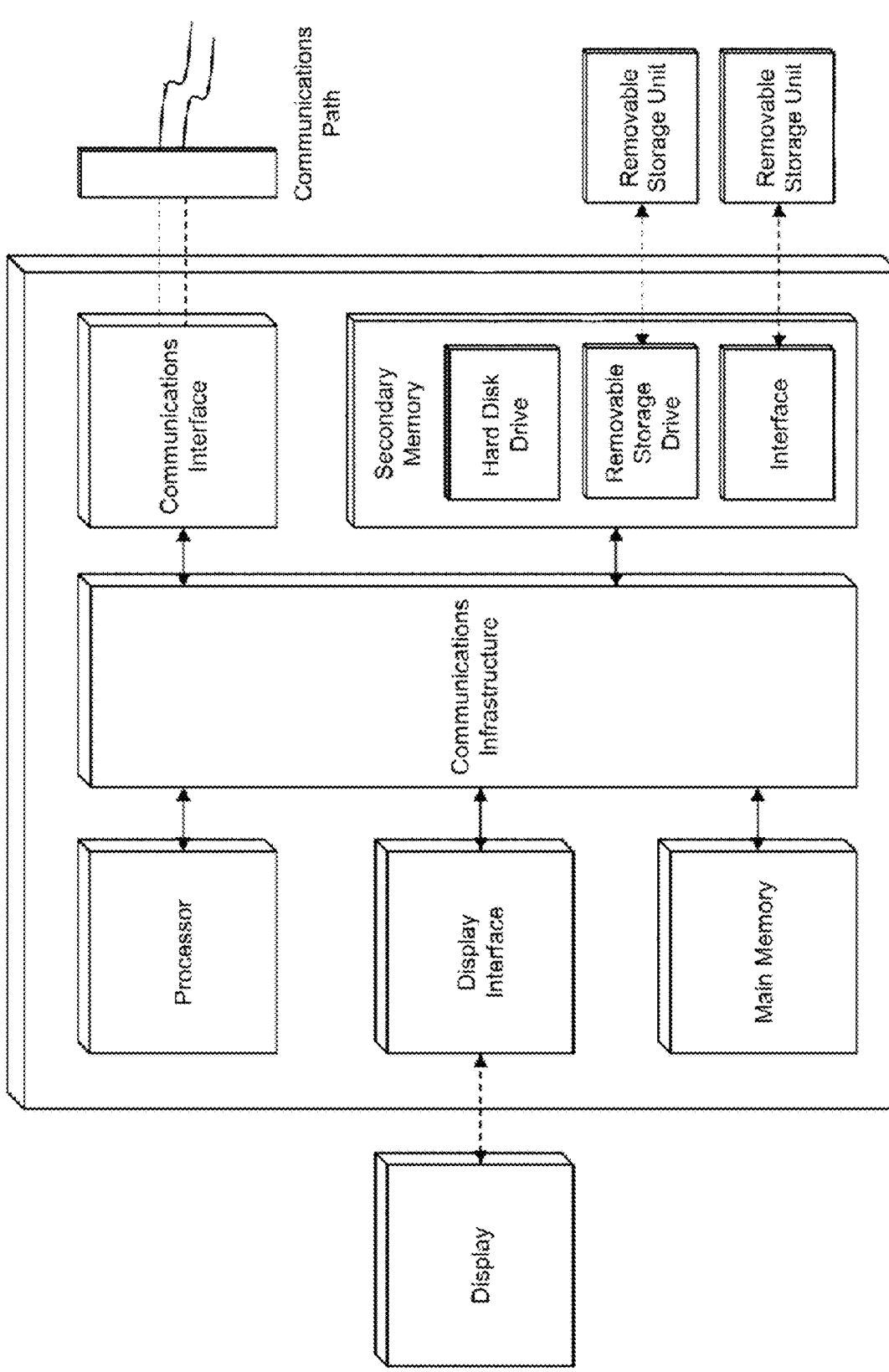
FIG. 5 illustrates an example computer system, according to aspects of the disclosure.

Various embodiments of the present disclosure are described in terms of the example computer system of FIG. 5. After reading this description, it will become apparent to a person skilled in the relevant art how to implement the present disclosure using other computer systems and/or computer architectures. The present disclosure can be implemented on a computer system or on a mobile application. In addition, the present disclosure can be implemented using blockchain or not using blockchain. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device may be a special purpose, or a general-purpose processor device specifically configured to perform the functions discussed herein. The processor device may be connected to a communications infrastructure, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system may also include a main memory (e.g., random access memory, read-only memory, etc.), and may also include a secondary memory. The secondary memory may include the hard disk drive and a removable storage drive, such as a floppy disk drive, a magnetic tape drive, an optical disk drive, a flash memory, etc.

The removable storage drive may read from and/or write to the removable storage unit in a well-known manner. The removable storage unit may include a removable storage media that may be read by and written to by the removable storage drive. For example, if the removable storage drive is a floppy disk drive or universal serial bus port, the removable storage unit may be a floppy disk or portable flash drive, respectively. In one embodiment, the removable storage unit may be non-transitory computer readable recording media.

In some embodiments, the secondary memory may include alternative means for allowing computer programs or other instructions to be loaded into the computer system, for example, the removable storage unit and an interface. Examples of such means may include a program cartridge and cartridge interface (e.g., as found in video game systems), a removable memory chip (e.g., EEPROM, PROM, etc.) and associated socket, and other removable storage units and interfaces as will be apparent to persons having skill in the relevant art.

Data stored in the computer system (e.g., in the main memory and/or the secondary memory) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system may also include a communications interface. The communications interface may be configured to allow software and data to be transferred between the computer system and external devices. Exemplary communications interfaces may include a modem, a network interface (e.g., an Ethernet card), a communications port, a PCMCIA slot and card, etc. Software and data transferred via the communications interface may be in the form of signals, which may be electronic, electromagnetic, optical, or other signals as will be apparent to persons having skill in the relevant art. The signals may travel via a communications path, which may be configured to carry the signals and may be implemented using wire, cable, fiber optics, a phone line, a cellular phone link, a radio frequency link, etc.

The computer system may further include a display interface. The display interface may be configured to allow data to be transferred between the computer system and external display. Exemplary display interfaces may include high-definition multimedia interface (HDMI), digital visual interface (DVI), video graphics array (VGA), etc. The display may be any suitable type of display for displaying data transmitted via the display interface of the computer system, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory and secondary memory, which may be memory semiconductors (e.g., DRAMs, etc.). These computer program products may be means for providing software to the computer system. Computer programs (e.g., computer control logic) may be stored in the main memory and/or the secondary memory. Computer programs may also be received via the communications interface. Such computer programs, when executed, may enable computer system to implement the present methods as discussed herein. In particular, the computer programs, when executed, may enable processor device to implement the methods, as discussed herein. Accordingly, such computer programs may represent controllers of the computer system. Where the present disclosure is implemented using software, the software may be stored in a computer program product and loaded into the computer system using the removable storage drive, interface, and hard disk drive, or communications interface.

The processor device may comprise one or more modules or engines configured to perform the functions of the computer system. Each of the modules or engines may be implemented using hardware and, in some instances, may also utilize software, such as corresponding to program code and/or programs stored in the main memory or secondary memory. In such instances, program code may be compiled by the processor device (e.g., by a compiling module or engine) prior to execution by the hardware of the computer system. For example, the program code may be source code written in a programming language that is translated into a lower-level language, such as assembly language or machine code, for execution by the processor device and/or any additional hardware components of the computer system. The process of compiling may include the use of lexical analysis, preprocessing, parsing, semantic analysis, syntax-directed translation, code generation, code optimization, and any other techniques that may be suitable for translation of program code into a lower-level language suitable for controlling the computer system to perform the functions disclosed herein. It will be apparent to persons having skill in the relevant art that such processes result in the computer system being a specially configured computer system uniquely programmed to perform the functions discussed above.

Techniques consistent with the present disclosure provide, among other features, systems and methods for performing transactions via asset tokens and a blockchain based smart contract.

CONCLUSION

While various exemplary embodiments of the disclosed system and method have been described above it should be understood that they have been presented for purposes of example only, not limitations. It is not exhaustive and does not limit the disclosure to the precise form disclosed. Modifications and variations are possible in accordance with the above teachings or may be acquired from practicing of the disclosure, without departing from the breadth or scope.

While the disclosure has been described with reference to numerous specific details, one of ordinary skill in the art will recognize that the disclosure can be embodied in other specific forms without departing from the spirit of the disclosure. In addition, a number of the figures illustrate processes. The specific operations of these processes may not be performed in the exact order shown and described. The specific operations may not be performed in one continuous series of operations, and different specific operations may be performed in different embodiments. Thus, one of ordinary skill in the art would understand that the invention is not to be limited by the foregoing illustrative details, but rather is to be defined by the appended claims.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

The invention claimed is:

1. A method, comprising:
   creating, using a platform, a fractionalized risk pool for a real estate property, the fractionalized risk pool comprising asset tokens and an occupancy token, the asset tokens and the occupancy token issued using blockchain, wherein the asset tokens are fungible and linked to the occupancy token, and wherein the occupancy token is non-fungible and comprises an updateable metadata field comprising a valuation of the real estate property and a highwater-mark value of the real estate property;
   transmitting, by a first computing device, a first network function request to a decentralized network, the first network function request including first information comprising a first sale of a first portion of the asset tokens to a first asset token holder, wherein the first sale comprises a first blockchain based smart contract to a decentralized network, wherein the first portion of the asset tokens are associated with the highwater-mark value at a first state;
   logging, by the platform, a decrease in the valuation in the updateable metadata field; and
   transmitting, by a second computing device, a second network function request to the decentralized network, the second network function request including second information comprising a second sale of a second portion of the asset tokens to a second asset token holder, wherein the second sale comprises a second blockchain based smart contract to the decentralized network, wherein the second portion of the asset tokens are associated with the highwater-mark value at a second state based on the decrease in the valuation.

2. The method of claim 1, wherein the occupancy token confers rights to occupy the real estate property.

3. The method of claim 1, further comprising:
   updating the highwater-mark value based on changes in the valuation of the real estate property.

4. The method of claim 1, wherein the asset tokens represent fractional ownership interests in the real estate property.

5. The method of claim 1, further comprising:
   distributing payments to the first asset token holder and the second asset token holder using blockchain.

6. The method of claim 1, wherein the fractionalized risk pool further comprises HPI tokens representing home price appreciation rights.

7. The method of claim 6, further comprising:
   unlocking a portion of the HPI tokens based on an increase in the valuation of the real estate property.

8. The method of claim 6, wherein the first blockchain based smart contract contains an agreement to assign appreciation to a fractionalized pool of the HPI tokens, and in exchange issues HPI tokens.

9. The method of claim 1, further comprising:
   calculating a minimum retained equity for an occupant of the real estate property.

10. The method of claim 9, wherein minimum retained equity is determined based on risk of an occupant and global risk pool performance.

11. A system, comprising:
    a platform configured to create a fractionalized risk pool for a real estate property, the fractionalized risk pool comprising asset tokens and an occupancy token, the asset tokens and the occupancy token issued using blockchain, wherein the asset tokens are fungible and linked to the occupancy token, and wherein the occupancy token is non-fungible and comprises an updateable metadata field comprising a valuation of the real estate property and a highwater-mark value of the real estate property;
    a first computing device configured to transmit a first network function request to a decentralized network, the first network function request including first information comprising a first sale of a first portion of the asset tokens to a first asset token holder, wherein the first sale comprises a first blockchain based smart contract to a decentralized network, wherein the first portion of the asset tokens are associated with the highwater-mark value at a first state; wherein the platform is further configured to log a decrease in the valuation in the updateable metadata field; and a second computing device configured to transmit a second network function request to the decentralized network, the second network function request including second information comprising a second sale of a second portion of the asset tokens to a second asset token holder, wherein the second sale comprises a second blockchain based smart contract to the decentralized network, wherein the second portion of the asset tokens are associated with the highwater-mark value at a second state based on the decrease in the valuation.

12. The system of claim 11, wherein the occupancy token confers rights to occupy the real estate property.

13. The system of claim 11, wherein the platform is further configured to update the highwater-mark value based on changes in the valuation of the real estate property.

14. The system of claim 11, wherein the asset tokens represent fractional ownership interests in the real estate property.

15. The system of claim 11, wherein the platform is further configured to distribute payments to the first asset token holder and the second asset token holder using blockchain.

16. The system of claim 11, wherein the fractionalized risk pool further comprises HPI tokens representing home price appreciation rights.

17. The system of claim 16, wherein the platform is further configured to unlock a portion of the HPI tokens based on an increase in the valuation of the real estate property.

18. The system of claim 16, wherein the first blockchain based smart contract contains an agreement to assign appreciation to a fractionalized pool of the HPI tokens, and in exchange issues HPI tokens.

19. The system of claim 11, wherein the platform is further configured to calculate a minimum retained equity for an occupant of the real estate property.

20. The system of claim 19, wherein minimum retained equity is determined based on risk of an occupant and global risk pool performance.

* * * * *